(12) United States Patent
Jones et al.

(10) Patent No.: US 7,571,169 B2
(45) Date of Patent: Aug. 4, 2009

(54) WORD-PROCESSING DOCUMENT STORED IN A SINGLE XML FILE THAT MAY BE MANIPULATED BY APPLICATIONS THAT UNDERSTAND XML

(75) Inventors: Brian M. Jones, Redmond, WA (US); Andrew K. Bishop, Redmond, WA (US); Daniel R. Snyder, Bellevue, WA (US); Marcin Sawicki, Kirkland, WA (US); Robert A. Little, Redmond, WA (US); Anthony D. Krueger, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 11/005,183

(22) Filed: Dec. 6, 2004

(65) Prior Publication Data
US 2005/0102265 A1    May 12, 2005

Related U.S. Application Data

(63) Continuation of application No. 10/187,060, filed on Jun. 28, 2002.

(51) Int. Cl.
*G06F 7/00* (2006.01)
*G06F 17/00* (2006.01)

(52) U.S. Cl. ............ 707/100; 707/101; 707/102; 707/103 R; 707/104.1; 715/205; 715/206

(58) Field of Classification Search ..... 707/100–103 R, 707/104.1; 715/205–206
See application file for complete search history.

(56) References Cited

U.S. PATENT DOCUMENTS

| | | | |
|---|---|---|---|
| 4,751,740 A | 6/1988 | Wright | 382/180 |
| 4,864,501 A | 9/1989 | Kucera et al. | 704/8 |
| 4,866,777 A | 9/1989 | Mulla et al. | 704/206 |
| 5,185,818 A | 2/1993 | Warnock | 382/112 |
| 5,295,266 A | 3/1994 | Hinsley et al. | 718/101 |
| 5,557,722 A | 9/1996 | DeRose et al. | 715/234 |
| 5,579,466 A | 11/1996 | Habib et al. | 715/210 |
| 5,586,241 A | 12/1996 | Bauermeister et al. | 345/467 |
| 5,781,714 A | 7/1998 | Collins et al. | 345/171 |
| 5,787,451 A | 7/1998 | Mogilevsky | 715/257 |
| 5,881,225 A | 3/1999 | Worth | 726/17 |
| 5,895,476 A | 4/1999 | Orr et al. | 715/202 |

(Continued)

FOREIGN PATENT DOCUMENTS

EP    1 230 566 B1    2/2005

OTHER PUBLICATIONS

Ayers, Larry, "AbiWord's Potential", Linux Gazette, Issue 43, Jul. 1999, pp. 1-4.*

(Continued)

*Primary Examiner*—Jean B. Fleurantin
*Assistant Examiner*—Hares Jami
(74) *Attorney, Agent, or Firm*—Merchant & Gould P.C.

(57) ABSTRACT

A word processor including a native XML file format is provided. The well formed XML file fully represents the word-processor document, and fully supports 100% of word-processor's rich formatting. There are no feature losses when saving the word-processor documents as XML. A published XSD file defines all the rules behind the word-processor's XML file format. Hints may be provided within the XML associated files providing applications that understand XML a shortcut to understanding some of the features provided by the word-processor. The word-processing document is stored in a single XML file. Additionally, manipulation of word-processing documents may be done on computing devices that do not include the word-processor itself.

22 Claims, 6 Drawing Sheets

U.S. PATENT DOCUMENTS

| | | | | |
|---|---|---|---|---|
| 6,023,714 | A | 2/2000 | Hill et al. | 715/235 |
| 6,031,989 | A | 2/2000 | Cordell | 717/109 |
| 6,044,387 | A | 3/2000 | Angiulo et al. | 715/257 |
| 6,092,068 | A * | 7/2000 | Dinkelacker | 707/100 |
| 6,119,136 | A | 9/2000 | Takata et al. | 715/205 |
| 6,141,754 | A | 10/2000 | Choy | 726/1 |
| 6,182,029 | B1 | 1/2001 | Friedman | 704/9 |
| 6,209,124 | B1 | 3/2001 | Vermeire et al. | 717/114 |
| 6,230,173 | B1 | 5/2001 | Ferrel et al. | 715/205 |
| 6,233,592 | B1 | 5/2001 | Schnelle et al. | 715/205 |
| 6,249,794 | B1 | 6/2001 | Raman | 715/210 |
| 6,336,124 | B1 | 1/2002 | Alam et al. | 715/523 |
| 6,397,232 | B1 | 5/2002 | Cheng-Hung et al. | 715/203 |
| 6,507,856 | B1 | 1/2003 | Chen et al. | 715/205 |
| 6,507,857 | B1 | 1/2003 | Yalcinalp | 715/235 |
| 6,519,617 | B1 | 2/2003 | Wanderski et al. | 715/235 |
| 6,535,896 | B2 | 3/2003 | Britton et al. | 715/239 |
| 6,538,673 | B1 | 3/2003 | Maslov | 715/853 |
| 6,613,098 | B1 | 9/2003 | Sorge et al. | 715/234 |
| 6,675,353 | B1 | 1/2004 | Friedman | 715/239 |
| 6,697,999 | B1 | 2/2004 | Breuer et al. | 715/517 |
| 6,725,423 | B1 | 4/2004 | Muramoto et al. | 715/206 |
| 6,725,426 | B1 | 4/2004 | Pavlov | 715/523 |
| 6,754,648 | B1 | 6/2004 | Fittges et al. | 707/1 |
| 6,763,500 | B2 | 7/2004 | Black et al. | 715/234 |
| 6,785,685 | B2 | 8/2004 | Soetarman et al. | 707/101 |
| 6,799,299 | B1 | 9/2004 | Li et al. | 715/235 |
| 6,829,570 | B1 | 12/2004 | Thambynayagam et al. | 703/10 |
| 6,829,745 | B2 | 12/2004 | Yassin et al. | 715/236 |
| 6,845,483 | B1 | 1/2005 | Carroll | 715/236 |
| 6,886,115 | B2 | 4/2005 | Kondoh et al. | 714/52 |
| 6,918,086 | B2 | 7/2005 | Rogson | 715/257 |
| 6,928,610 | B2 | 8/2005 | Brintzenhofe et al. | 715/202 |
| 6,938,204 | B1 | 8/2005 | Hind et al. | 715/234 |
| 6,941,510 | B1 | 9/2005 | Ozzie et al. | 715/234 |
| 6,954,898 | B1 | 10/2005 | Nakai et al. | 715/262 |
| 6,968,503 | B1 | 11/2005 | Chang et al. | 715/202 |
| 6,996,772 | B2 | 2/2006 | Justice et al. | 715/236 |
| 7,028,009 | B2 | 4/2006 | Wang et al. | 705/51 |
| 7,257,772 | B1 | 8/2007 | Jones et al. | 715/234 |
| 7,275,209 | B1 | 9/2007 | Jones et al. | 715/234 |
| 7,376,650 | B1 | 5/2008 | Ruhlen | 707/6 |
| 7,389,473 | B1 | 6/2008 | Sawicki et al. | 715/255 |
| 2001/0014900 | A1 | 8/2001 | Brauer et al. | 707/513 |
| 2001/0032217 | A1 | 10/2001 | Huang | 715/239 |
| 2002/0087702 | A1 | 7/2002 | Mori | 709/228 |
| 2002/0091725 | A1 | 7/2002 | Skok | 715/234 |
| 2002/0116420 | A1 * | 8/2002 | Allam et al. | 707/526 |
| 2002/0124115 | A1 | 9/2002 | McLean et al. | 709/310 |
| 2002/0184189 | A1 * | 12/2002 | Hay et al. | 707/1 |
| 2003/0007014 | A1 | 1/2003 | Suppan et al. | 715/853 |
| 2003/0018668 | A1 | 1/2003 | Britton et al. | 715/230 |
| 2003/0101416 | A1 | 5/2003 | McInnes et al. | 715/513 |
| 2003/0135584 | A1 | 7/2003 | Roberts et al. | 709/218 |
| 2003/0163784 | A1 | 8/2003 | Daniel et al. | 715/200 |
| 2003/0167444 | A1 | 9/2003 | Zorc | 715/234 |
| 2003/0231626 | A1 | 12/2003 | Chuah et al. | 370/389 |
| 2004/0073871 | A1 | 4/2004 | Giannetti | 715/201 |
| 2004/0098320 | A1 | 5/2004 | Mitsuhashi et al. | 705/27 |
| 2004/0194035 | A1 | 9/2004 | Chakraborty | 715/234 |
| 2004/0205553 | A1 | 10/2004 | Hall et al. | 715/205 |
| 2004/0210818 | A1 | 10/2004 | Jones et al. | 715/236 |
| 2005/0108198 | A1 | 5/2005 | Jones et al. | 707/1 |
| 2005/0108278 | A1 | 5/2005 | Jones et al. | 707/102 |

OTHER PUBLICATIONS

"XML Schema for AbiWord Markup Language", downloaded from http://www.abisource.com/awml.xsd, May 27, 2000, pp. 1-3.*

Mansfield, Ron, "Mastering Word 97", fourth edition, 1997, Sybex, pp. 269-270, 412, 449-457, 985-986, 1010-1011, 1028-1029, 1031-1034.*

Castro, Elizabeth, "XML for the World Wid Web", publsihed by Peachpit Press, 2001, pp. 182-184.*

Ayers, Larry, "AbiWord's Potential", Linux Gazette, Issue 43, Jul. 1999, pp. 1-4.*

"XML Schema for AbiWord Markup Language", downloaded from http://www.abisource.com/awml.xsd, May 27, 2000, pp. 1-3.*

Castro, Elizabeth, "XML for the World Wid Web", publsihed by Peachpit Press, 2001, pp. 182-184.*

Mansfield, Ron, "Mastering Word 97", fourth edition, 1997, Sybex, pp. 269-270, 412, 449-457, 985-986, 1010-1011, 1028-1029, 1031-1034.*

Linss, Peter, "CSS Namespace Enhancements (proposal)", Jun. 1999, W3C, pp. 1-7.

DevX Staff, "Twelve Dynamic HTML Lessons", downloaded from http://devx.com/projectcool/Article/18103/1763, published Jan. 1, 2000, pp. 1-3.

Meyer, Eric, "Cascading Syle Sheets: HTML and CSS", May 2000, O'Reilly, pp. 1-17.

XHTML Examples, "XHTML explained—XHTML Examples", downloaded from http://web.archive.org/web/20020603200919/http://www.javascriptkit.com/howto/xhtml_intro4.shtml, published Jun. 3, 2002, pp. 1-3.

"Case Study: Converting Word Into XML", YAWC Pro, 1 pg.

"Case Study: Maintaining Websites with Microsoft Word", YAWC Pro, 1 pg.

"Case Study: Publishing Content to the Web and Mobile Phones", YAWC Pro., 1 pg.

"Case Study: Typesetting XML with QuarkXPress", YAWC Pro, 1 pg.

"Creating DocBook Documents", Aug. 2, 2001, pp. 1 and 16, http://web.archive.org/web/20020615124747/www.docbook.org/tdg/en/html/ch02.html.

"Introduction to XML" University of Washington Computing and Communications, copyright 1999, on the Internet as of Jun. 24, 2001, downloaded from http://web.archive.org/web/20010624123830/http://www.washington.edu/computing/training/540/xml_well.html, 1 pg.

"Star Office XML File Format Working Draft", Sun Microsystems, Inc., pp. 57, 59.

"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.

"XML Schema Part 1: Structures", W3C Recommendation, May 2, 2001, downloaded from http://www.w3.org/TR2001/REC-xmlschema-1-20010502/, pp. 1-19.

"YAWC Pro 1.0 Installation & User Guide", pp. 1-11.

Alschuler, Liora, "Getting the Tags In: Vendors Grapple With XML-Authoring, Editing and Cleanup", Seybold Report on Internet Publishing, vol. 5, No. 6, Feb. 2001, pp. 1-6.

Altamura et al., "Transforming paper documents into XML format with WISDOM++", Nov. 7, 2000, IJDAR, pp. 6-12.

Altova Inc. & Altova GmbH, "XML Spy 4.0 Manual," copyright 1998-2001, published Sep. 9, 2001, pp. 1-401.

Cagle et al., "Professional XSL", Wrox Press Ltd., 2001, cover and copyright pages and pp. 9-21.

Case Western Reserve University (CRWU), "Introduction to HTML", Case Western Reserve University and Eric A. Meyer, Mar. 4, 2000, downloaded from web.archive.org/web/20000304042655/http://www.cwru.edu/help/introHTML/toc.html, downloaded pp. 1-157.

Castro, E., "XML for the World Wide Web, Visual Quickstart Guide", Peachpit Press, 2001, p. 245.

Castro, Elizabeth, "XML for the World Wide Web: Visual QuickStart Guide," Oct. 23, 2000, Peachpit Press, pp. 1-6.

Chiyoung Seo et al.; An efficient inverted index technique for XML documents using RDBMS; Received Jan. 16, 2002; Information and Software Technology 43 (2003), Jun. 1, 2002; pp. 11-22.

Dan Frakes, "Crowd Control (Secrets)", Jun. 1, 2002, MacWorld, vol. 19, No. 6, p. 102.

Danny Heijl; The Delphi XML SAX2 Component & MSXML 3.10; Dr. Dobb's Journal, Sep. 2001; pp. 42-54.

David Eisenberg, "Using XSL Formatting Objects", Jan. 17, 2001, pp. 1a and 1, http://www.xml.com/pub/a/2001/01/17/xsl-fo/index.html?page=2.

Dzuba, Vassili, "Majix 1.0: A Word to XML Converter", downloaded from http://xml.coverpages.org/majix10Ann.html, Oct. 6, 1998, pp. 1-2.

Glenn, Walter, "Word 2000 in a Nutshell", O'Reilly & Associates, Inc., Aug. 2000, cover, copyright, and sections 16.4 and 16.3, downloaded pp. 1-8.

Harold, Rusty Elliotte, "XML Bible", IDG Books Worldwide, 1999, pp. 369-388.

Harold, Rusty Elliotte, "XML Bible", IDG Books Worldwide, 1999, title page, copyright page, and pp. 1-15, 95-132, 191-200, 333-336, 352-360, and 433-567.

HV, Ltd., "WorX Standard Edition (SE) 'XML Authoring Made Easy'," HyperVision, Ltd., published on the Internet as of Jun. 3, 2001 as a PDF file linked to http://web.archive.org/web/20010603152210/www.hvltd.com/default.asp?name=- information/xml/worxseOverview.xml&display=information/xsl/default.xsl, pp. 1-9—No Copy Available, Dead Link.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf, pp. 1-29.

Infinity-Loop, Web Site Home Page, re: infinity-loop, Apr. 20, 2001, 1 pg.

J. Geigel et al., "Automatic Page Layout Using Genetic Algorithms for Electronic Albuming", Proceedings of Electronic Imaging Jan. 21-26, 2001 12 pgs.

James E. Powell, "Microsoft Office Beta 2 on the Horizon", WinMag.com, Nov. 3, 2000.

Jeong, Euna et al., "Semistructured Data: Induction of Integrated View for XML Data With Heterogeneous DTDs", Proceedings of the Tenth International Conference on Information and Knowledge Management, Oct. 2001, pp. 151-158.

John Lombardi, "Word Pro Excels at 'Team' Work", Info World, Jan. 8, 1996, p. 86.

Jon Bosak, "XML: The Universal Publishing Format", 1998, pp. 1-2.

Jon Udell, "Getting Traction", Jul. 12, 2002.

JP Morgenthal; XML for Data Integration; EAI Journal, Oct. 2001; pp. 13-14, 16.

Juran, J., "MML: The Modest Markup Language", Oct. 22, 2000, downloaded pp. 1-15.

Kathy Yakal, "Elegant Document Distribution", Computer Shopper, Nov. 1995, pp. 1-2.

Klink et al., "Document Structure Analysis Based on Layout and Textual Features", Sep. 25, 2000, DFKI, pp. 1a, 3, 4, and 11.

Lemay, Laura, "Teach Yourself Web Publishing with HTML 4 in 14 Days, Professional Reference Edition", Second Edition, Sams.net Publishing, 1997, pp. 778-789.

Liberty, J. et al., "XML Web Documents from Scratch", Que Corporation, Mar. 10, 2000, cover, copyright, chapters 1 and 2, downloaded pp. 1-16.

Liefke, Harmut et al., "Xmill: An Efficient Compressor for XML Data", SCM SIGMOD Record, vol. 29, Issue 2, May 2000, pp. 153-164.

M. Fernandez et al., "Advanced Technology Seminar," p. 323 (Feb. 21, 2002).

M. Fernandez and S. Amer-Yahia; Advanced Technology Seminar 2—Techniques for Storing XML; pp. 323, 774-776.

M. Kirjavainen, "XML Browsers", http://mia.ece.uic.edu/~papers/WWW/MultimedicaStandards/XML_browsers.pdf, last accessed Mar. 14, 2005, 16 pgs.

M. Schrage, "Proxima, A presentation-oriented editor for structured documents", IPA, ISBN 12-345-6789-0, Jun. 4, 1973, pp. 1-186.

Mansfield, Ron, "Mastering Word 97 Fourth Edition", 1997, Sybex, pp. 221-222, 271-273, 278, 280, 283-284, 325-330, 539-540, 1015.

Mathias Neumuller and John N. Wilson; Improving XML Processing Using Adapted Data Structures; Oct. 7-10, 2002; pp. 206-220.

McGrath, Robert, "Representing "Binary" Data in XML", downloaded from http://ndf.ncsa.uiuc.edu/HDF5/XML/tools/binary.html, Mar. 2001, pp. 1-4.

Michael Champion; Storing XML in Databases; EAI Journal, Oct. 2001; pp. 53-55.

Michael Floyd, "Debugging XML Applications", Aug. 2000, www.webtechniques.com, pp. 79-81.

Microsoft, "Microsoft Word 2000", 1999, Microsoft, Screenshots 1-7, pp. 1-2.

Milbery, J., "WorX SE", XML Journal, published Feb. 4, 2001, downloaded from http://xml.sys-con.com/read/40149.htm, downloaded pp. 1-5.

Moseley, Lonnie et al., "Mastering Microsoft Office 97 Professional Edition", Sybex, 1996, pp. 87, 94-98, 103-105, 165-179, 1114-1115.

Munro, J., "StarOffice 6.0 Lives Up to its Name", PCMAG.com, May 23, 2002, www.pcmag.com/print_article2/0,1217,a=27287,00.asp, downloaded pp. 1-3.

Novak, U. et al., "Experimental XSLT Processor for Objects", Proceedings of the JASTED Int'l Conf. On Applied Informatics, Feb. 2002, pp. 277-282.

Oliver Meyer, "Creating Validated XML Documents on the Fly Using MS Word", Oct. 20, 2002, pp. 113-121.

O'Reilly, "HTML & XHTML The Definitive Guide," 4th Edition, Copyright 2000, pp. 1-6, http://oreilly.jungles.ru/webdesign/xhtml/ch16_03.htm.

Patrick Marshall, "DocuShare 2.0 Makes Web Document Management Work", Sep. 27, 1999.

Pradeep Jain; "Creating XML from Microsoft Word: The Challenges", Dec. 3-8, 2000, pp. 136-144.

Ray, Erik T., "Learning XML", O'Reilly & Associates, Inc., Jan. 2001, cover, copyright, and Chapter 5 downloaded pp. 1-25.

Robert D. Cameron; REX: XML shallow parsing with regular expressions; Markup Languages: Theory & Practice 1.3, Summer 1999; pp. 61-88.

Rodriguez, M., "XML: Twig", xmltwig.com, copyright 2003, downloaded pp. 1-4, web.archive.org/web/20030422002120/http://www.xmltwig.com/xmltwig/tools/xml_spellcheck.

Rohr, Paul, "RE: Styles Again", downloaded from http://www.abisource.org/mailinglists/abiword-dev/01/May/0561.html, May 2001, pp. 1-2.

Rusty Elliotte, "XML Bible", IDG Books Worldwide, Inc., 1999, pp. 1-12, 120-127, 333-335.

Schmelzer, Ronald, "ZapThink Briefing Note—HyperVision—Automating Valid XML Document Creating Within Microsoft Word", ZapThink LLC, Feb. 8, 2002, pp. 1-6.

Scott Boggan and Micael De Laurentis, A System for Matching static or distortable fonts; May 1994; pp. 1-9; http://www.byte.com/art/940/sec12/art1.htm.

Sihem Amer-Yahia, Mary Fernandez, Divesh Srivastava and Yu Xu; PIX: A System for Phrase Matching in XML Documents: A Demonstration; 2003 IEEE; pp. 774-776.

Simpson, J., "Just XML", Prentice Hall, Second Edition, 2001, cover, copyright page, and p. 31.

Sklar, D., "The Annotated Rainbow DTD, Rainbow Version 2.5", Electronic Book Technologies, Inc., Feb. 8, 1995, pp. 1-12.

Star Office XML File Format Working Draft, Sun Microsystems, Inc., pp. 1, 19, and 196.

Sun Microsystems, "StarOffice XML File Format Working Draft", Jan. 2001, Draft 10, pp. 19, 89, 142, and 234, http://web.archive.org/web/20010603030227/xml.openoffice.org/xml_specification_draft.pdf.

Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.

Sun Microsystems, "StarOffice XML File Format Working Draft", Jan. 2001, Draft 10, pp. 48, 49, 51, 54-58.

Sun Microsystems, "The OpenOffice.org Source Project", Sun Microsystems, Inc., 2000, downloaded pp. 1-34.

Surajit Chaudhuri and Kyuseok Shim; Storage and Retrieval of XML Data using Relational Databases; Advanced Technology Seminar 4; Abstract; Mar. 5, 2003; p. 802.

Tetrasix, "Welcome to Tetrasix Web Site", re: MajiX, Apr. 18, 2001, downloaded pp. 1-3.

Torsten Grabs et al.; XMLTM: Efficient Transaction Management for XML Documents; CIKM'02, Nov. 4-9, 2002; pp. 142-152.

Ullas Nambiar et al.; Efficient XML Data Management: An Analysis; EC-Web 2002, LNCS 2455; pp. 87-98.

Unicode Inc., "Unicode Technical Reports", Sep. 21, 2002, pp. 1, 2, 638, 642, and 644.

University of Georgia Center for Continuing Education, "Exploring the World-Wide Web, Hypertext Markup Language", Feb. 24, 1999, downloaded pp. 1-7.

Uros Novak et al., "Experimental XSLT Processor for Objects", Proceedings of the IASTED International Conference, Applied Informatics, Feb. 18-21, 2002, pp. 277-282.

V. Turau, "Making legacy data accessible for XML applications", University of Applied Sciences, Department of Computer Science, Wiesbaden, Germany, 1999, pp. 1-11.

Volkan Atalay and Erkan Arslan; An SGML Based Viewer for Form Documents; 1999 IEEE Jul. 1999; pp. 201-204.

W. Wadge, "Intentional Markup Language", Proceedings of the Third International Workshop, DCW 2000, Quebec City, Canada, Jun. 19-21, 2000, pp. 82-89.

W3C, "XML Schema Part 0: Primer", W3C Recommendation, May 2, 2001, downloaded pp. 1-67.

W3C, "XML Schema Requirements", W3C Note, Feb. 15, 1999, downloaded from www.w3.org/TR/NOTE-xml-schema-req, pp. 1-5.

W3C, Fonts, Jan. 24, 2001, W3C, pp. 1-4, http://web.archive.org/web/20010124044900/ ttp://www13.w3.org/TR/REC-CSS2/fonts.html#matching.

Watchorn, H. et al., "Word and XML: Making the 'Twain Meet'", XML Europe 2001, papers, May 2001, downloaded pp. 1-11.

WayBack Machine, Feb. 15, 2006, p. 1, http://web.archive.org/web/*/http://www.w3.org/TR/REC-CSS2/fonts.html—No Copy Available, Dead Link.

Wen, Howard, "AbiWord: Open Source's Answer to Microsoft Word", Linux Dev Center, downloaded from http://www.linuxdevcenter.com/lpt/a/1636, Mar. 14, 2002, pp. 1-3.

White, B. et al., "Standard Structural Elements" from "Web Content Accessibility Tips and Tricks", May 1, 2001, downloaded pp. 1-4.

Xin Zhang et al.; Clock: Synchronizing Internal Relational Storage with External XML Documents; 2001 IEEE Jun. 2001; pp. 111-118.

Xmetal 1.0, Webreference.com, Oct. 29, 1999, downloaded pp. 1-2, www.webreference.com/html/watch/xmetal/5.html.

XML Workshop, Ltd., "Word to XML Converters", Mar. 7, 2003, downloaded pp. 1-2.

Y. Ishitani, "Document Transformation System from Papers to XML Data Based on Pivot XML Document Method", IEEE Computer Society, Seventh International Conference on Document Analysis and Recognition, 6 pgs., Aug. 3-6, 2003.

YAWC Pro, "Welcome to YAWC Pro", Dec. 11, 2001, 1 pg.

"AbiWord", http://en.wikipedia.org/wiki/AbiWord>, Oct. 19, 2005, 2 pgs.

Walther, P., "XML Dokumente in Microsoft Word mit neuem Produkt der struktur AG kostenlos testen", http://www.contentmanager.de/magazine/news_h2695_xml_dokumente_in_microsoft_word_mit_neuem.html>, Jun. 5, 2002, 2 pgs.

Chipr, "AbiWord—Word Processing For Everyone", http://www.kuro5hin.org/?op=displaystory;sid=2002/4/22/22406/9615>, Apr. 23, 2002, 8 pgs.

"Introduction to AbiWord", http://web.archive.org/web/20010608211934/www.abisource.com/help/en-US/index.htm, Jun. 8, 2001, 3 pgs.

"XML Schema for AbiWord Markup Language", http://www.abisource.com/awml.xsd>, Apr. 27, 2000, 3 pgs.

\* cited by examiner

- ❖ Document
  - ➢ Document Props
    - ▪ Information such as Compatibility and Root Element
  - ➢ Information Props
    - ▪ Author Name; Date Created; Modified, Custom Properties, etc.
  - ➢ Other Props
    - ▪ Properties for just about every element. Possible properties elements include: Document Props; Information Props; Character Props; Paragraph Props; Table Props; Section Props; and Object Props.
  - ➢ Styles
    - ▪ List Styles
      - • Information on a list. This includes the formatting at different list levels, the type of list, and any other information needed for a list.
    - ▪ Char Styles
      - • Information specific to text. For example, font information, shading, etc., that is related to the text.
    - ▪ Paragraph Styles
      - • Usually have Character Properties, as well as Paragraph Properties.
    - ▪ Table Styles
      - • Information specific to the design of the table, including information such as banding, etc.
  - ➢ Body of Word Processing Document
    - ▪ Section Props
      - • Information such as page layout, footer & header info, and other information specific to that section.
    - ▪ Section
      - • Paragraph (Style Name & List FO & List Level)
        - ♦ Properties
          - ➢ Paragraph Props
            - ▪ Indents, margins, shading, borders, and the like.
          - ➢ Character Props
            - ▪ Paragraph's font, color, etc.
        - ♦ Text Run (Character Style Name)
          - ➢ Properties
            - ▪ Character Props
          - ➢ Text
            - ▪ Text Content of Document
          - ➢ Images / Objects
        - ♦ Paragraph Mark
          - ➢ Represents the paragraph mark that can include character properties.
        - ♦ Bookmarks
          - ➢ Bookmark Begin (ID)
          - ➢ Bookmark End (ID)
      - • Table
        - ♦ Properties
          - ➢ Table Props
            - ▪ Information such as borders; width; and grid units
            - ▪ The Grid Units of the table may be referenced by the cells to get the cells width.
          - ➢ Table Row
            - ▪ Table Cell
              - • Paragraph

*Fig. 4*

WORD-PROCESSING DOCUMENT STORED IN A SINGLE XML FILE THAT MAY BE MANIPULATED BY APPLICATIONS THAT UNDERSTAND XML

RELATED APPLICATIONS

This application is a continuation of application Ser. No. 10/187,060, filed Jun. 28, 2002, which application is incorporated herein by reference.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

Typically, word-processing documents are not understandable by external applications unless those applications are familiar with the specific structure of the document. This makes it very difficult for applications to manipulate the word-processing documents without extensive knowledge of the application. What is needed is a way to easily manipulate, create, and display documents associated with a word-processor.

SUMMARY OF THE INVENTION

The present invention is directed at providing a word-processing document in a native XML file format that may be understood by an application that understands XML, or to enable another application or service to create a rich document in XML so that the word-processing application can open it as if it was one of its own documents.

According to one aspect of the invention, a word-processor has a native XML file format. The well formed XML file fully represents the word-processor document, and fully supports the word-processor's rich formatting. Accordingly, one of the goals of such a native XML representation is have no feature losses when saving the word-processor documents in XML according to a defined XSD.

According to another aspect of the invention, there is a published XSD file that defines all the rules behind the word-processor's XML file format. The schema describes the word-processor's XML structure. The schema file mirrors the internal word-processor program while still allowing ease of use. Thus, the schema enables third party services and applications to create XML documents understandable by the word processing application.

According to yet another aspect of the invention, hints are provided within the XML associated files providing applications that understand XML a shortcut to understanding some of the features provided by the word-processor. By using the hints, the applications do not have to know all of the specific details of the internal processing of the word-processor in order to recreate a feature.

According to yet another aspect of the invention, the word-processing document is stored in a single XML file. An application will be able to fully recreate the document from this single XML file. This includes all the images and other binary data that may be present in the document. The invention provides for a way to represent all document data in a single XML file.

According to still yet another aspect of the invention, manipulation of word-processing documents may be done on computing devices that do not include the word-processor itself.

BRIEF DESCRIPTION OF THE DRAWINGS

FIG. 4 shows a tree view of an exemplary word-processor XML document;

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in an HTML document, the ML tends to specify the text's structural function (e.g., heading, paragraph, etc.)

The terms "word-processor markup language" or "WPML" refers to markup language elements that are associated with a word-processor application and a schema associated with the word-processor application. This type of ML or schema is also often called the word-processor's "native" schema or markup.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
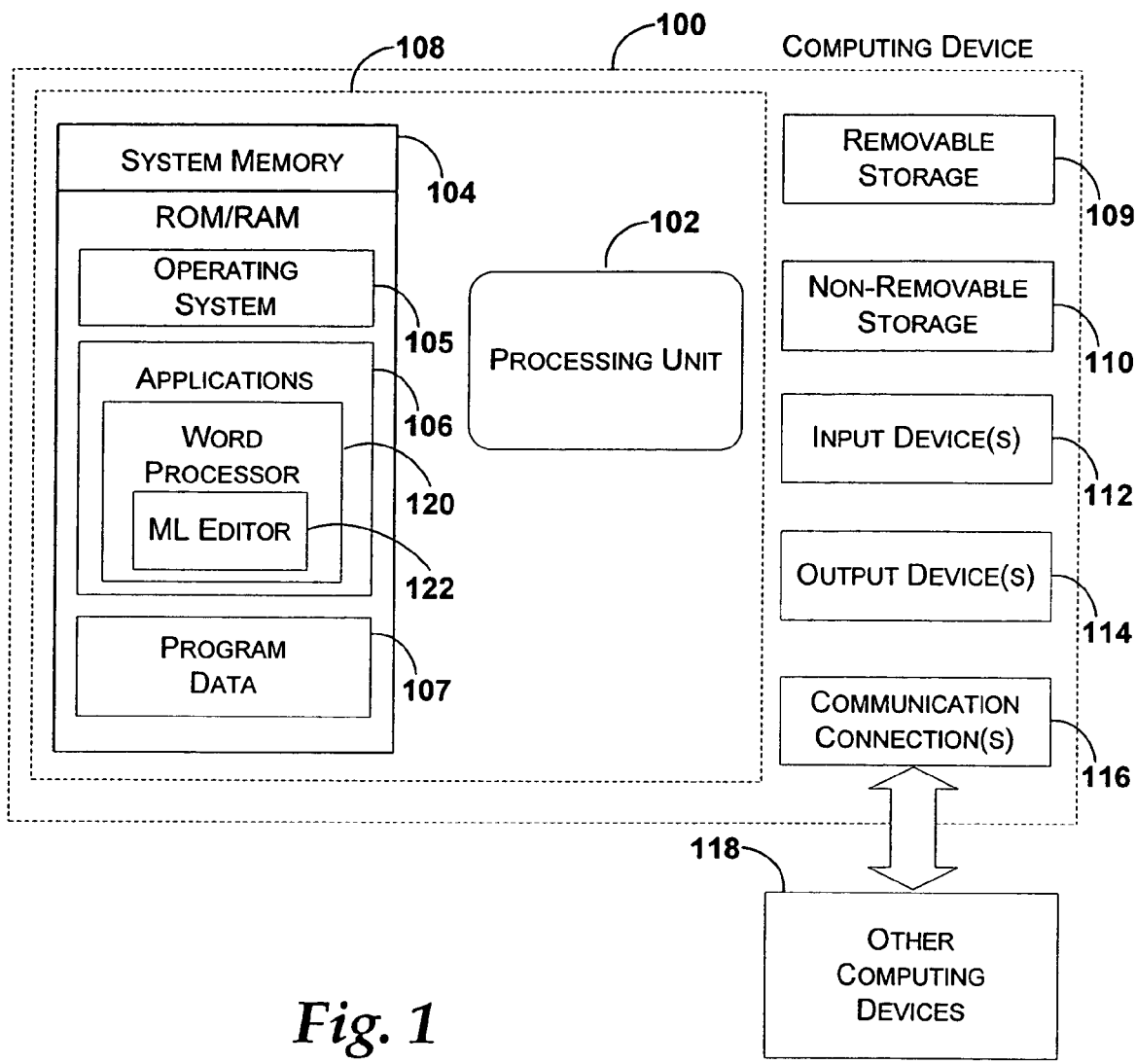
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes ML editor 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Word-Processor File Structure

Figure 2:
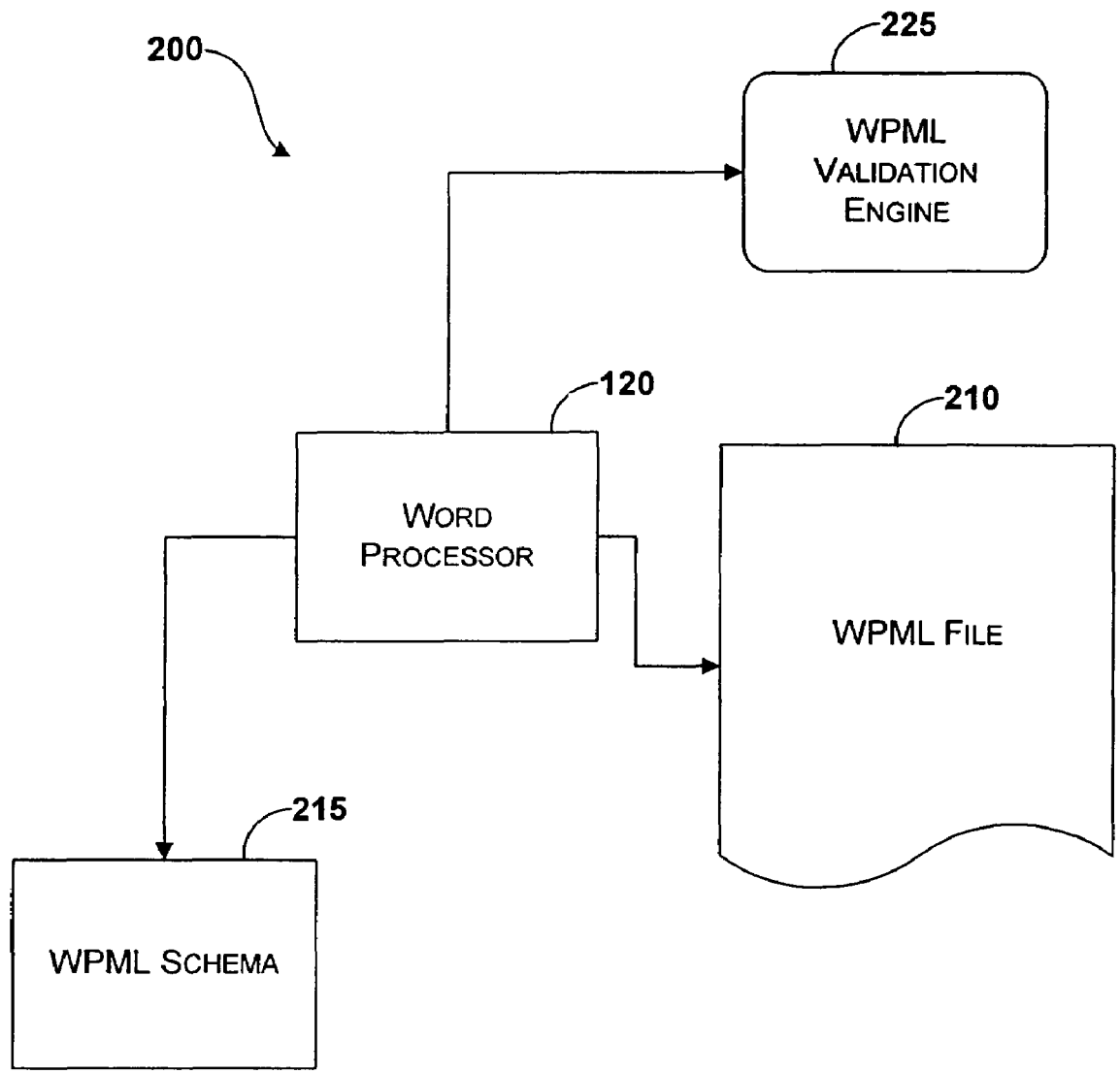
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, WPML file 210, WPML Schema 215, and WPML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native markup language, a Word-Processor Mark-up Language (WPML). The WPML is supported by word-processor 120 and may adhere to the rules of other markup languages, such as XML, while creating further rules of its own. A WPML provides a markup language that includes rich display information that a user can solicit without the need to spend time creating the schema corresponding to the display information.

Word-processor 120 internally validates WPML file 210. When validated, the WPML elements are examined as to whether they conform to the WPML schema 215. As previously described above, a schema states what tags and attributes are used to describe content in an ML document, where each tag is allowed, and which tags can appear within other tags, ensuring that the documentation is structured the same way. Accordingly, WPML 210 is valid when structured as set forth in arbitrary WPML schema 215.

WPML validation engine 225 operates similarly to other available validation engines for ML documents. WPML validation engine 225 evaluates WPML that is in the format of the WPML validation engine 225. For example, XML elements are forwarded to an XML validation engine. In one embodiment, a greater number of validation engines may be associated with word-processor 120 for validating a greater number of ML formats.

Figure 3:
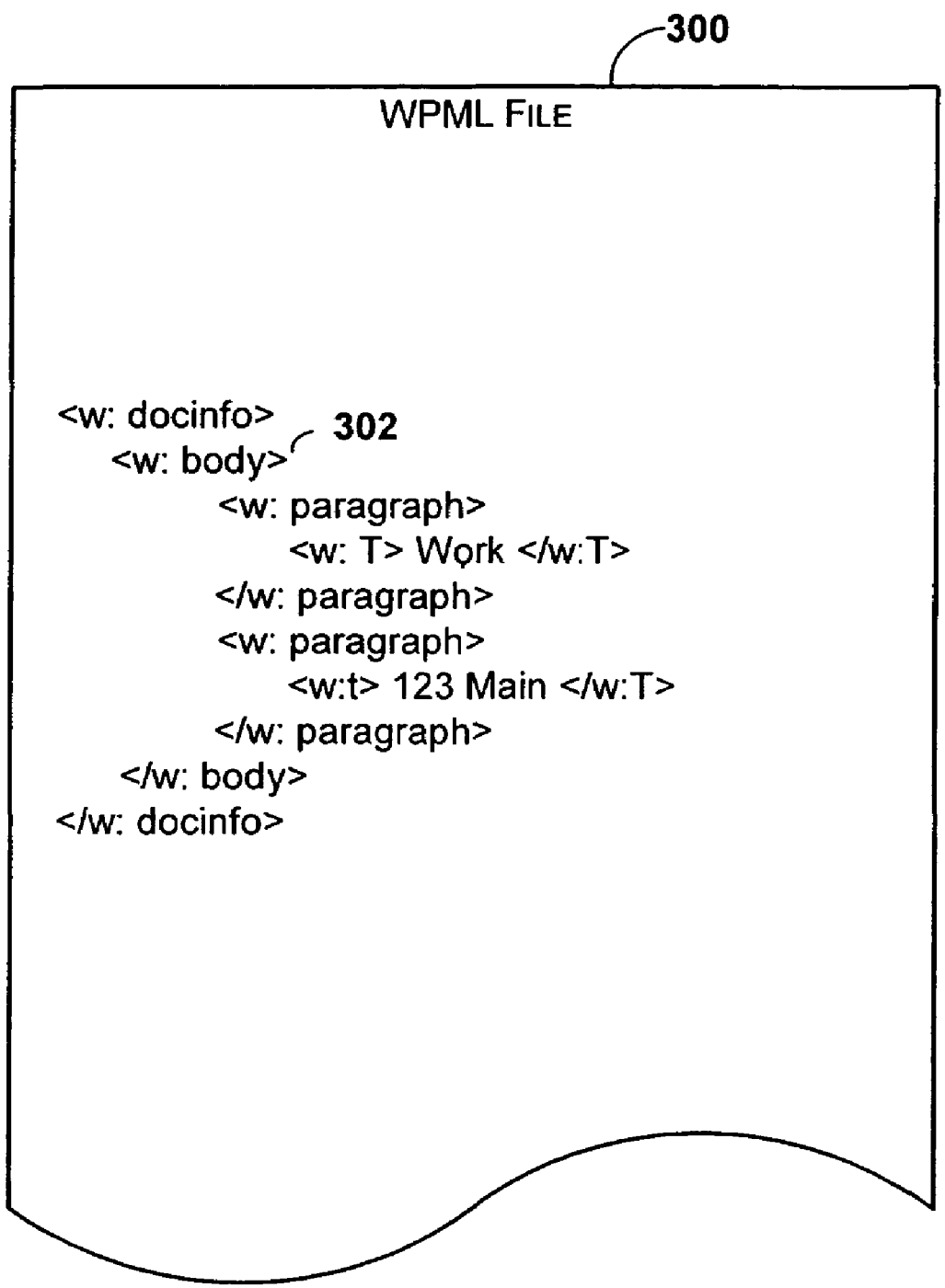
FIG. 3 shows an exemplary WPML file.

FIG. 3 illustrates an exemplary WPML file in accordance with the present invention. WPML file 300 includes WPML elements. An element in a markup language usually includes an opening tag (indicated by a "<" and ">"), some content, and a closing tag (indicated by a "</" and ">"). In this example, tags associated with WPML include a "w:" within the tag (e.g., 302). The "w:" prefix is used as shorthand notation for the namespace associated with the element.

There are enough WPML elements for an application that understands XML to fully recreate the document from this single XML file. Hint tags may also be included that provide information to an application to help understand the content of the file. For a more complete description of the WPML used according to one embodiment of the invention, please see the description below. An exemplary WPML file that is more detailed is also discussed below.

The text contained within the document follows the "T" tag, making it easy for an application to extract the text content from a word-processing document created in accordance with aspects of the invention. Given that the example shown is valid, WPML file 210 produces a document with a body and two paragraphs that include the text "Work" in the first paragraph and "123 Main" in the second paragraph.

FIG. 4 illustrates a tree view of a word-processor document, according to aspects of the invention. The first fields within the XML document relate to document information and properties.

For example, document statistics information may be stored. This information may include, but is not limited to, title, subject, author, manager, company, category, keywords. The information may also relate do document statistics such as creation date, modification date, last access date, last print date, number of pages, words, lines, characters, and the like. Custom properties may also be stored.

According to one embodiment of the invention, all of the fonts are defined up front. The font information includes the supporting font information.

Similarly, styles, tables, numbering, and the like are defined. The styles fields include formatting at different list levels, the type of list, and any other information needed for a list. Paragraphs contained within the XML document may point at list styles are they may default to a style.

The character style contains information that relates to the text within the word-processing document. For example the character style may include properties relating to the font style, size, color, underline style, text effects, scaling, spacing, keying, and the like. Any character property defined by the word-processor maybe included. The text of the word-processing document ("text runs") point to the styles to define how the text should be displayed. A hint may also be provided that helps an application display the text.

The paragraph style generally includes character properties as well as paragraph properties. Paragraph properties may include paragraph alignment, outline level, indentation, spacing before and after the paragraph, line spacing, pagination properties, and the like. The paragraph section may include information such as the style name of the paragraph, the list information, and the like.

Table styles will contain a lot of information specific to the design of the table. This will include information such as banding, etc. Table properties include information such borders; width; and grid units. The Grid Units of the table is referenced by the cells to get their width.

The text node contains the actual content of the document. All of the text for the word-processing document is stored within this node. This feature makes it very easy to be able to just access the content of the document. All of the other elements may be ignored if all that is desired is the text.

Section properties contain information such as page layout, footer and header information, and other information specific to a section of the word-processor document.

The text run references the character style name as well as allowing properties.

Images and objects are within a Paragraph. Even floating ones are contained in a paragraph. When floating, this is where an anchor would appear. According to one embodiment of the invention, images are stored as a binary encoding. For an exemplary image stored as a binary encoding, please refer to the exemplary word processor file below.

Template information relating to the word processor may also be stored within the word processor document. According to one embodiment of the invention, the template information is stored as a binary encoding within the word processor document.

A paragraph mark element represents the paragraph mark. Since the paragraph mark itself can have formatting applied to it, we need to output an element to represent the paragraph mark that we can give character properties.

As can be seen by the exemplary layout of the file, an application may use as much, or as little of the information as it desires. If the application desires to recreate or create the document exactly as the word-processor would then there is sufficient information within the document to do so. If the application desires to minimally format the content, on the other hand, then the application may do that as well.

Figure 5:
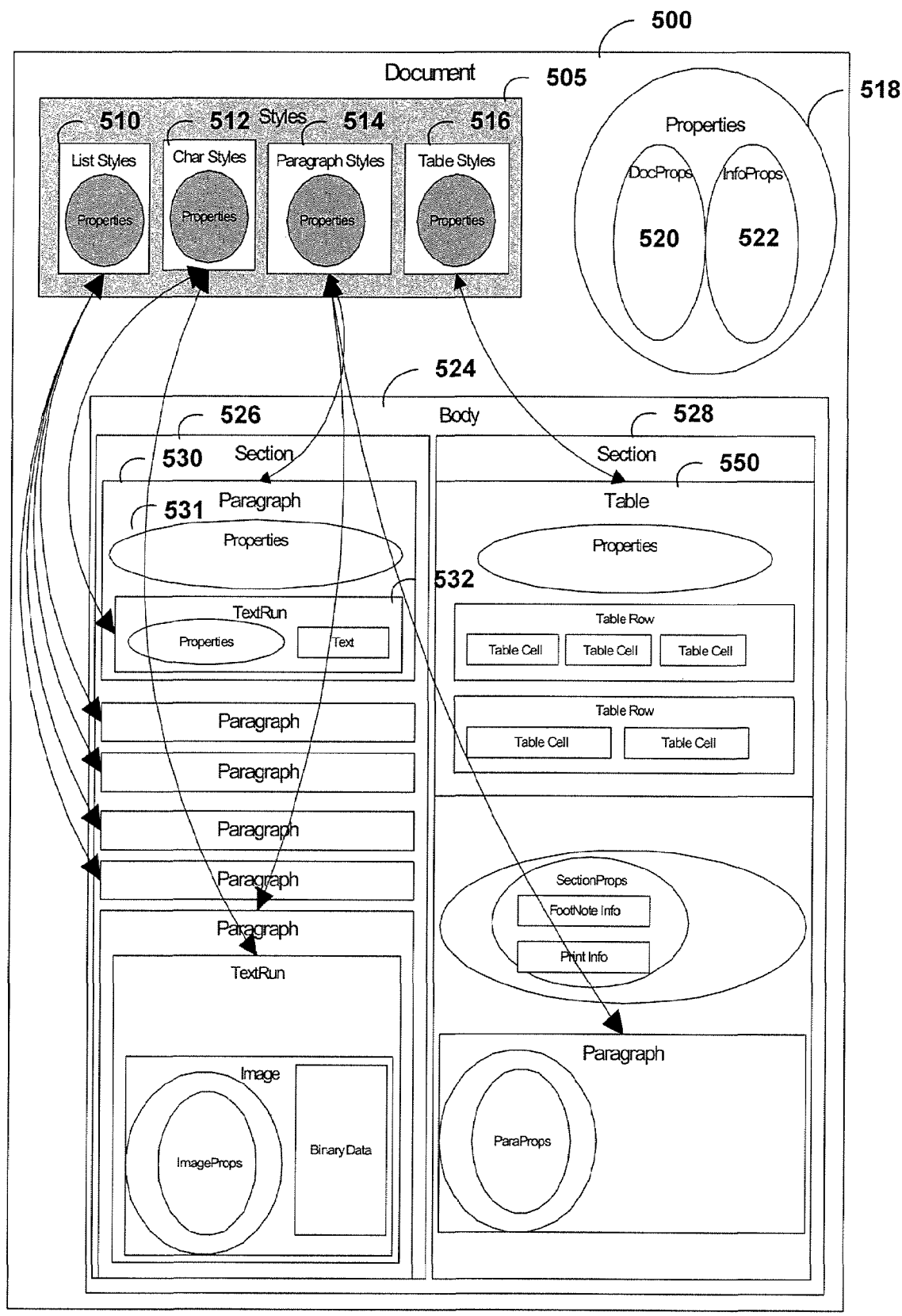
FIG. 5 illustrates a block diagram of an exemplary structure of a word-processor XML document.

FIG. 5 illustrates a block-diagram of a document 500, in accordance with aspects of the invention. Styles 505 include list styles 510, char styles 512, paragraph styles 514, and table styles 516. Properties 518 include document properties 520 and information properties 522. Body 524 includes exemplary section 526 and exemplary section 528. Section 526 includes paragraph 530 that includes specific property information 531 and text run 532. As can be seen, the text runs may include properties and the text or possibly an image or an object.

Exemplary section 528 includes table 550 that includes properties relating to the table and a definition of the table rows and the cells contained within the table. The sections may also include information relating to the footnotes, print information and the like.

Different parts of the document may refer to the styles (505) to define how the element will be displayed. For example, as illustrated within the figure, some paragraphs may refer to list styles 510 or paragraph styles 514. Text runs refer to char styles 512, and tables may refer to table styles 516.

The word-processor document includes all of the information within the document that allows it to be recreated an application.

Other information may also be included within the document that is not needed by the word-processing program. According to one embodiment of the invention a "hints" element is included that allows external programs to easily be able to recognize what a particular element is, or how to recreate the element. For example, a specific number format may be in a list and used by the external program to recreate the document without knowing the specifics of the style.

Figure 6:
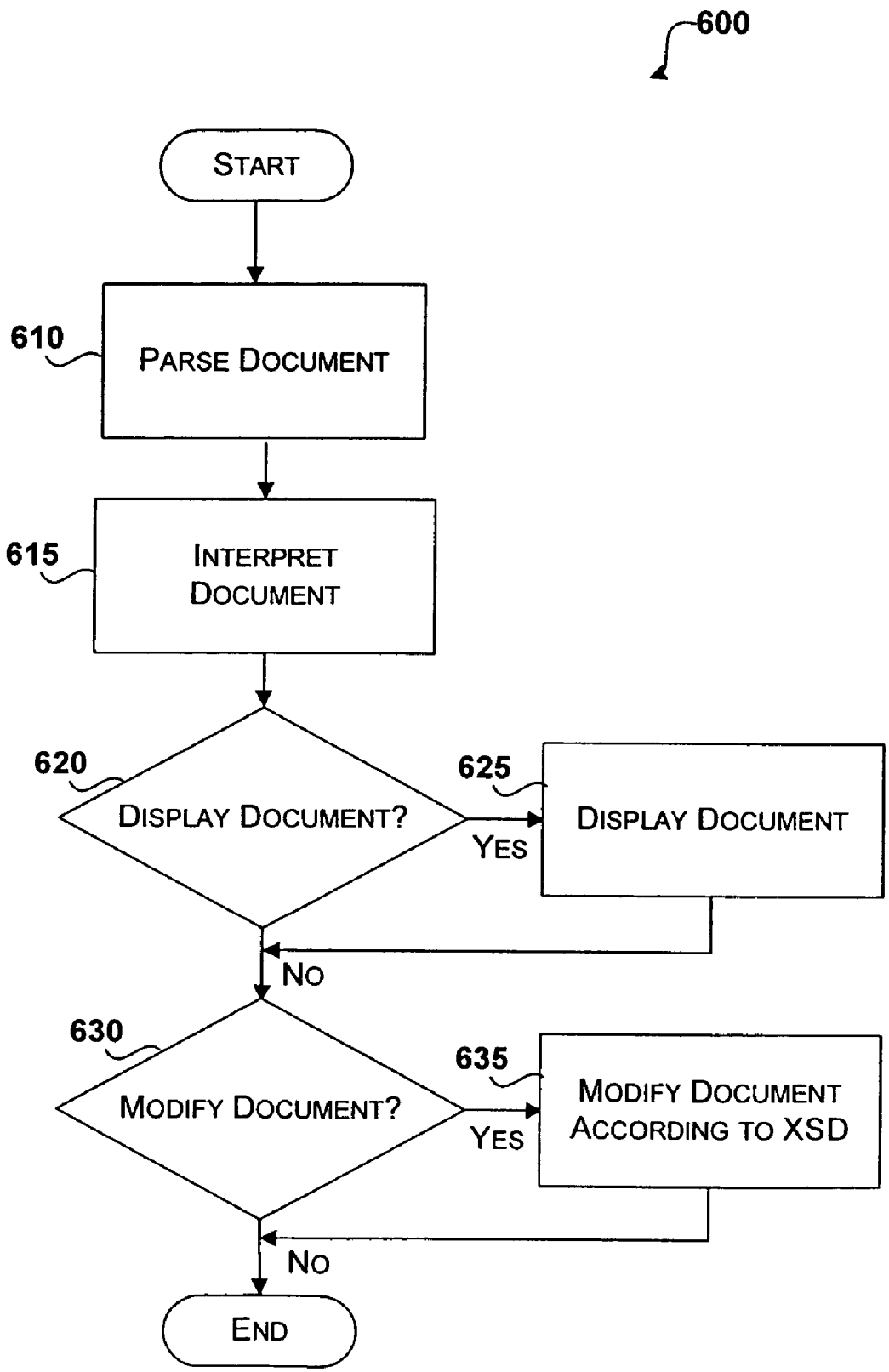
FIG. 6 illustrates a process flow for interpreting a word-processor document; in accordance with aspects of the present invention.

FIG. 6 illustrates a process 600 flow for intrepreting a word-processor document, in accordance with aspects of the invention. After a start block, the process moves to block 610, at which point the word-processor document is parsed. The parsing may include looking at the entire document, or only at specific portions of the document. For example, one application may parse the document for text only, another application may parse the document for text and images, whereas another document may desire the entire rich content within the document.

Flowing to block 615, the document is interpreted according to the published XSD. The XSD defines how to interpret the XML document created by the word-processor.

At decision block 620, a determination is made as to whether to display the document. When the document is to be displayed the process moves to block 625 where the document is displayed. The document may be displayed to a user for editing or some other purposes. When the document is not to be displayed, the process moves to decision block 630.

At decision block 630, a determination is made as to whether to modify the document. The document may be modified by a user or by the application itself with no user interaction. The document may be modified for many reasons. For example, additional text may be added or deleted, a portion of the document may be formatted differently, an image may be added, and the like. When the document is to be modified the process moves to block 635 where the document is modified. The document is modified in accordance with an XSD that defines all of the information needed to create a word-processor document. An exemplary XSD is described below.

As a further illustration of an exemplary word-processor document, the following is a word-processor document created in accordance with aspects of the present invention. According to one embodiment of the invention, the word-processor document is stored as a single XML document.

```xml
<?xml version="1.0" encoding="UTF-8" standalone="no" ?>
<?mso-application progid="Word.Document"?>
<w:WordDocument xmlns:w="schemas-microsoft:Microsoft.Word.XML.Document.1.0" xmlns:v="urn:schemas-microsoft-com:vml" xmlns:w10="urn:schemas-microsoft-com:office:word" xmlns:SL="schemas-microsoft-schemaLibrary" xmlns:aml="urn:aml-core" xmlns:WX="urn:schemas-microsoft-com:office:word:aux" xmlns:o="urn:schemas-microsoft-com:office:office" xmlns:US0="resume-schema" xml:space="preserve">
    <w:docInfo>
        <w:Title w:val="The quick brown fox jumps over the lazy dog" />
        <w:Author w:val="Brian Jones" />
        <w:Template w:val="Normal.dot" />
        <w:LastAuthor w:val="Brian Jones" />
        <w:Revision w:val="13" />
        <w:AppName w:val="Microsoft Word 11.0" />
        <w:TotalEdit w:val="34" />
        <w:Created w:val="2002-04-10T20:26:00Z" />
        <w:LastSaved w:val="2002-04-10T21:17:00Z" />
        <w:Pages w:val="1" />
        <w:Words w:val="138" />
        <w:Characters w:val="566" />
        <w:Company w:val="Microsoft Corp." />
        <w:Lines w:val="12" WX:estimate="true" />
        <w:Paras w:val="7" WX:estimate="true" />
        <w:CharactersWithSpaces w:val="697" WX:estimate="true" />
        <w:Version w:val="11.4004" />
        <w:CustomProp w:name="Solution ID" w:type="string" w:val="None" />
    </w:docInfo>
    <w:docPr>
        <w:View w:val="web" />
```

```xml
<w:DoNotEmbedSystemFonts />
<w:ProofState w:spelling="clean" w:grammar="clean" />
<w:DefaultTabStop w:val="720" />
<w:DefaultFonts w:ascii="Times New Roman" w:fareast="MS Mincho" w:hansi="Times New Roman" w:cs="Times New Roman" />
<w:SummaryLength w:val="0" />
<w:CharacterSpacingControl w:val="DontCompress" />
<w:BrowserLevelIE4 />
<w:ValidateAgainstSchema />
<w:SaveInvalidXML />
<w:compat>
  <w:BreakWrappedTables />
  <w:SnapToGridInCell />
  <w:WrapTextWithPunct />
  <w:UseAsianBreakRules />
  <w:UseFELayout />
    </w:compat>
    </w:docPr>
<w:fonts>
<w:font w:name="MS Mincho">
  <w:AltName w:val="ＭＳ 明朝" />
  <w:Panose-1 w:val="02020609040205080304" />
  <w:Charset w:val="80" />
  <w:Family w:val="Modern" />
  <w:Pitch w:val="fixed" />
  <w:Sig w:usb-0="A00002BF" w:usb-1="68C7FCFB" w:usb-2="10" w:usb-3="0" w:csb-0="2009F" w:csb-1="0" />
    </w:font>
<w:font w:name="@MS Mincho">
  <w:Panose-1 w:val="02020609040205080304" />
  <w:Charset w:val="80" />
  <w:Family w:val="Modern" />
  <w:Pitch w:val="fixed" />
```

```xml
<w:Sig w:usb-0="A00002BF" w:usb-1="68C7FCFB" w:usb-2="10" w:usb-3="0"
    w:csb-0="2009F" w:csb-1="0" />
  </w:font>
- <w:font w:name="MS PGothic">
  <w:Panose-1 w:val="020B0600070205080204" />
  <w:Charset w:val="80" />
  <w:Family w:val="Swiss" />
  <w:Pitch w:val="variable" />
  <w:Sig w:usb-0="A00002BF" w:usb-1="68C7FCFB" w:usb-2="10" w:usb-3="0"
    w:csb-0="2009F" w:csb-1="0" />
  </w:font>
- <w:font w:name="@MS PGothic">
  <w:Panose-1 w:val="020B0600070205080204" />
  <w:Charset w:val="80" />
  <w:Family w:val="Swiss" />
  <w:Pitch w:val="variable" />
  <w:Sig w:usb-0="A00002BF" w:usb-1="68C7FCFB" w:usb-2="10" w:usb-3="0"
    w:csb-0="2009F" w:csb-1="0" />
  </w:font>
  </w:fonts>
- <w:lists>
- <w:listDef w:listDefId="0">
  <w:Lsid w:val="37E176E4" />
  <w:Plt w:val="Multilevel" />
  <w:Tmpl w:val="59EE7024" />
- <w:lvl w:ilvl="0">
  <w:Start w:val="1" />
  <w:LvlText w:val="%1." />
  <w:LvlJc w:val="left" />
- <w:pPr>
- <w:tabs>
  <w:Tab w:val="list" w:leader="none" w:pos="720" />
  </w:tabs>
```

```xml
        <w:Ind w:left="720" w:hanging="360" />
      </w:pPr>
    </w:lvl>
  <w:lvl w:ilvl="1">
    <w:Start w:val="1" />
    <w:Nfc w:val="4" />
    <w:LvlText w:val="%2." />
    <w:LvlJc w:val="left" />
    <w:pPr>
      <w:tabs>
        <w:Tab w:val="list" w:leader="none" w:pos="1440" />
      </w:tabs>
      <w:Ind w:left="1440" w:hanging="360" />
    </w:pPr>
  </w:lvl>
  <w:lvl w:ilvl="2">
    <w:Start w:val="1" />
    <w:Nfc w:val="2" />
    <w:LvlText w:val="%3." />
    <w:LvlJc w:val="right" />
    <w:pPr>
      <w:tabs>
        <w:Tab w:val="list" w:leader="none" w:pos="2160" />
      </w:tabs>
      <w:Ind w:left="2160" w:hanging="180" />
    </w:pPr>
  </w:lvl>
  <w:lvl w:ilvl="3">
    <w:Start w:val="1" />
    <w:LvlText w:val="%4." />
    <w:LvlJc w:val="left" />
    <w:pPr>
      <w:tabs>
```

```xml
<w:Tab w:val="list" w:leader="none" w:pos="2880" />
    </w:tabs>
<w:Ind w:left="2880" w:hanging="360" />
    </w:pPr>
    </w:lvl>
<w:lvl w:ilvl="4">
  <w:Start w:val="1" />
  <w:Nfc w:val="4" />
  <w:LvlText w:val="%5." />
  <w:LvlJc w:val="left" />
<w:pPr>
<w:tabs>
  <w:Tab w:val="list" w:leader="none" w:pos="3600" />
    </w:tabs>
<w:Ind w:left="3600" w:hanging="360" />
    </w:pPr>
    </w:lvl>
<w:lvl w:ilvl="5">
  <w:Start w:val="1" />
  <w:Nfc w:val="2" />
  <w:LvlText w:val="%6." />
  <w:LvlJc w:val="right" />
<w:pPr>
<w:tabs>
  <w:Tab w:val="list" w:leader="none" w:pos="4320" />
    </w:tabs>
<w:Ind w:left="4320" w:hanging="180" />
    </w:pPr>
    </w:lvl>
<w:lvl w:ilvl="6">
  <w:Start w:val="1" />
  <w:LvlText w:val="%7." />
  <w:LvlJc w:val="left" />
```

```xml
- <w:pPr>
- <w:tabs>
    <w:Tab w:val="list" w:leader="none" w:pos="5040" />
    </w:tabs>
    <w:Ind w:left="5040" w:hanging="360" />
    </w:pPr>
    </w:lvl>
- <w:lvl w:ilvl="7">
    <w:Start w:val="1" />
    <w:Nfc w:val="4" />
    <w:LvlText w:val="%8." />
    <w:LvlJc w:val="left" />
- <w:pPr>
- <w:tabs>
    <w:Tab w:val="list" w:leader="none" w:pos="5760" />
    </w:tabs>
    <w:Ind w:left="5760" w:hanging="360" />
    </w:pPr>
    </w:lvl>
- <w:lvl w:ilvl="8">
    <w:Start w:val="1" />
    <w:Nfc w:val="2" />
    <w:LvlText w:val="%9." />
    <w:LvlJc w:val="right" />
- <w:pPr>
- <w:tabs>
    <w:Tab w:val="list" w:leader="none" w:pos="6480" />
    </w:tabs>
    <w:Ind w:left="6480" w:hanging="180" />
    </w:pPr>
    </w:lvl>
    </w:listDef>
- <w:listDef w:listDefId="1">
```

```xml
<w:Lsid w:val="55C82593" />
<w:Plt w:val="Multilevel" />
<w:Tmpl w:val="4090023" />
<w:lvl w:ilvl="0">
  <w:Start w:val="1" />
  <w:Nfc w:val="1" />
  <w:PStyle w:val="Heading1" />
  <w:LvlText w:val="Article %1." />
  <w:LvlJc w:val="left" />
  <w:pPr>
    <w:tabs>
      <w:Tab w:val="list" w:leader="none" w:pos="1440" />
    </w:tabs>
    <w:Ind w:left="0" w:first-line="0" />
  </w:pPr>
</w:lvl>
<w:lvl w:ilvl="1">
  <w:Start w:val="1" />
  <w:Nfc w:val="22" />
  <w:PStyle w:val="Heading2" />
  <w:IsLgl />
  <w:LvlText w:val="Section %1.%2" />
  <w:LvlJc w:val="left" />
  <w:pPr>
    <w:tabs>
      <w:Tab w:val="list" w:leader="none" w:pos="1080" />
    </w:tabs>
    <w:Ind w:left="0" w:first-line="0" />
  </w:pPr>
</w:lvl>
<w:lvl w:ilvl="2">
  <w:Start w:val="1" />
  <w:Nfc w:val="4" />
```

```xml
<w:PStyle w:val="Heading3" />
<w:LvlText w:val="(%3)" />
<w:LvlJc w:val="left" />
<w:pPr>
<w:tabs>
<w:Tab w:val="list" w:leader="none" w:pos="720" />
</w:tabs>
<w:Ind w:left="720" w:hanging="432" />
</w:pPr>
</w:lvl>
<w:lvl w:ilvl="3">
<w:Start w:val="1" />
<w:Nfc w:val="2" />
<w:PStyle w:val="Heading4" />
<w:LvlText w:val="(%4)" />
<w:LvlJc w:val="right" />
<w:pPr>
<w:tabs>
<w:Tab w:val="list" w:leader="none" w:pos="864" />
</w:tabs>
<w:Ind w:left="864" w:hanging="144" />
</w:pPr>
</w:lvl>
<w:lvl w:ilvl="4">
<w:Start w:val="1" />
<w:PStyle w:val="Heading5" />
<w:LvlText w:val="%5)" />
<w:LvlJc w:val="left" />
<w:pPr>
<w:tabs>
<w:Tab w:val="list" w:leader="none" w:pos="1008" />
</w:tabs>
<w:Ind w:left="1008" w:hanging="432" />
```

```xml
      </w:pPr>
    </w:lvl>
  <w:lvl w:ilvl="5">
    <w:Start w:val="1" />
    <w:Nfc w:val="4" />
    <w:PStyle w:val="Heading6" />
    <w:LvlText w:val="%6)" />
    <w:LvlJc w:val="left" />
    <w:pPr>
      <w:tabs>
        <w:Tab w:val="list" w:leader="none" w:pos="1152" />
      </w:tabs>
      <w:Ind w:left="1152" w:hanging="432" />
    </w:pPr>
  </w:lvl>
  <w:lvl w:ilvl="6">
    <w:Start w:val="1" />
    <w:Nfc w:val="2" />
    <w:PStyle w:val="Heading7" />
    <w:LvlText w:val="%7)" />
    <w:LvlJc w:val="right" />
    <w:pPr>
      <w:tabs>
        <w:Tab w:val="list" w:leader="none" w:pos="1296" />
      </w:tabs>
      <w:Ind w:left="1296" w:hanging="288" />
    </w:pPr>
  </w:lvl>
  <w:lvl w:ilvl="7">
    <w:Start w:val="1" />
    <w:Nfc w:val="4" />
    <w:PStyle w:val="Heading8" />
    <w:LvlText w:val="%8." />
```

```xml
<w:LvlJc w:val="left" />
  <w:pPr>
    <w:tabs>
      <w:Tab w:val="list" w:leader="none" w:pos="1440" />
    </w:tabs>
    <w:Ind w:left="1440" w:hanging="432" />
  </w:pPr>
</w:lvl>
<w:lvl w:ilvl="8">
  <w:Start w:val="1" />
  <w:Nfc w:val="2" />
  <w:PStyle w:val="Heading9" />
  <w:LvlText w:val="%9." />
  <w:LvlJc w:val="right" />
  <w:pPr>
    <w:tabs>
      <w:Tab w:val="list" w:leader="none" w:pos="1584" />
    </w:tabs>
    <w:Ind w:left="1584" w:hanging="144" />
  </w:pPr>
</w:lvl>
</w:listDef>
<w:list w:ilfo="1">
  <w:Ilst w:val="1" />
</w:list>
<w:list w:ilfo="2">
  <w:Ilst w:val="0" />
</w:list>
</w:lists>
<w:styles>
<w:VersionOfBuiltInStylenames w:val="3" />
<w:style w:type="paragraph" w:default="on" w:styleId="Normal">
  <w:Name w:val="Normal" />
```

```
<w:Sti w:val="0" />
<w:RSID w:val="272654" />
<w:rPr>
  <w:RFonts w:ascii="Times New Roman" w:fareast="MS Mincho" w:h-ansi="Times
    New Roman" w:cs="Times New Roman" />
  <WX:Font WX:val="Times New Roman" />
  <w:Sz w:val="24" />
  <w:Sz-CS w:val="24" />
  <w:Lang w:val="EN-US" w:fareast="JA" w:bidi="AR-SA" />
  </w:rPr>
  </w:style>
<w:style w:type="paragraph" w:styleId="Heading1">
  <w:Name w:val="heading 1" />
  <WX:UIName WX:val="Heading 1" />
  <w:Sti w:val="1" />
  <w:BasedOn w:val="Normal" />
  <w:Next w:val="Normal" />
  <w:RSID w:val="C7121E" />
<w:pPr>
  <w:KeepNext />
<w:listPr>
  <w:Ilvl w:val="0" />
  <w:Ilfo w:val="1" />
  </w:listPr>
<w:tabs>
  <w:Tab w:val="list" w:leader="none" w:pos="1440" />
  </w:tabs>
  <w:Spacing w:before="240" w:after="60" />
  <w:OutlineLvl w:val="0" />
  </w:pPr>
<w:rPr>
  <w:RFonts w:ascii="Arial" w:fareast="MS Mincho" w:h-ansi="Arial" w:cs="Arial"
    />
```

```xml
<WX:Font WX:val="Arial" />
<w:B />
<w:B-CS />
<w:Kern w:val="32" />
<w:Sz w:val="32" />
<w:Sz-CS w:val="32" />
<w:Lang w:val="EN-US" w:fareast="JA" w:bidi="AR-SA" />
  </w:rPr>
  </w:style>
<w:style w:type="paragraph" w:styleId="Heading2">
<w:Name w:val="heading 2" />
<WX:UIName WX:val="Heading 2" />
<w:Sti w:val="2" />
<w:BasedOn w:val="Normal" />
<w:Next w:val="Normal" />
<w:RSID w:val="C7121E" />
<w:pPr>
<w:KeepNext />
<w:listPr>
<w:Ilvl w:val="1" />
<w:Ilfo w:val="1" />
  </w:listPr>
<w:tabs>
<w:Tab w:val="list" w:leader="none" w:pos="1080" />
  </w:tabs>
<w:Spacing w:before="240" w:after="60" />
<w:OutlineLvl w:val="1" />
  </w:pPr>
<w:rPr>
<w:RFonts w:ascii="Arial" w:fareast="MS Mincho" w:h-ansi="Arial" w:cs="Arial"
  />
<WX:Font WX:val="Arial" />
<w:B />
```

```
<w:B-CS />
<w:I />
<w:I-CS />
<w:Sz w:val="28" />
<w:Sz-CS w:val="28" />
<w:Lang w:val="EN-US" w:fareast="JA" w:bidi="AR-SA" />
   </w:rPr>
   </w:style>
- <w:style w:type="paragraph" w:styleId="Heading3">
<w:Name w:val="heading 3" />
<WX:UIName WX:val="Heading 3" />
<w:Sti w:val="3" />
<w:BasedOn w:val="Normal" />
<w:Next w:val="Normal" />
<w:RSID w:val="C7121E" />
- <w:pPr>
<w:KeepNext />
- <w:listPr>
<w:Ilvl w:val="2" />
<w:Ilfo w:val="1" />
   </w:listPr>
- <w:tabs>
<w:Tab w:val="list" w:leader="none" w:pos="720" />
   </w:tabs>
<w:Spacing w:before="240" w:after="60" />
<w:OutlineLvl w:val="2" />
   </w:pPr>
- <w:rPr>
<w:RFonts w:ascii="Arial" w:fareast="MS Mincho" w:h-ansi="Arial" w:cs="Arial"
   />
<WX:Font WX:val="Arial" />
<w:B />
<w:B-CS />
```

```
      <w:Sz w:val="26" />
      <w:Sz-CS w:val="26" />
      <w:Lang w:val="EN-US" w:fareast="JA" w:bidi="AR-SA" />
    </w:rPr>
  </w:style>
- <w:style w:type="paragraph" w:styleId="Heading4">
    <w:Name w:val="heading 4" />
    <WX:UIName WX:val="Heading 4" />
    <w:Sti w:val="4" />
    <w:BasedOn w:val="Normal" />
    <w:Next w:val="Normal" />
    <w:RSID w:val="C7121E" />
- <w:pPr>
    <w:KeepNext />
- <w:listPr>
    <w:Ilvl w:val="3" />
    <w:Ilfo w:val="1" />
    </w:listPr>
- <w:tabs>
    <w:Tab w:val="list" w:leader="none" w:pos="864" />
    </w:tabs>
    <w:Spacing w:before="240" w:after="60" />
    <w:OutlineLvl w:val="3" />
    </w:pPr>
- <w:rPr>
    <w:RFonts w:ascii="Times New Roman" w:fareast="MS Mincho" w:h-ansi="Times New Roman" w:cs="Times New Roman" />
    <WX:Font WX:val="Times New Roman" />
    <w:B />
    <w:B-CS />
    <w:Sz w:val="28" />
    <w:Sz-CS w:val="28" />
    <w:Lang w:val="EN-US" w:fareast="JA" w:bidi="AR-SA" />
```

```xml
    </w:rPr>
   </w:style>
 <w:style w:type="paragraph" w:styleId="Heading5">
   <w:Name w:val="heading 5" />
   <WX:UIName WX:val="Heading 5" />
   <w:Sti w:val="5" />
   <w:BasedOn w:val="Normal" />
   <w:Next w:val="Normal" />
   <w:RSID w:val="C7121E" />
 <w:pPr>
 <w:listPr>
   <w:Ilvl w:val="4" />
   <w:Ilfo w:val="1" />
   </w:listPr>
 <w:tabs>
   <w:Tab w:val="list" w:leader="none" w:pos="1008" />
   </w:tabs>
   <w:Spacing w:before="240" w:after="60" />
   <w:OutlineLvl w:val="4" />
   </w:pPr>
 <w:rPr>
   <w:RFonts w:ascii="Times New Roman" w:fareast="MS Mincho" w:h-ansi="Times
     New Roman" w:cs="Times New Roman" />
   <WX:Font WX:val="Times New Roman" />
   <w:B />
   <w:B-CS />
   <w:I />
   <w:I-CS />
   <w:Sz w:val="26" />
   <w:Sz-CS w:val="26" />
   <w:Lang w:val="EN-US" w:fareast="JA" w:bidi="AR-SA" />
    </w:rPr>
   </w:style>
```

```xml
<w:style w:type="paragraph" w:styleId="Heading6">
  <w:Name w:val="heading 6" />
  <WX:UIName WX:val="Heading 6" />
  <w:Sti w:val="6" />
  <w:BasedOn w:val="Normal" />
  <w:Next w:val="Normal" />
  <w:RSID w:val="C7121E" />
  <w:pPr>
    <w:listPr>
      <w:Ilvl w:val="5" />
      <w:Ilfo w:val="1" />
    </w:listPr>
    <w:tabs>
      <w:Tab w:val="list" w:leader="none" w:pos="1152" />
    </w:tabs>
    <w:Spacing w:before="240" w:after="60" />
    <w:OutlineLvl w:val="5" />
  </w:pPr>
  <w:rPr>
    <w:RFonts w:ascii="Times New Roman" w:fareast="MS Mincho" w:h-ansi="Times New Roman" w:cs="Times New Roman" />
    <WX:Font WX:val="Times New Roman" />
    <w:B />
    <w:B-CS />
    <w:Sz w:val="22" />
    <w:Sz-CS w:val="22" />
    <w:Lang w:val="EN-US" w:fareast="JA" w:bidi="AR-SA" />
  </w:rPr>
</w:style>
<w:style w:type="paragraph" w:styleId="Heading7">
  <w:Name w:val="heading 7" />
  <WX:UIName WX:val="Heading 7" />
  <w:Sti w:val="7" />
```

```xml
<w:BasedOn w:val="Normal" />
<w:Next w:val="Normal" />
<w:RSID w:val="C7121E" />
<w:pPr>
  <w:listPr>
    <w:Ilvl w:val="6" />
    <w:Ilfo w:val="1" />
  </w:listPr>
  <w:tabs>
    <w:Tab w:val="list" w:leader="none" w:pos="1296" />
  </w:tabs>
  <w:Spacing w:before="240" w:after="60" />
  <w:OutlineLvl w:val="6" />
</w:pPr>
<w:rPr>
  <w:RFonts w:ascii="Times New Roman" w:fareast="MS Mincho" w:h-ansi="Times New Roman" w:cs="Times New Roman" />
  <WX:Font WX:val="Times New Roman" />
  <w:Sz w:val="24" />
  <w:Sz-CS w:val="24" />
  <w:Lang w:val="EN-US" w:fareast="JA" w:bidi="AR-SA" />
</w:rPr>
</w:style>
<w:style w:type="paragraph" w:styleId="Heading8">
<w:Name w:val="heading 8" />
<WX:UIName WX:val="Heading 8" />
<w:Sti w:val="8" />
<w:BasedOn w:val="Normal" />
<w:Next w:val="Normal" />
<w:RSID w:val="C7121E" />
<w:pPr>
  <w:listPr>
    <w:Ilvl w:val="7" />
```

```xml
<w:Ilfo w:val="1" />
    </w:listPr>
<w:tabs>
  <w:Tab w:val="list" w:leader="none" w:pos="1440" />
    </w:tabs>
  <w:Spacing w:before="240" w:after="60" />
  <w:OutlineLvl w:val="7" />
    </w:pPr>
<w:rPr>
  <w:RFonts w:ascii="Times New Roman" w:fareast="MS Mincho" w:h-ansi="Times New Roman" w:cs="Times New Roman" />
  <WX:Font WX:val="Times New Roman" />
  <w:I />
  <w:I-CS />
  <w:Sz w:val="24" />
  <w:Sz-CS w:val="24" />
  <w:Lang w:val="EN-US" w:fareast="JA" w:bidi="AR-SA" />
    </w:rPr>
    </w:style>
<w:style w:type="paragraph" w:styleId="Heading9">
  <w:Name w:val="heading 9" />
  <WX:UIName WX:val="Heading 9" />
  <w:Sti w:val="9" />
  <w:BasedOn w:val="Normal" />
  <w:Next w:val="Normal" />
  <w:RSID w:val="C7121E" />
<w:pPr>
<w:listPr>
  <w:Ilvl w:val="8" />
  <w:Ilfo w:val="1" />
    </w:listPr>
<w:tabs>
  <w:Tab w:val="list" w:leader="none" w:pos="1584" />
```

```xml
    </w:tabs>
   <w:Spacing w:before="240" w:after="60" />
   <w:OutlineLvl w:val="8" />
     </w:pPr>
- <w:rPr>
   <w:RFonts w:ascii="Arial" w:fareast="MS Mincho" w:h-ansi="Arial" w:cs="Arial"
     />
   <WX:Font WX:val="Arial" />
   <w:Sz w:val="22" />
   <w:Sz-CS w:val="22" />
   <w:Lang w:val="EN-US" w:fareast="JA" w:bidi="AR-SA" />
     </w:rPr>
     </w:style>
- <w:style w:type="character" w:default="on" w:styleId="DefaultParagraphFont">
   <w:Name w:val="Default Paragraph Font" />
   <w:Sti w:val="65" />
   <w:SemiHidden />
   <w:RSID w:val="272654" />
     </w:style>
- <w:style w:type="table" w:default="on" w:styleId="TableNormal">
   <w:Name w:val="Normal Table" />
   <WX:UIName WX:val="Table Normal" />
   <w:Sti w:val="105" />
   <w:SemiHidden />
   <w:RSID w:val="272654" />
- <w:rPr>
   <w:RFonts w:ascii="Times New Roman" w:fareast="MS Mincho" w:h-ansi="Times
     New Roman" w:cs="Times New Roman" />
   <WX:Font WX:val="Times New Roman" />
   <w:Lang w:val="EN-US" w:fareast="JA" w:bidi="AR-SA" />
     </w:rPr>
- <w:tblPr>
   <w:tblInd w:w="0" w:type="dxa" />
```

```xml
- <w:tblCellMar>
  <w:Top w:w="0" w:type="dxa" />
  <w:Left w:w="108" w:type="dxa" />
  <w:Bottom w:w="0" w:type="dxa" />
  <w:Right w:w="108" w:type="dxa" />
    </w:tblCellMar>
    </w:tblPr>
    </w:style>
- <w:style w:type="list" w:default="on" w:styleId="NoList">
  <w:Name w:val="No List" />
  <w:Sti w:val="107" />
  <w:SemiHidden />
  <w:RSID w:val="272654" />
    </w:style>
- <w:style w:type="table" w:styleId="TableGrid">
  <w:Name w:val="Table Grid" />
  <w:Sti w:val="154" />
  <w:BasedOn w:val="TableNormal" />
  <w:RSID w:val="C71191" />
- <w:rPr>
  <w:RFonts w:ascii="Times New Roman" w:fareast="MS Mincho" w:h-ansi="Times New Roman" w:cs="Times New Roman" />
  <WX:Font WX:val="Times New Roman" />
    </w:rPr>
- <w:tblPr>
  <w:tblInd w:w="0" w:type="dxa" />
- <w:tblBorders>
  <w:Top w:val="single" w:sz="4" WX:bdrwidth="10" w:space="0" w:color="FF000000" />
  <w:Left w:val="single" w:sz="4" WX:bdrwidth="10" w:space="0" w:color="FF000000" />
  <w:Bottom w:val="single" w:sz="4" WX:bdrwidth="10" w:space="0" w:color="FF000000" />
```

```xml
<w:Right w:val="single" w:sz="4" WX:bdrwidth="10" w:space="0"
  w:color="FF000000" />
<w:InsideH w:val="single" w:sz="4" WX:bdrwidth="10" w:space="0"
  w:color="FF000000" />
<w:InsideV w:val="single" w:sz="4" WX:bdrwidth="10" w:space="0"
  w:color="FF000000" />
</w:tblBorders>
<w:tblCellMar>
  <w:Top w:w="0" w:type="dxa" />
  <w:Left w:w="108" w:type="dxa" />
  <w:Bottom w:w="0" w:type="dxa" />
  <w:Right w:w="108" w:type="dxa" />
</w:tblCellMar>
</w:tblPr>
</w:style>
<w:style w:type="table" w:styleId="TableColumns5">
  <w:Name w:val="Table Columns 5" />
  <w:Sti w:val="125" />
  <w:BasedOn w:val="TableNormal" />
  <w:RSID w:val="C71191" />
  <w:rPr>
    <w:RFonts w:ascii="Times New Roman" w:fareast="MS Mincho" w:h-ansi="Times New Roman" w:cs="Times New Roman" />
    <WX:Font WX:val="Times New Roman" />
  </w:rPr>
  <w:tblPr>
    <w:tblInd w:w="0" w:type="dxa" />
    <w:tblBorders>
      <w:Top w:val="single" w:sz="12" WX:bdrwidth="30" w:space="0"
        w:color="00808080" />
      <w:Left w:val="single" w:sz="12" WX:bdrwidth="30" w:space="0"
        w:color="00808080" />
```

```xml
<w:Bottom w:val="single" w:sz="12" WX:bdrwidth="30" w:space="0"
    w:color="00808080" />
<w:Right w:val="single" w:sz="12" WX:bdrwidth="30" w:space="0"
    w:color="00808080" />
<w:InsideV w:val="single" w:sz="6" WX:bdrwidth="15" w:space="0"
    w:color="00C0C0C0" />
    </w:tblBorders>
<w:tblCellMar>
  <w:Top w:w="0" w:type="dxa" />
  <w:Left w:w="108" w:type="dxa" />
  <w:Bottom w:w="0" w:type="dxa" />
  <w:Right w:w="108" w:type="dxa" />
    </w:tblCellMar>
<w:TStyleColBandSize w:val="1" />
    </w:tblPr>
<w:tStylePr w:type="firstRow">
<w:rPr>
  <w:B />
  <w:B-CS />
  <w:I />
  <w:I-CS />
    </w:rPr>
<w:tblPr />
<w:tcPr>
<w:tcBorders>
  <w:Bottom w:val="single" w:sz="6" WX:bdrwidth="15" w:space="0"
    w:color="00808080" />
  <w:TL2BR w:val="none" w:sz="0" WX:bdrwidth="0" w:space="0"
    w:color="FF000000" />
  <w:TR2BL w:val="none" w:sz="0" WX:bdrwidth="0" w:space="0"
    w:color="FF000000" />
    </w:tcBorders>
    </w:tcPr>
```

```xml
</w:tStylePr>
<w:tStylePr w:type="lastRow">
  <w:rPr>
    <w:B />
    <w:B-CS />
  </w:rPr>
  <w:tblPr />
  <w:tcPr>
    <w:tcBorders>
      <w:Top w:val="single" w:sz="6" WX:bdrwidth="15" w:space="0"
        w:color="00808080" />
      <w:TL2BR w:val="none" w:sz="0" WX:bdrwidth="0" w:space="0"
        w:color="FF000000" />
      <w:TR2BL w:val="none" w:sz="0" WX:bdrwidth="0" w:space="0"
        w:color="FF000000" />
    </w:tcBorders>
  </w:tcPr>
</w:tStylePr>
<w:tStylePr w:type="firstCol">
  <w:rPr>
    <w:B />
    <w:B-CS />
  </w:rPr>
  <w:tblPr />
  <w:tcPr>
    <w:tcBorders>
      <w:TL2BR w:val="none" w:sz="0" WX:bdrwidth="0" w:space="0"
        w:color="FF000000" />
      <w:TR2BL w:val="none" w:sz="0" WX:bdrwidth="0" w:space="0"
        w:color="FF000000" />
    </w:tcBorders>
  </w:tcPr>
</w:tStylePr>
```

```
- <w:tStylePr w:type="lastCol">
- <w:rPr>
  <w:B />
    <w:B-CS />
      </w:rPr>
    <w:tblPr />
- <w:tcPr>
- <w:tcBorders>
    <w:TL2BR w:val="none" w:sz="0" WX:bdrwidth="0" w:space="0"
      w:color="FF000000" />
    <w:TR2BL w:val="none" w:sz="0" WX:bdrwidth="0" w:space="0"
      w:color="FF000000" />
      </w:tcBorders>
      </w:tcPr>
    </w:tStylePr>
- <w:tStylePr w:type="band1Vert">
- <w:rPr>
    <w:Color w:val="FF000000" />
      </w:rPr>
    <w:tblPr />
- <w:tcPr>
    <w:Shd w:val="solid" w:color="00C0C0C0" w:fill="00FFFFFF"
      WX:bgcolor="00C0C0C0" />
      </w:tcPr>
      </w:tStylePr>
- <w:tStylePr w:type="band2Vert">
- <w:rPr>
    <w:Color w:val="FF000000" />
      </w:rPr>
      </w:tStylePr>
      </w:style>
      </w:styles>
- <w:docSuppData>
```

```
<w:binData
    w:name="editdata.mso">QWN0aXZlTWltZQAAAfAEAAAA/////wAAB/AIDw
    AABAAAAQAAAAAAAAAAAAAAyAAB4nO1ab3Ab
    x3V/dwApECJlkKJkSpalE2jZsiLShwMBk5LoCH8pKiRBkbLoWogpkDjJkECAB
    UBJtiwFEpWxOk0z
    zTjjaTMZZRLHcaIZexxn8seddMp4mg9NPIniOJPWzdROIn9JPzTfkmYmRn/v
    bg8A/wqU0jqeeo8/
    7t67vX1v3759+3YP13/c/M4Xv775I7QgPUQ2eq/UQPVVNEnASC4imUy8Vyq
    VLHLpw/SBSn8EeIw3
    AHagDlgDOAEH0ACsBe4EGoEmYB1wh2kC1Ay0AOuBVmCjsAcLH6Y/7zRCW
    VwFUihCGeQ5emKhK1gx
    bYTFWG2tvUnd3157fevP3vmeZEN5/3aTdoSCFFgVx/nJAY9k8a+7CV8rr36
    WpBT6fDv8Zalan7W+
    I5TNfBDaT9IMpUknzy3wd4E/N8Vzt1b+PLefE/xZGVy0UWX+sz9gH2DN//fE
    2NYy/7ku+wD2F23A
    JmAzcBewBbgb2ApsAxSAzcANtAP3ADuAeOU7O5HfL8ofEXmHyB9ArgKsMw
    3wAl2AD/ADDwLdQA+w
    B9gL7AN6idc2oo8C+wG2vaBoM4w8AkSBPuAA0A8cBD4GDBCPF9EQEAOGg
    UPi3VHkh4GGKBiW2aaAx4
    BPgL4FHgKBAHPg48AEMAFMEtsiwQqIjgMngMeBFHASOAWkgA
    2SBaeAvAbbfPFAAZoDT
    wBngLMCz+Ukh41PIzwMXgE8ARR7/Y68UJWPkJVJ3yfLfNtB0a/OBG12SKX
    nDbochbKHhXPakPlmo
    O0QYkv1ya73c2vui7Fwjp6VWR31Lg9xSfFQt9bqpUT7Ysk92biQply8kXdm0/
    pC8Kc+CJSExbHwY
    BvQ47XiMbLso3ndOVVVNfbnLq3aQw24PkdMmr5NaVLXLf76dtE61XW0P7a
    H4WP9QODY2SvHRJ/IF
    fcpr1+I2XesspCeoPTYQUQIzhWJ2KlFIZTN0zEbybGQom5tKpOtQKIZyUFri
    DG6jpRicONR2tUY
    D9lanPWfHvpdr72BZrfHjh9PTTZfPhGj40UofHLDpRNXi9s+e2l73zmNwtHus
    NoV6iBfMBro8Kie
    /cGOYDjiK54InAwU9a5inXblRPEfTlAuMaVEU2md8vFQdmoqm5Hs9YOpyVw
    2n6XjBWX08UROp2Q8
    Fo32hyLk8cQHR20d4baBgfanXbODikdV0lUlNnHx18rAXGoil8g9UdxRJPcdl5
```

6O0frXpKNvyJuC
+uHHU/IwliZnpvRMoY+cbXMNh+eOpzD87vDcgUma2d+v07XMXGbzj9Zqb6
3dMtfyVdhxUPIE/6o0
97mNW4OyVLf7te2z+9w7go6PBKVNdPGxIf3KmcGE9FAftRTr3EP0yBIY+alJ
+lKOduRp8183aJ9t
+JuY UNKUTBT2s51Ly6Q33 hGbyhexUY+pJU/5q8KL2lGhlXVU/LJkdlo6q+mc3NqGnxFuqcWlAF/ZzUeoQ
FHVeKWTkS+vPVeYn z4tXmLcd+9SLFRmOEfEZWsKgSMJZLvJkGWsMzfMOP/aCXIoY8a+N499Gmx
n/vizi3z24P1j2zhz/ nr5xs/jXTquOf4ew4+R4P4EdaA6rQn6V7y8X16+UOoG1wu0fxnaQty9h8Mb
2BVs13TiHqjVtxvrH o8IWXyv/EPB5ocdxMSLjcCEj2NUfxJiEyqtzTfxX3f8RoM0MK2+RayXx+s9W
wAtYrfzPAf8830T/
z/c/9vd9B7TTkHi5uN4qmU8r+6TKduK6KPEpkzy7ReYyt6AKTVjtWvy4zKdff
MK1tmWrLGjHmM7K
/eo8PS7cH/Gw8MBcNsapdn9ttreSx7b4qEbv5ptFNy0duC1Ht5Kjqg2HGGta4
R3TsMwzJOkeBMhx
TIvj4toFN30IwXHSuPMabn3i9reFa8h90VH5vlU0v3W5RLlVaI3L7K/UqjrHR
NnqkR3tyGSuDqZt
cEj8rL3bqJElM0R+RzDivIkUU/lmRrHR8TDT7xP0mw9rpmC1xxxdVN7SfnvZ
LS0G3jSavLtJcY7O
TCiy6tn5yP1NzjXfsQ100pth0vOTudR0IdWYzUhnZZXFIEsOsgQhSxKVRZFea
X52OLc/OxlOFBLS
WD9lTmdP6ePRmcbMpDRGm9nmNnfWf77Tdomeu6/J+dB99i/b6uvv2Po0g
fP+Jmckk1SKhSZyrmRQ
y6V3y+dHV8X50Vti/Xwe9/897/xodh8/eQ43V+j9OT9yrNSEKQL/r8V/Nv5Z
+E+ZRt2mnBKNusol
QVvsPyXaiV3+EOaEcShLacytlSIAfluSDA9bNL8mukhwlpY+UbI8LN8fKOu04t
Wqe7Dwvhb6Qn4r
68is/795gvX3y053bGfJ2s+6Cu4mp/NTwURekj/lMY+Y5M5NR/rS2YlEert0b
XQ6MSmlowlHOq83
fimU0xOuQmIivWHbcE5XkvpkOkH1/clmulprXH85NOtZWTdmej1x2jh9KB9I
2StjxadlMv3BWA76
ELWsJq6vplVfXYi9z1M78k7ctVMPEKI94GBGYn34H6ALsNI46DFExoP4PyQo
g9QPKtcbFRQzeowv
iuv9aD9MA7jaQWH7njHsXcHTBO5SsHUFfeCZoODNaVxpg5qA7adAzyyIxV3
SYj30AL7b0kM35PQi
V6v0wPuAE/ifwFxkGVPG18m80f9UeZ+QxWLM341jxrLMdB01YqgfNbQUgX 5MnY3SGOgj0Ecn8gFo
oH3JlsYMbSRR4jd5fLj1CTqJlieNGgN4a8KQbOF36u8uaSXeBTpZrXY0YSUV7
Yyhb0PoSQylUdyP
Qg7+wKVDV17Ujxt34muX8X4BpQm8zz2PGGM9A1rW8H/WSFenFqMnoXlec
ikaf76y9sY7y7ahQbYo
RjVs9CKE/vmg7yi4dkCnKhBEKYjnkbLlBHCZve4SdK3ce61m2wgZfZoy+nNz
qxmF1+dR1KGr5awm
VjWHbmZ5itG71dmMzTiX56+ffFRVL0vkQO5E7pKrPbwVmS707bX4NytVvgH
MT0ffsCHOXG4NbEV/
Bsqhr4Y+aLhKpfXy8u+UShzoGInDH46tS6WWJTb6rUvG1aXSFnmp2qUSnz9
wauNmh+3c7LoFv1/g
JkfmNelDE6XSZnlhzVKJP+dxUrm587KlTkkallen2g9TbYnHTa1Rt/Q+j8G7X
wje299mG3jx+7n/
/HmuboBpxpn+zr63gk8/H7t652dKbc92vmnRH/3iV37x+3e12LXfvLD7F5rn
uxadc966FcUS2kwl
2ofds93Oh9vfPOUim/1IMPC7X7mozj6Wynj837sgil5tzSf4MbZM33jFhTf41P
7Fdhc57GIr7XHe
6aJ6u3lS/cwxF62xnnS85KJGe/UHhX1XXdQAKUo2G41HTifSM4ia2v4N75MZ
jr39ryhfdhgVzMPl
DTPcojgEnmjG+/by3v2lk5Xa5k7yZ0OQzKBIZDE9+VMXyTyl+Jcjd8OvNS0x
qAilQZVrGPB1Mp91
mb5xvUzl1jbKfJLcJvM+/y5uiJqN3wRJxi9xbi/9wH3Wdl05u8ynHqL+cK/7n
KZ5g15/j68jHHow
0tEViAY6ugM9PR1qxK+FNG9PyOfzn0cEbOmlt3pkHrj3gCpSk9PUdm9Zz2W
KGIYmJ+Jrvdctxhlt
HtDT06FspqCfLbAsKkhH9Fw+lc2EslPTiUJqIq17tV63t8eradhAc4XQYF+vu8v
T5Q34tUggUA2W
cjjY6/Z3+wPdUZ/ao5oAvS/U6+6Odof93T5voNsXDkV8EYaXP1I3OY8eyOYL
SuRsQc8k9ZzSnzme
/XiTs9w5T+85b7dXC/u71I5QtEft8HhC0Y5uPsm+RObvgy6L/MP0/ydFurwd
qhpQQz0ej6r6Auf3
HglG9lZPCVgWfOWpPHaIOgyqeur0qruV8l8Ic8OaNuLBg93duxVf127Fmkae
3i7c+UB90KftVrQe
Lz+7Hf9QLc4KRwllyZb84CGEu+0fY34A0/zvD2eM3xeuJt3K959ZMn//+KdK

```
q+X/p04fZP7/AyX3
f9AAAA3wowAAAgBAACTAAAAAAAAAAkEAAD/AQEAAABWAAEAAAD//wA
AAAAAAAAAAAAAAAAAAAAQ
//8BAAIAGABQAHIAbwBqAGUAYwB0AC4ATgBlAHcATQBhAGMAcgBvAHMA
LgBNAGEAYwByAG8AMQAB
ABEBAAEAGABQAFIATwBKAEUAUQwBUAC4ATgBFAFcATQBBAEMAUgBPAFM
ALgBNAEEAQwBSAE8AMQAA AEAAAAvwBAAAABI0Vng=</w:binData>
    </w:docSuppData>
<w:body>
<WX:sect>
<w:tbl>
<w:tblPr>
  <w:TStyle w:val="TableGrid" />
  <w:tblW w:w="0" w:type="auto" />
  <w:tblLook w:val="000001E0" />
    </w:tblPr>
<w:tblGrid>
  <w:GridCol w:w="2332" />
  <w:GridCol w:w="4500" />
  <w:GridCol w:w="1080" />
  <w:GridCol w:w="944" />
    </w:tblGrid>
<w:tr>
<w:trPr>
  <w:GridAfter w:val="1" />
  <w:WAfter w:w="944" w:type="dxa" />
    </w:trPr>
<w:tc>
<w:tcPr>
  <w:tcW w:w="2332" w:type="dxa" />
    </w:tcPr>
  <w:p />
    </w:tc>
```

```xml
 <w:tc>
  <w:tcPr>
   <w:tcW w:w="5580" w:type="dxa" />
   <w:GridSpan w:val="2" />
  </w:tcPr>
   <w:p />
  </w:tc>
  </w:tr>
 <w:tr>
 <w:tc>
  <w:tcPr>
   <w:tcW w:w="6832" w:type="dxa" />
   <w:GridSpan w:val="2" />
  </w:tcPr>
   <w:p />
  </w:tc>
 <w:tc>
  <w:tcPr>
   <w:tcW w:w="2024" w:type="dxa" />
   <w:GridSpan w:val="2" />
  </w:tcPr>
   <w:p />
  </w:tc>
  </w:tr>
  </w:tbl>
  <w:p />
 <w:p>
 <w:r>
   <w:T>The</w:T>
  </w:r>
 <w:r>
 <w:rPr>
```

```xml
<w:RFonts w:ascii="Arial" w:fareast="MS.PGothic" w:h-ansi="Arial" w:cs="Arial" />
<WX:Font WX:val="Arial" />
<w:B />
<w:I />
</w:rPr>
<w:T>quick</w:T>
</w:r>
<w:r>
<w:T>brown fox jumps over the lazy dog. The quick brown fox jumps over the lazy dog. The quick brown fox jumps over the lazy dog. The quick brown fox jumps over the lazy dog. The quick brown fox jumps over the lazy dog.</w:T>
</w:r>
</w:p>
<WX:sub-section>
<w:p>
<w:pPr>
<w:PStyle w:val="Heading1" />
<w:listPr>
<WX:t WX:val="Article I." />
</w:listPr>
<w:tabs>
<w:Tab w:val="list" w:leader="none" w:pos="1440" />
</w:tabs>
</w:pPr>
<w:r>
<w:T>The quick brown fox jumps over the lazy dog.</w:T>
</w:r>
</w:p>
<w:p>
<w:pPr>
<w:PStyle w:val="Heading1" />
```

```
- <w:listPr>
    <WX:t WX:val="Article II." />
    </w:listPr>
- <w:tabs>
    <w:Tab w:val="list" w:leader="none" w:pos="1440" />
    </w:tabs>
    </w:pPr>
- <w:r>
    <w:T>The quick brown fox jumps over the lazy dog.</w:T>
    </w:r>
    </w:p>
- <w:p>
- <w:pPr>
    <w:PStyle w:val="Heading1" />
- <w:listPr>
    <WX:t WX:val="Article III." />
    </w:listPr>
- <w:tabs>
    <w:Tab w:val="list" w:leader="none" w:pos="1440" />
    </w:tabs>
    </w:pPr>
- <w:r>
    <w:T>The quick brown fox jumps over the lazy dog.</w:T>
    </w:r>
    </w:p>
- <w:p>
- <w:r>
    <w:T>The quick brown fox jumps over the lazy dog. The quick brown fox jumps over the lazy dog.</w:T>
    </w:r>
    </w:p>
- <w:p>
- <w:r>
```

```
<w:T>The quick brown fox jumps o</w:T>
    </w:r>
<w:r>
  <w:T>ver the lazy dog. The quick brown fox jumps over the lazy dog. The
    quick brown fox jumps over the lazy dog. The quick brown fox jumps over
    the lazy dog. The quick brown fox jumps over the lazy</w:T>
    </w:r>
  <w:ProofErr w:type="spellStart" />
<w:r>
  <w:T>dog.hello</w:T>
    </w:r>
  <w:ProofErr w:type="spellEnd" />
    </w:p>
  <w:p />
  <w:p />
<w:sectPr>
  <w:PgSz w:w="12240" w:h="15840" />
  <w:PgMar w:top="1440" w:right="1800" w:bottom="1440" w:left="1800"
    w:header="720" w:footer="720" w:gutter="0" />
    </w:sectPr>
    </WX:sub-section>
    </WX:sect>
    </w:body>
    </w:WordDocument>
```

The word-processor document created in accordance with aspects of the invention is very rich. If desired, an application that understands XML may create and/or modify the word-processor document. The application may also ignore many of the elements within the document if so desired. For example, an application may desire to only know the text contained within the document. According to this particular example, the application would only have to extract the elements identified by the <w:T> tag.

In order for an application to understand the word-processor documents created by the word-processor, an XSD file is provided. Below is an exemplary XSD file that may be used for interpreting and/or creating the rich word-processing documents in XML.

```xml
<?xml version="1.0" encoding="UTF-8"?><xsd:schema
targetNamespace="urn:schemas-microsoft-com:office:wordml-11.0"
elementFormDefault="qualified" attributeFormDefault="qualified"
xmlns:xsd="http://www.w3.org/2001/XMLSchema" xmlns="urn:schemas-microsoft-com:office:wordml-11.0" xmlns:wbld="urn-microsoft-com-word-build"
xmlns:WX="urn:schemas-microsoft-com:office:wordml-11.0:aux"><xsd:import
id="WX" namespace="urn:schemas-microsoft-com:office:wordml-11.0:aux"
schemaLocation="wordnet.xsd"></xsd:import><xsd:import id="xml"
namespace="http://www.w3.org/XML/1998/namespace"></xsd:import><xsd:attribute
name="ignore"><xsd:simpleType><xsd:restriction
base="xsd:string"><xsd:enumeration
value="tagOnly"></xsd:enumeration><xsd:enumeration
value="subTree"></xsd:enumeration></xsd:restriction></xsd:simpleType></xsd:attribute><xsd:attribute name="st" type="BooleanType"></xsd:attribute><xsd:simpleType
name="BooleanType"><xsd:restriction base="xsd:string"><xsd:enumeration
value="on"></xsd:enumeration><xsd:enumeration
value="off"></xsd:enumeration></xsd:restriction></xsd:simpleType><xsd:complexType name="BooleanProperty"><xsd:attribute name="val" type="BooleanType"
default="on"></xsd:attribute></xsd:complexType><xsd:simpleType
name="HexNumberType"><xsd:restriction
base="xsd:hexBinary"></xsd:restriction></xsd:simpleType><xsd:complexType
name="HexNumberProperty"><xsd:attribute name="val" type="HexNumberType"
use="required"></xsd:attribute></xsd:complexType><xsd:simpleType
name="DecimalNumberType"><xsd:restriction
base="xsd:integer"></xsd:restriction></xsd:simpleType><xsd:complexType
name="DecimalNumberProperty"><xsd:attribute name="val"
```

```
type="DecimalNumberType" use="required"></xsd:attribute><xsd:attribute
ref="WX:estimate"
use="optional"></xsd:attribute></xsd:complexType><xsd:simpleType
name="TwipsMeasureType"><xsd:restriction
base="xsd:unsignedInt"></xsd:restriction></xsd:simpleType><xsd:complexType
name="TwipsMeasureProperty"><xsd:attribute name="val"
type="TwipsMeasureType"
use="required"></xsd:attribute></xsd:complexType><xsd:simpleType
name="SignedTwipsMeasureType"><xsd:restriction
base="xsd:integer"></xsd:restriction></xsd:simpleType><xsd:complexType
name="SignedTwipsMeasureProperty"><xsd:attribute name="val"
type="SignedTwipsMeasureType"
use="required"></xsd:attribute></xsd:complexType><xsd:simpleType
name="PixelsMeasureType"><xsd:restriction
base="xsd:unsignedInt"></xsd:restriction></xsd:simpleType><xsd:complexType
name="PixelsMeasureProperty"><xsd:attribute name="val" type="PixelsMeasureType"
use="required"></xsd:attribute></xsd:complexType><xsd:simpleType
name="PointsMeasureType"><xsd:restriction
base="xsd:unsignedInt"></xsd:restriction></xsd:simpleType><xsd:complexType
name="PointsMeasureProperty"><xsd:attribute name="val"
type="PointsMeasureType"
use="required"></xsd:attribute></xsd:complexType><xsd:simpleType
name="HpsMeasureType"><xsd:restriction
base="xsd:unsignedInt"></xsd:restriction></xsd:simpleType><xsd:complexType
name="HpsMeasureProperty"><xsd:attribute name="val" type="HpsMeasureType"
use="required"></xsd:attribute></xsd:complexType><xsd:simpleType
name="SignedHpsMeasureType"><xsd:restriction
base="xsd:unsignedInt"></xsd:restriction></xsd:simpleType><xsd:complexType
name="SignedHpsMeasureProperty"><xsd:attribute name="val"
type="SignedHpsMeasureType"
``` use="required"></xsd:attribute></xsd:complexType><xsd:simpleType name="TextScaleType"><xsd:restriction base="xsd:unsignedInt"><xsd:minInclusive value="1"></xsd:minInclusive><xsd:maxInclusive value="600"></xsd:maxInclusive></xsd:restriction></xsd:simpleType><xsd:complexType name="TextScaleProperty"><xsd:attribute name="val"></xsd:attribute></xsd:complexType><xsd:simpleType name="StringType"><xsd:restriction base="xsd:string"></xsd:restriction></xsd:simpleType><xsd:complexType name="StringProperty"><xsd:attribute name="val" type="StringType" use="required"></xsd:attribute></xsd:complexType><xsd:simpleType name="LeftOrRightType"><xsd:restriction base="xsd:string"><xsd:enumeration value="left"></xsd:enumeration><xsd:enumeration value="right"></xsd:enumeration></xsd:restriction></xsd:simpleType><xsd:simpleType name="DateTimeType"><xsd:restriction base="xsd:dateTime"></xsd:restriction></xsd:simpleType><xsd:complexType name="DateTimeProperty"><xsd:attribute name="val" type="DateTimeType" use="required"></xsd:attribute></xsd:complexType><xsd:simpleType name="ColorValues"><xsd:restriction base="xsd:string"><xsd:enumeration value="black"></xsd:enumeration><xsd:enumeration value="blue"></xsd:enumeration><xsd:enumeration value="cyan"></xsd:enumeration><xsd:enumeration value="green"></xsd:enumeration><xsd:enumeration value="magenta"></xsd:enumeration><xsd:enumeration value="red"></xsd:enumeration><xsd:enumeration value="yellow"></xsd:enumeration><xsd:enumeration value="white"></xsd:enumeration><xsd:enumeration value="dark-blue"></xsd:enumeration><xsd:enumeration value="dark-cyan"></xsd:enumeration><xsd:enumeration value="dark-green"></xsd:enumeration><xsd:enumeration value="dark-magenta"></xsd:enumeration><xsd:enumeration value="darkred"></xsd:enumeration><xsd:enumeration value="dark-yellow"></xsd:enumeration><xsd:enumeration value="dark-gray"></xsd:enumeration><xsd:enumeration value="light-gray"></xsd:enumeration><xsd:enumeration value="none"></xsd:enumeration></xsd:restriction></xsd:simpleType><xsd:simpleType name="HexColorType"><xsd:union><xsd:simpleType><xsd:restriction base="xsd:hexBinary"><xsd:length value="3" fixed="true"></xsd:length></xsd:restriction></xsd:simpleType><xsd:simpleType><xsd:restriction base="xsd:string"><xsd:enumeration value="auto"></xsd:enumeration></xsd:restriction></xsd:simpleType></xsd:union></xsd:simpleType><xsd:complexType name="HexColorProperty"><xsd:attribute name="val" use="optional"></xsd:attribute></xsd:complexType><xsd:complexType name="HighlightProperty"><xsd:attribute name="val" type="ColorValues" use="required"></xsd:attribute></xsd:complexType><xsd:simpleType name="UnderlineValues"><xsd:restriction base="xsd:string"><xsd:enumeration value="single"></xsd:enumeration><xsd:enumeration value="words"></xsd:enumeration><xsd:enumeration value="double"></xsd:enumeration><xsd:enumeration value="thick"></xsd:enumeration><xsd:enumeration value="dotted"></xsd:enumeration><xsd:enumeration value="dotted-heavy"></xsd:enumeration><xsd:enumeration value="dash"></xsd:enumeration><xsd:enumeration value="dashed-heavy"></xsd:enumeration><xsd:enumeration value="dash-long"></xsd:enumeration><xsd:enumeration value="dash-long-heavy"></xsd:enumeration><xsd:enumeration value="dot-dash"></xsd:enumeration><xsd:enumeration value="dash-dot-heavy"></xsd:enumeration><xsd:enumeration value="dot-dot-dash"></xsd:enumeration><xsd:enumeration value="dash-dot-dot-heavy"></xsd:enumeration><xsd:enumeration value="wave"></xsd:enumeration><xsd:enumeration value="wavyheavy"></xsd:enumeration><xsd:enumeration value="wavy-double"></xsd:enumeration><xsd:enumeration value="none"></xsd:enumeration></xsd:restriction></xsd:simpleType><xsd:complexType name="UnderlineProperty"><xsd:attribute name="val" type="UnderlineValues" use="required"></xsd:attribute><xsd:attribute name="color" type="HexColorType" use="optional"></xsd:attribute></xsd:complexType><xsd:simpleType name="TextEffectValues"><xsd:restriction base="xsd:string"><xsd:enumeration value="blink-background"></xsd:enumeration><xsd:enumeration value="lights"></xsd:enumeration><xsd:enumeration value="ants-black"></xsd:enumeration><xsd:enumeration value="ants-red"></xsd:enumeration><xsd:enumeration value="shimmer"></xsd:enumeration><xsd:enumeration value="sparkle"></xsd:enumeration><xsd:enumeration value="none"></xsd:enumeration></xsd:restriction></xsd:simpleType><xsd:complexType name="TextEffectProperty"><xsd:attribute name="val" type="TextEffectValues" use="required"></xsd:attribute></xsd:complexType><xsd:simpleType name="BorderValues"><xsd:restriction base="xsd:string"><xsd:enumeration value="nil"></xsd:enumeration><xsd:enumeration value="none"></xsd:enumeration><xsd:enumeration value="single"></xsd:enumeration><xsd:enumeration value="thick"></xsd:enumeration><xsd:enumeration value="double"></xsd:enumeration><xsd:enumeration value="dotted"></xsd:enumeration><xsd:enumeration value="dashed"></xsd:enumeration><xsd:enumeration value="dot-dash"></xsd:enumeration><xsd:enumeration value="dot-dot-dash"></xsd:enumeration><xsd:enumeration value="triple"></xsd:enumeration><xsd:enumeration value="thin-thick-small-gap"></xsd:enumeration><xsd:enumeration value="thick-thin-small-gap"></xsd:enumeration><xsd:enumeration value="thin-thick-thin-small-gap"></xsd:enumeration><xsd:enumeration value="thin-thick-mediumgap"></xsd:enumeration><xsd:enumeration value="thick-thin-medium-gap"></xsd:enumeration><xsd:enumeration value="thin-thick-thin-medium-gap"></xsd:enumeration><xsd:enumeration value="thin-thick-large-gap"></xsd:enumeration><xsd:enumeration value="thick-thin-large-gap"></xsd:enumeration><xsd:enumeration value="thin-thick-thin-large-gap"></xsd:enumeration><xsd:enumeration value="wave"></xsd:enumeration><xsd:enumeration value="double-wave"></xsd:enumeration><xsd:enumeration value="dash-small-gap"></xsd:enumeration><xsd:enumeration value="dash-dot-stroked"></xsd:enumeration><xsd:enumeration value="three-d-emboss"></xsd:enumeration><xsd:enumeration value="three-d-engrave"></xsd:enumeration><xsd:enumeration value="outset"></xsd:enumeration><xsd:enumeration value="inset"></xsd:enumeration><xsd:enumeration value="apples"></xsd:enumeration><xsd:enumeration value="arched-scallops"></xsd:enumeration><xsd:enumeration value="baby-pacifier"></xsd:enumeration><xsd:enumeration value="baby-rattle"></xsd:enumeration><xsd:enumeration value="balloons-3-colors"></xsd:enumeration><xsd:enumeration value="balloons-hot-air"></xsd:enumeration><xsd:enumeration value="basic-black-dashes"></xsd:enumeration><xsd:enumeration value="basic-black-dots"></xsd:enumeration><xsd:enumeration value="basic-black-squares"></xsd:enumeration><xsd:enumeration value="basic-thin-lines"></xsd:enumeration><xsd:enumeration value="basic-white-dashes"></xsd:enumeration><xsd:enumeration value="basic-white-dots"></xsd:enumeration><xsd:enumeration value="basic-white-squares"></xsd:enumeration><xsd:enumeration value="basic-wide-inline"></xsd:enumeration><xsd:enumeration value="basic-wide-midline"></xsd:enumeration><xsd:enumeration value="basic-wide-outline"></xsd:enumeration><xsd:enumeration value="bats"></xsd:enumeration><xsd:enumeration value="birds"></xsd:enumeration><xsd:enumeration value="birds-flight"></xsd:enumeration><xsd:enumeration value="cabins"></xsd:enumeration><xsd:enumeration value="cake-slice"></xsd:enumeration><xsd:enumeration value="candy-corn"></xsd:enumeration><xsd:enumeration value="celtic-knotwork"></xsd:enumeration><xsd:enumeration value="certificate-banner"></xsd:enumeration><xsd:enumeration value="chain-link"></xsd:enumeration><xsd:enumeration value="champagne-bottle"></xsd:enumeration><xsd:enumeration value="checked-bar-black"></xsd:enumeration><xsd:enumeration value="checked-bar-color"></xsd:enumeration><xsd:enumeration value="checkered"></xsd:enumeration><xsd:enumeration value="christmas-tree"></xsd:enumeration><xsd:enumeration value="circles-lines"></xsd:enumeration><xsd:enumeration value="circles-rectangles"></xsd:enumeration><xsd:enumeration value="classical-wave"></xsd:enumeration><xsd:enumeration value="clocks"></xsd:enumeration><xsd:enumeration value="compass"></xsd:enumeration><xsd:enumeration value="confetti"></xsd:enumeration><xsd:enumeration value="confetti-grays"></xsd:enumeration><xsd:enumeration value="confetti-outline"></xsd:enumeration><xsd:enumeration value="confetti-streamers"></xsd:enumeration><xsd:enumeration value="confetti-white"></xsd:enumeration><xsd:enumeration value="corner-triangles"></xsd:enumeration><xsd:enumeration value="coupon-cutout-dashes"></xsd:enumeration><xsd:enumeration value="coupon-cutout-dots"></xsd:enumeration><xsd:enumeration value="crazy-maze"></xsd:enumeration><xsd:enumeration value="creatures-butterfly"></xsd:enumeration><xsd:enumeration value="creatures-fish"></xsd:enumeration><xsd:enumeration value="creaturesinsects"></xsd:enumeration><xsd:enumeration value="creatures-lady-bug"></xsd:enumeration><xsd:enumeration value="cross-stitch"></xsd:enumeration><xsd:enumeration value="cup"></xsd:enumeration><xsd:enumeration value="deco-arch"></xsd:enumeration><xsd:enumeration value="deco-arch-color"></xsd:enumeration><xsd:enumeration value="deco-blocks"></xsd:enumeration><xsd:enumeration value="diamonds-gray"></xsd:enumeration><xsd:enumeration value="double-d"></xsd:enumeration><xsd:enumeration value="double-diamonds"></xsd:enumeration><xsd:enumeration value="earth-1"></xsd:enumeration><xsd:enumeration value="earth-2"></xsd:enumeration><xsd:enumeration value="eclipsing-squares-1"></xsd:enumeration><xsd:enumeration value="eclipsing-squares-2"></xsd:enumeration><xsd:enumeration value="eggs-black"></xsd:enumeration><xsd:enumeration value="fans"></xsd:enumeration><xsd:enumeration value="film"></xsd:enumeration><xsd:enumeration value="firecrackers"></xsd:enumeration><xsd:enumeration value="flowers-block-print"></xsd:enumeration><xsd:enumeration value="flowers-daisies"></xsd:enumeration><xsd:enumeration value="flowers-modern-1"></xsd:enumeration><xsd:enumeration value="flowers-modern-2"></xsd:enumeration><xsd:enumeration value="flowers-pansy"></xsd:enumeration><xsd:enumeration value="flowers-red-rose"></xsd:enumeration><xsd:enumeration value="flowers-roses"></xsd:enumeration><xsd:enumeration value="flowers-teacup"></xsd:enumeration><xsd:enumeration value="flowers-tiny"></xsd:enumeration><xsd:enumeration value="gems"></xsd:enumeration><xsd:enumeration value="gingerbread-man"></xsd:enumeration><xsd:enumeration value="gradient"></xsd:enumeration><xsd:enumeration value="handmade- 1"></xsd:enumeration><xsd:enumeration value="handmade-2"></xsd:enumeration><xsd:enumeration value="heart-balloon"></xsd:enumeration><xsd:enumeration value="heart-gray"></xsd:enumeration><xsd:enumeration value="hearts"></xsd:enumeration><xsd:enumeration value="heebie-jeebies"></xsd:enumeration><xsd:enumeration value="holly"></xsd:enumeration><xsd:enumeration value="house-funky"></xsd:enumeration><xsd:enumeration value="hypnotic"></xsd:enumeration><xsd:enumeration value="ice-cream-cones"></xsd:enumeration><xsd:enumeration value="light-bulb"></xsd:enumeration><xsd:enumeration value="lightning-1"></xsd:enumeration><xsd:enumeration value="lightning-2"></xsd:enumeration><xsd:enumeration value="map-pins"></xsd:enumeration><xsd:enumeration value="maple-leaf"></xsd:enumeration><xsd:enumeration value="maple-muffins"></xsd:enumeration><xsd:enumeration value="marquee"></xsd:enumeration><xsd:enumeration value="marquee-toothed"></xsd:enumeration><xsd:enumeration value="moons"></xsd:enumeration><xsd:enumeration value="mosaic"></xsd:enumeration><xsd:enumeration value="music-notes"></xsd:enumeration><xsd:enumeration value="northwest"></xsd:enumeration><xsd:enumeration value="ovals"></xsd:enumeration><xsd:enumeration value="packages"></xsd:enumeration><xsd:enumeration value="palms-black"></xsd:enumeration><xsd:enumeration value="palms-color"></xsd:enumeration><xsd:enumeration value="paper-clips"></xsd:enumeration><xsd:enumeration value="papyrus"></xsd:enumeration><xsd:enumeration value="party-favor"></xsd:enumeration><xsd:enumeration value="party-glass"></xsd:enumeration><xsd:enumeration value="pencils"></xsd:enumeration><xsd:enumeration value="people"></xsd:enumeration><xsd:enumeration value="people-waving"></xsd:enumeration><xsd:enumeration value="people-hats"></xsd:enumeration><xsd:enumeration value="poinsettias"></xsd:enumeration><xsd:enumeration value="postage-stamp"></xsd:enumeration><xsd:enumeration value="pumpkin-1"></xsd:enumeration><xsd:enumeration value="push-pin-note-2"></xsd:enumeration><xsd:enumeration value="push-pin-note-1"></xsd:enumeration><xsd:enumeration value="pyramids"></xsd:enumeration><xsd:enumeration value="pyramids-above"></xsd:enumeration><xsd:enumeration value="quadrants"></xsd:enumeration><xsd:enumeration value="rings"></xsd:enumeration><xsd:enumeration value="safari"></xsd:enumeration><xsd:enumeration value="sawtooth"></xsd:enumeration><xsd:enumeration value="sawtooth-gray"></xsd:enumeration><xsd:enumeration value="scared-cat"></xsd:enumeration><xsd:enumeration value="seattle"></xsd:enumeration><xsd:enumeration value="shadowed-squares"></xsd:enumeration><xsd:enumeration value="sharks-teeth"></xsd:enumeration><xsd:enumeration value="shorebird-tracks"></xsd:enumeration><xsd:enumeration value="skyrocket"></xsd:enumeration><xsd:enumeration value="snowflake-fancy"></xsd:enumeration><xsd:enumeration value="snowflakes"></xsd:enumeration><xsd:enumeration value="sombrero"></xsd:enumeration><xsd:enumeration value="southwest"></xsd:enumeration><xsd:enumeration value="stars"></xsd:enumeration><xsd:enumeration value="stars-top"></xsd:enumeration><xsd:enumeration value="stars-3d"></xsd:enumeration><xsd:enumeration value="stars-black"></xsd:enumeration><xsd:enumeration value="starsshadowed"></xsd:enumeration><xsd:enumeration value="sun"></xsd:enumeration><xsd:enumeration value="swirligig"></xsd:enumeration><xsd:enumeration value="torn-paper"></xsd:enumeration><xsd:enumeration value="torn-paper-black"></xsd:enumeration><xsd:enumeration value="trees"></xsd:enumeration><xsd:enumeration value="triangle-party"></xsd:enumeration><xsd:enumeration value="triangles"></xsd:enumeration><xsd:enumeration value="tribal-1"></xsd:enumeration><xsd:enumeration value="tribal-2"></xsd:enumeration><xsd:enumeration value="tribal-3"></xsd:enumeration><xsd:enumeration value="tribal-4"></xsd:enumeration><xsd:enumeration value="tribal-5"></xsd:enumeration><xsd:enumeration value="tribal-6"></xsd:enumeration><xsd:enumeration value="twisted-lines-1"></xsd:enumeration><xsd:enumeration value="twisted-lines-2"></xsd:enumeration><xsd:enumeration value="vine"></xsd:enumeration><xsd:enumeration value="waveline"></xsd:enumeration><xsd:enumeration value="weaving-angles"></xsd:enumeration><xsd:enumeration value="weaving-braid"></xsd:enumeration><xsd:enumeration value="weaving-ribbon"></xsd:enumeration><xsd:enumeration value="weaving-strips"></xsd:enumeration><xsd:enumeration value="white-flowers"></xsd:enumeration><xsd:enumeration value="woodwork"></xsd:enumeration><xsd:enumeration value="x-illusions"></xsd:enumeration><xsd:enumeration value="zany-triangles"></xsd:enumeration><xsd:enumeration value="zig-zag"></xsd:enumeration><xsd:enumeration value="zig-zag-stitch"></xsd:enumeration></xsd:restriction></xsd:simpleType><xsd:complexType name="BorderProperty"><xsd:attribute name="val" type="BorderValues" use="required"></xsd:attribute><xsd:attribute name="color" type="HexColorType"

use="optional"></xsd:attribute><xsd:attribute name="sz" type="DecimalNumberType" use="required"></xsd:attribute><xsd:attribute name="space" type="DecimalNumberType" use="optional"></xsd:attribute><xsd:attribute name="shadow" type="BooleanType" use="optional"></xsd:attribute><xsd:attribute name="frame" type="BooleanType" use="optional"></xsd:attribute></xsd:complexType><xsd:simpleType name="ShdValues"><xsd:restriction base="xsd:string"><xsd:enumeration value="nil"></xsd:enumeration><xsd:enumeration value="clear"></xsd:enumeration><xsd:enumeration value="solid"></xsd:enumeration><xsd:enumeration value="horz-stripe"></xsd:enumeration><xsd:enumeration value="vert-stripe"></xsd:enumeration><xsd:enumeration value="reverse-diag-stripe"></xsd:enumeration><xsd:enumeration value="diag-stripe"></xsd:enumeration><xsd:enumeration value="horz-cross"></xsd:enumeration><xsd:enumeration value="diag-cross"></xsd:enumeration><xsd:enumeration value="thin-horz-stripe"></xsd:enumeration><xsd:enumeration value="thin-vert-stripe"></xsd:enumeration><xsd:enumeration value="thin-reverse-diag-stripe"></xsd:enumeration><xsd:enumeration value="thin-diag-stripe"></xsd:enumeration><xsd:enumeration value="thin-horz-cross"></xsd:enumeration><xsd:enumeration value="thin-diag-cross"></xsd:enumeration><xsd:enumeration value="pct-5"></xsd:enumeration><xsd:enumeration value="pct-10"></xsd:enumeration><xsd:enumeration value="pct-12"></xsd:enumeration><xsd:enumeration value="pct-15"></xsd:enumeration><xsd:enumeration value="pct-20"></xsd:enumeration><xsd:enumeration value="pct-25"></xsd:enumeration><xsd:enumeration value="pct-30"></xsd:enumeration><xsd:enumeration value="pct-35"></xsd:enumeration><xsd:enumeration value="pct- 37"></xsd:enumeration><xsd:enumeration value="pct-40"></xsd:enumeration><xsd:enumeration value="pct-45"></xsd:enumeration><xsd:enumeration value="pct-50"></xsd:enumeration><xsd:enumeration value="pct-55"></xsd:enumeration><xsd:enumeration value="pct-60"></xsd:enumeration><xsd:enumeration value="pct-62"></xsd:enumeration><xsd:enumeration value="pct-65"></xsd:enumeration><xsd:enumeration value="pct-70"></xsd:enumeration><xsd:enumeration value="pct-75"></xsd:enumeration><xsd:enumeration value="pct-80"></xsd:enumeration><xsd:enumeration value="pct-85"></xsd:enumeration><xsd:enumeration value="pct-87"></xsd:enumeration><xsd:enumeration value="pct-90"></xsd:enumeration><xsd:enumeration value="pct-95"></xsd:enumeration></xsd:restriction></xsd:simpleType><xsd:complexType name="ShdProperty"><xsd:attribute name="val" type="ShdValues" use="required"></xsd:attribute><xsd:attribute name="color" type="HexColorType" use="optional"></xsd:attribute><xsd:attribute name="fill" type="HexColorType" use="optional"></xsd:attribute></xsd:complexType><xsd:complexType name="FitTextProperty"><xsd:attribute name="val" type="TwipsMeasureType" use="required"></xsd:attribute><xsd:attribute name="id" type="DecimalNumberType" use="optional"></xsd:attribute></xsd:complexType><xsd:simpleType name="HyphenRule"><xsd:restriction base="xsd:string"><xsd:enumeration value="none"></xsd:enumeration><xsd:enumeration value="normal"></xsd:enumeration><xsd:enumeration value="add-before"></xsd:enumeration><xsd:enumeration value="change-before"></xsd:enumeration><xsd:enumeration value="delete-before"></xsd:enumeration><xsd:enumeration value="change-after"></xsd:enumeration><xsd:enumeration value="delete-and-change"></xsd:enumeration></xsd:restriction></xsd:simpleType><xsd:complexType name="HyphenProperty"><xsd:attribute name="val" type="StringType" use="required"></xsd:attribute><xsd:attribute name="rule" type="HyphenRule" use="required"></xsd:attribute></xsd:complexType><xsd:simpleType name="EMValue"><xsd:restriction base="xsd:string"><xsd:enumeration value="none"></xsd:enumeration><xsd:enumeration value="dot"></xsd:enumeration><xsd:enumeration value="comma"></xsd:enumeration><xsd:enumeration value="circle"></xsd:enumeration><xsd:enumeration value="under-dot"></xsd:enumeration></xsd:restriction></xsd:simpleType><xsd:complexType name="EMProperty"><xsd:attribute name="val" type="EMValue" use="required"></xsd:attribute></xsd:complexType><xsd:complexType name="langElt"><xsd:attribute name="val" type="StringType" use="optional"></xsd:attribute><xsd:attribute name="fareast" type="StringType" use="optional"></xsd:attribute><xsd:attribute name="bidi" type="StringType" use="optional"></xsd:attribute></xsd:complexType><xsd:simpleType name="CombineBracketsType"><xsd:restriction base="xsd:string"><xsd:enumeration value="none"></xsd:enumeration><xsd:enumeration value="round"></xsd:enumeration><xsd:enumeration value="square"></xsd:enumeration><xsd:enumeration value="angle"></xsd:enumeration><xsd:enumeration value="curly"></xsd:enumeration></xsd:restriction></xsd:simpleType><xsd:simpleType name="CombineType"><xsd:restriction base="xsd:string"><xsd:enumeration value="lines"></xsd:enumeration><xsd:enumeration value="letters"></xsd:enumeration></xsd:restriction></xsd:simpleType><xsd:complexType name="AsianLayoutElt"><xsd:attribute name="id" type="DecimalNumberType" use="required"></xsd:attribute><xsd:attribute name="combine" type="CombineType" use="optional"></xsd:attribute><xsd:attribute name="combine-brackets" type="CombineBracketsType" use="optional"></xsd:attribute><xsd:attribute name="vert" type="BooleanType" use="optional"></xsd:attribute><xsd:attribute name="vert-compress" type="BooleanType"

```
use="optional"></xsd:attribute></xsd:complexType><xsd:simpleType
name="XAlignType"><xsd:restriction base="xsd:string"><xsd:enumeration
value="left"></xsd:enumeration><xsd:enumeration
value="center"></xsd:enumeration><xsd:enumeration
value="right"></xsd:enumeration><xsd:enumeration
value="inside"></xsd:enumeration><xsd:enumeration
value="outside"></xsd:enumeration></xsd:restriction></xsd:simpleType><xsd:simple
Type name="YAlignType"><xsd:restriction base="xsd:string"><xsd:enumeration
value="inline"></xsd:enumeration><xsd:enumeration
value="top"></xsd:enumeration><xsd:enumeration
value="center"></xsd:enumeration><xsd:enumeration
value="bottom"></xsd:enumeration><xsd:enumeration
value="inside"></xsd:enumeration><xsd:enumeration
value="outside"></xsd:enumeration></xsd:restriction></xsd:simpleType><xsd:simple
Type name="HeightRuleType"><xsd:restriction base="xsd:string"><xsd:enumeration
value="exact"></xsd:enumeration><xsd:enumeration value="at-
least"></xsd:enumeration></xsd:restriction></xsd:simpleType><xsd:simpleType
name="WrapValue"><xsd:restriction base="xsd:string"><xsd:enumeration
value="auto"></xsd:enumeration><xsd:enumeration value="not-
beside"></xsd:enumeration><xsd:enumeration
value="around"></xsd:enumeration><xsd:enumeration
value="tight"></xsd:enumeration><xsd:enumeration
value="through"></xsd:enumeration><xsd:enumeration
value="none"></xsd:enumeration></xsd:restriction></xsd:simpleType><xsd:simpleTy
pe name="VAnchorValue"><xsd:restriction base="xsd:string"><xsd:enumeration
value="text"></xsd:enumeration><xsd:enumeration
value="margin"></xsd:enumeration><xsd:enumeration
value="page"></xsd:enumeration></xsd:restriction></xsd:simpleType><xsd:simpleTy
pe name="HAnchorValue"><xsd:restriction base="xsd:string"><xsd:enumeration
value="text"></xsd:enumeration><xsd:enumeration
```

```
value="margin"></xsd:enumeration><xsd:enumeration
value="page"></xsd:enumeration></xsd:restriction></xsd:simpleType><xsd:simpleTy
pe name="DropCapValue"><xsd:restriction base="xsd:string"><xsd:enumeration
value="none"></xsd:enumeration><xsd:enumeration
value="drop"></xsd:enumeration><xsd:enumeration
value="margin"></xsd:enumeration></xsd:restriction></xsd:simpleType><xsd:comple
xType name="FramePrProperty"><xsd:attribute name="drop-cap"
type="DropCapValue" use="optional"></xsd:attribute><xsd:attribute name="lines"
type="DecimalNumberType" use="optional"></xsd:attribute><xsd:attribute name="w"
type="DecimalNumberType" use="optional"></xsd:attribute><xsd:attribute name="h"
type="DecimalNumberType" use="optional"></xsd:attribute><xsd:attribute
name="vspace" type="DecimalNumberType"
use="optional"></xsd:attribute><xsd:attribute name="hspace"
type="DecimalNumberType" use="optional"></xsd:attribute><xsd:attribute
name="wrap" type="WrapValue" use="optional"></xsd:attribute><xsd:attribute
name="hanchor" type="HAnchorValue" use="optional"></xsd:attribute><xsd:attribute
name="vanchor" type="VAnchorValue" use="optional"></xsd:attribute><xsd:attribute
name="x" type="DecimalNumberType" use="optional"></xsd:attribute><xsd:attribute
name="x-align" type="XAlignType" use="optional"></xsd:attribute><xsd:attribute
name="y" type="DecimalNumberType" use="optional"></xsd:attribute><xsd:attribute
name="y-align" type="YAlignType" use="optional"></xsd:attribute><xsd:attribute
name="h-rule" type="HeightRuleType" use="optional"></xsd:attribute><xsd:attribute
name="anchor-lock" type="BooleanType"
use="optional"></xsd:attribute></xsd:complexType><xsd:simpleType
name="TabJCValue"><xsd:restriction base="xsd:string"><xsd:enumeration
value="clear"></xsd:enumeration><xsd:enumeration
value="left"></xsd:enumeration><xsd:enumeration
value="center"></xsd:enumeration><xsd:enumeration
value="right"></xsd:enumeration><xsd:enumeration
value="decimal"></xsd:enumeration><xsd:enumeration
```

```
value="bar"></xsd:enumeration><xsd:enumeration
value="list"></xsd:enumeration></xsd:restriction></xsd:simpleType><xsd:simpleType
name="TabTLCValue"><xsd:restriction base="xsd:string"><xsd:enumeration
value="none"></xsd:enumeration><xsd:enumeration
value="dot"></xsd:enumeration><xsd:enumeration
value="hyphen"></xsd:enumeration><xsd:enumeration
value="underscore"></xsd:enumeration><xsd:enumeration
value="heavy"></xsd:enumeration><xsd:enumeration value="middle-
dot"></xsd:enumeration></xsd:restriction></xsd:simpleType><xsd:complexType
name="TabProperty"><xsd:attribute name="val" type="TabJCValue"
use="required"></xsd:attribute><xsd:attribute name="leader" type="TabTLCValue"
use="required"></xsd:attribute><xsd:attribute name="pos"
type="DecimalNumberType"
use="required"></xsd:attribute></xsd:complexType><xsd:simpleType
name="LineSpacingRuleValue"><xsd:restriction base="xsd:string"><xsd:enumeration
value="auto"></xsd:enumeration><xsd:enumeration
value="exact"></xsd:enumeration><xsd:enumeration value="at-
least"></xsd:enumeration></xsd:restriction></xsd:simpleType><xsd:complexType
name="SpacingProperty"><xsd:attribute name="before" type="DecimalNumberType"
use="optional"></xsd:attribute><xsd:attribute name="before-lines"
type="DecimalNumberType" use="optional"></xsd:attribute><xsd:attribute
name="before-autospacing" type="BooleanType"
use="optional"></xsd:attribute><xsd:attribute name="after"
type="DecimalNumberType" use="optional"></xsd:attribute><xsd:attribute
name="after-lines" type="DecimalNumberType"
use="optional"></xsd:attribute><xsd:attribute name="after-autospacing"
type="BooleanType" use="optional"></xsd:attribute><xsd:attribute name="line"
type="DecimalNumberType" use="optional"></xsd:attribute><xsd:attribute
name="line-rule" type="LineSpacingRuleValue"
use="optional"></xsd:attribute></xsd:complexType><xsd:complexType
``` name="IndProperty"><xsd:attribute name="left" type="DecimalNumberType" use="optional"></xsd:attribute><xsd:attribute name="left-chars" type="DecimalNumberType" use="optional"></xsd:attribute><xsd:attribute name="right" type="DecimalNumberType" use="optional"></xsd:attribute><xsd:attribute name="right-chars" type="DecimalNumberType" use="optional"></xsd:attribute><xsd:attribute name="hanging" type="DecimalNumberType" use="optional"></xsd:attribute><xsd:attribute name="hanging-chars" type="DecimalNumberType" use="optional"></xsd:attribute><xsd:attribute name="first-line" type="DecimalNumberType" use="optional"></xsd:attribute><xsd:attribute name="first-line-chars" type="DecimalNumberType" use="optional"></xsd:attribute></xsd:complexType><xsd:simpleType name="JcValue"><xsd:restriction base="xsd:string"><xsd:enumeration value="left"></xsd:enumeration><xsd:enumeration value="center"></xsd:enumeration><xsd:enumeration value="right"></xsd:enumeration><xsd:enumeration value="both"></xsd:enumeration><xsd:enumeration value="medium-kashida"></xsd:enumeration><xsd:enumeration value="distribute"></xsd:enumeration><xsd:enumeration value="list-tab"></xsd:enumeration><xsd:enumeration value="high-kashida"></xsd:enumeration><xsd:enumeration value="low-kashida"></xsd:enumeration><xsd:enumeration value="thai-distribute"></xsd:enumeration></xsd:restriction></xsd:simpleType><xsd:complexType name="JcProperty"><xsd:attribute name="val" type="JcValue" use="required"></xsd:attribute></xsd:complexType><xsd:simpleType name="ViewValue"><xsd:restriction base="xsd:string"><xsd:enumeration value="none"></xsd:enumeration><xsd:enumeration value="print"></xsd:enumeration><xsd:enumeration value="outline"></xsd:enumeration><xsd:enumeration value="masterpages"></xsd:enumeration><xsd:enumeration
value="normal"></xsd:enumeration><xsd:enumeration
value="web"></xsd:enumeration></xsd:restriction></xsd:simpleType><xsd:complexT
ype name="ViewProperty"><xsd:attribute name="val" type="ViewValue"
use="required"></xsd:attribute></xsd:complexType><xsd:simpleType
name="ZoomValue"><xsd:restriction base="xsd:string"><xsd:enumeration
value="none"></xsd:enumeration><xsd:enumeration value="full-
page"></xsd:enumeration><xsd:enumeration value="best-
fit"></xsd:enumeration><xsd:enumeration value="text-
fit"></xsd:enumeration></xsd:restriction></xsd:simpleType><xsd:complexType
name="ZoomProperty"><xsd:attribute name="val" type="ZoomValue"
use="optional"></xsd:attribute><xsd:attribute name="percent"
type="DecimalNumberType"
use="optional"></xsd:attribute></xsd:complexType><xsd:complexType
name="WritingStyleProperty"><xsd:attribute name="lang" type="StringType"
use="required"></xsd:attribute><xsd:attribute name="vendorID"
type="DecimalNumberType" use="required"></xsd:attribute><xsd:attribute
name="dllVersion" type="DecimalNumberType"
use="required"></xsd:attribute><xsd:attribute name="nlCheck" type="BooleanType"
use="required"></xsd:attribute><xsd:attribute name="optionSet"
type="DecimalNumberType"
use="required"></xsd:attribute></xsd:complexType><xsd:simpleType
name="ProofType"><xsd:restriction base="xsd:string"><xsd:enumeration
value="clean"></xsd:enumeration><xsd:enumeration
value="dirty"></xsd:enumeration></xsd:restriction></xsd:simpleType><xsd:complexT
ype name="ProofProperty"><xsd:attribute name="spelling" type="ProofType"
use="optional"></xsd:attribute><xsd:attribute name="grammar" type="ProofType"
use="optional"></xsd:attribute></xsd:complexType><xsd:simpleType
name="DocTypeValue"><xsd:restriction base="xsd:string"><xsd:enumeration
value="not-specified"></xsd:enumeration><xsd:enumeration value="letter"></xsd:enumeration><xsd:enumeration value="e-mail"></xsd:enumeration></xsd:restriction></xsd:simpleType><xsd:complexType name="DocTypeProperty"><xsd:attribute name="val" type="DocTypeValue" use="required"></xsd:attribute></xsd:complexType><xsd:simpleType name="DocProtectValue"><xsd:restriction base="xsd:string"><xsd:enumeration value="none"></xsd:enumeration><xsd:enumeration value="read-only"></xsd:enumeration><xsd:enumeration value="comments"></xsd:enumeration><xsd:enumeration value="tracked-changes"></xsd:enumeration><xsd:enumeration value="forms"></xsd:enumeration></xsd:restriction></xsd:simpleType><xsd:complexType name="DocProtectProperty"><xsd:attribute name="val" type="DocProtectValue" use="required"></xsd:attribute></xsd:complexType><xsd:simpleType name="MMDocTypeValue"><xsd:restriction base="xsd:string"><xsd:enumeration value="catalog"></xsd:enumeration><xsd:enumeration value="envelopes"></xsd:enumeration><xsd:enumeration value="mailing-labels"></xsd:enumeration><xsd:enumeration value="form-letters"></xsd:enumeration><xsd:enumeration value="email"></xsd:enumeration><xsd:enumeration value="fax"></xsd:enumeration></xsd:restriction></xsd:simpleType><xsd:complexType name="MMDocTypeProperty"><xsd:attribute name="val" type="MMDocTypeValue" use="required"></xsd:attribute></xsd:complexType><xsd:simpleType name="MMDataTypeValue"><xsd:restriction base="xsd:string"><xsd:enumeration value="file"></xsd:enumeration><xsd:enumeration value="Access"></xsd:enumeration><xsd:enumeration value="Excel"></xsd:enumeration><xsd:enumeration value="QT"></xsd:enumeration><xsd:enumeration value="ODBC"></xsd:enumeration><xsd:enumeration value="ODSO"></xsd:enumeration></xsd:restriction></xsd:simpleType><xsd:complexType name="MMDataTypeProperty"><xsd:attribute name="val"

```
type="MMDataTypeValue"
use="required"></xsd:attribute></xsd:complexType><xsd:simpleType
name="MMDestValue"><xsd:restriction base="xsd:string"><xsd:enumeration
value="new-document"></xsd:enumeration><xsd:enumeration
value="printer"></xsd:enumeration><xsd:enumeration
value="email"></xsd:enumeration><xsd:enumeration
value="fax"></xsd:enumeration><xsd:enumeration value="check-
errors"></xsd:enumeration><xsd:enumeration value="insert-
data"></xsd:enumeration></xsd:restriction></xsd:simpleType><xsd:complexType
name="MMDestProperty"><xsd:attribute name="val" type="MMDestValue"
use="required"></xsd:attribute></xsd:complexType><xsd:simpleType
name="MMOdsoFMDFieldTypeValue"><xsd:restriction
base="xsd:string"><xsd:enumeration
value="null"></xsd:enumeration><xsd:enumeration value="db-
column"></xsd:enumeration><xsd:enumeration value="address-
block"></xsd:enumeration><xsd:enumeration
value="salutation"></xsd:enumeration><xsd:enumeration
value="mapped"></xsd:enumeration><xsd:enumeration
value="barcode"></xsd:enumeration></xsd:restriction></xsd:simpleType><xsd:compl
exType name="MMOdsoFMDFieldTypeProperty"><xsd:attribute name="val"
type="MMOdsoFMDFieldTypeValue"
use="required"></xsd:attribute></xsd:complexType><xsd:complexType
name="DocPrStyleProperty"><xsd:attribute name="sti" type="StringType"
use="optional"></xsd:attribute><xsd:attribute name="val" type="StringType"
use="required"></xsd:attribute></xsd:complexType><xsd:complexType
name="KinsokuProperty"><xsd:attribute name="lang" type="StringType"
use="optional"></xsd:attribute><xsd:attribute name="val" type="StringType"
use="required"></xsd:attribute></xsd:complexType><xsd:simpleType
name="CustomPropType"><xsd:restriction base="xsd:string"><xsd:enumeration
value="string"></xsd:enumeration><xsd:enumeration
```

```
value="bool"></xsd:enumeration><xsd:enumeration
value="date"></xsd:enumeration><xsd:enumeration
value="float"></xsd:enumeration><xsd:enumeration
value="dw"></xsd:enumeration></xsd:restriction></xsd:simpleType><xsd:simpleType
name="TextDirectionValue"><xsd:restriction base="xsd:string"><xsd:enumeration
value="lr-tb"></xsd:enumeration><xsd:enumeration value="tb-
rl"></xsd:enumeration><xsd:enumeration value="bt-
lr"></xsd:enumeration><xsd:enumeration value="lr-tb-
v"></xsd:enumeration><xsd:enumeration value="tb-rl-
v"></xsd:enumeration></xsd:restriction></xsd:simpleType><xsd:complexType
name="TextDirectionProperty"><xsd:attribute name="val" type="TextDirectionValue"
use="required"></xsd:attribute></xsd:complexType><xsd:simpleType
name="TextAlignmentValue"><xsd:restriction base="xsd:string"><xsd:enumeration
value="top"></xsd:enumeration><xsd:enumeration
value="center"></xsd:enumeration><xsd:enumeration
value="baseline"></xsd:enumeration><xsd:enumeration
value="bottom"></xsd:enumeration><xsd:enumeration
value="auto"></xsd:enumeration></xsd:restriction></xsd:simpleType><xsd:complexT
ype name="TextAlignmentProperty"><xsd:attribute name="val"
type="TextAlignmentValue"
use="required"></xsd:attribute></xsd:complexType><xsd:simpleType
name="AnnotationValuesType"><xsd:restriction base="xsd:string"><xsd:enumeration
value="Word.Insertion"></xsd:enumeration><xsd:enumeration
value="Word.Deletion"></xsd:enumeration><xsd:enumeration
value="Word.Formatting"></xsd:enumeration><xsd:enumeration
value="Word.Bookmark.Start"></xsd:enumeration><xsd:enumeration
value="Word.Bookmark.End"></xsd:enumeration><xsd:enumeration
value="Word.Comment.Start"></xsd:enumeration><xsd:enumeration
value="Word.Comment.End"></xsd:enumeration><xsd:enumeration
value="Word.Insertion.Start"></xsd:enumeration><xsd:enumeration
```

```
value="Word.Insertion.End"></xsd:enumeration><xsd:enumeration
value="Word.Deletion.Start"></xsd:enumeration><xsd:enumeration
value="Word.Deletion.End"></xsd:enumeration><xsd:enumeration
value="Word.Comment"></xsd:enumeration><xsd:enumeration
value="Word.Numbering"></xsd:enumeration></xsd:restriction></xsd:simpleType><x
sd:attributeGroup name="WordAnnotationGroup"><xsd:attribute name="type"
type="AnnotationValuesType" use="required"></xsd:attribute><xsd:attribute
name="name" type="StringType" use="optional"></xsd:attribute><xsd:attribute
name="initials" type="StringType" use="optional"></xsd:attribute><xsd:attribute
name="col-first" type="DecimalNumberType"
use="optional"></xsd:attribute><xsd:attribute name="col-last"
type="DecimalNumberType" use="optional"></xsd:attribute><xsd:attribute
name="original" type="StringType"
use="optional"></xsd:attribute></xsd:attributeGroup><xsd:complexType
name="pPrElt"><xsd:sequence><xsd:element name="PStyle" type="StringProperty"
minOccurs="0"></xsd:element><xsd:element name="KeepNext"
type="BooleanProperty" minOccurs="0"></xsd:element><xsd:element
name="KeepLines" type="BooleanProperty"
minOccurs="0"></xsd:element><xsd:element name="PageBreakBefore"
type="BooleanProperty" minOccurs="0"></xsd:element><xsd:element
name="FramePr" type="FramePrProperty"
minOccurs="0"></xsd:element><xsd:element name="WidowControl"
type="BooleanProperty" minOccurs="0"></xsd:element><xsd:element name="listPr"
minOccurs="0"><xsd:complexType><xsd:sequence><xsd:element name="Ilvl"
type="DecimalNumberProperty" minOccurs="0"></xsd:element><xsd:element
name="Ilfo" type="DecimalNumberProperty"
minOccurs="0"></xsd:element></xsd:sequence></xsd:complexType></xsd:element><
xsd:element name="SuppressLineNumbers" type="BooleanProperty"
minOccurs="0"></xsd:element><xsd:element name="bdr"
minOccurs="0"><xsd:complexType><xsd:sequence><xsd:element name="Top"
```

```
type="BorderProperty" minOccurs="0"></xsd:element><xsd:element name="Left"
type="BorderProperty" minOccurs="0"></xsd:element><xsd:element name="Bottom"
type="BorderProperty" minOccurs="0"></xsd:element><xsd:element name="Right"
type="BorderProperty" minOccurs="0"></xsd:element><xsd:element name="Between"
type="BorderProperty" minOccurs="0"></xsd:element><xsd:element name="Bar"
type="BorderProperty"
minOccurs="0"></xsd:element></xsd:sequence></xsd:complexType></xsd:element><
xsd:element name="Shd" type="ShdProperty"
minOccurs="0"></xsd:element><xsd:element name="tabs"
minOccurs="0"><xsd:complexType><xsd:sequence><xsd:element name="Tab"
type="TabProperty" minOccurs="1"
maxOccurs="unbounded"></xsd:element></xsd:sequence></xsd:complexType></xsd:
element><xsd:element name="SuppressAutoHyphens" type="BooleanProperty"
minOccurs="0"></xsd:element><xsd:element name="Kinsoku"
type="BooleanProperty" minOccurs="0"></xsd:element><xsd:element
name="WordWrap" type="BooleanProperty"
minOccurs="0"></xsd:element><xsd:element name="OverflowPunct"
type="BooleanProperty" minOccurs="0"></xsd:element><xsd:element
name="TopLinePunct" type="BooleanProperty"
minOccurs="0"></xsd:element><xsd:element name="AutospaceDE"
type="BooleanProperty" minOccurs="0"></xsd:element><xsd:element
name="AutoSpaceDN" type="BooleanProperty"
minOccurs="0"></xsd:element><xsd:element name="BiDi" type="BooleanProperty"
minOccurs="0"></xsd:element><xsd:element name="AdjustRightInd"
type="BooleanProperty" minOccurs="0"></xsd:element><xsd:element
name="SnapToGrid" type="BooleanProperty"
minOccurs="0"></xsd:element><xsd:element name="Spacing"
type="SpacingProperty" minOccurs="0"></xsd:element><xsd:element name="Ind"
type="IndProperty" minOccurs="0"></xsd:element><xsd:element
name="ContextualSpacing" type="BooleanProperty"
```

```
minOccurs="0"></xsd:element><xsd:element name="SuppressOverlap"
type="BooleanProperty" minOccurs="0"></xsd:element><xsd:element name="Jc"
type="JcProperty" minOccurs="0"></xsd:element><xsd:element
name="TextDirection" type="TextDirectionProperty"
minOccurs="0"></xsd:element><xsd:element name="TextAlignment"
type="TextAlignmentProperty" minOccurs="0"></xsd:element><xsd:element
name="OutlineLvl" type="DecimalNumberProperty"
minOccurs="0"></xsd:element><xsd:element name="DivId"
type="DecimalNumberProperty" minOccurs="0"></xsd:element><xsd:element
name="rPr" type="rPrElt" minOccurs="0"></xsd:element><xsd:element
name="sectPr" type="sectPrElt"
minOccurs="0"></xsd:element></xsd:sequence></xsd:complexType><xsd:complexTy
pe name="binDataType"><xsd:simpleContent><xsd:extension
base="Base64NumberList76"><xsd:attribute name="name" type="xsd:string"
use="required"></xsd:attribute></xsd:extension></xsd:simpleContent></xsd:complexT
ype><xsd:simpleType
name="Base64NumberList76"><xsd:list><xsd:simpleType><xsd:restriction
base="xsd:base64Binary"><xsd:maxLength
value="608"></xsd:maxLength></xsd:restriction></xsd:simpleType></xsd:list></xsd:s
impleType><xsd:complexType name="OcxType"><xsd:attribute name="id"
type="StringType" use="required"></xsd:attribute><xsd:attribute name="name"
type="StringType" use="optional"></xsd:attribute><xsd:attribute name="classid"
type="StringType" use="required"></xsd:attribute><xsd:attribute name="shapeid"
type="StringType" use="optional"></xsd:attribute><xsd:attribute name="class"
type="StringType" use="optional"></xsd:attribute><xsd:attribute name="w"
type="StringType" use="required"></xsd:attribute><xsd:attribute name="h"
type="StringType" use="required"></xsd:attribute><xsd:attribute name="align"
type="StringType" use="optional"></xsd:attribute><xsd:attribute name="data"
type="StringType"
use="optional"></xsd:attribute></xsd:complexType><xsd:complexType
```

```
name="PictureType"><xsd:sequence><xsd:element name="binData"
type="binDataType" minOccurs="0"></xsd:element><xsd:element name="movie"
type="binDataType" minOccurs="0"></xsd:element><xsd:choice minOccurs="0"
maxOccurs="1"><xsd:element name="Background"
minOccurs="0"><xsd:complexType><xsd:attribute name="bgcolor" type="StringType"
use="optional"></xsd:attribute><xsd:attribute name="background" type="StringType"
use="optional"></xsd:attribute></xsd:complexType></xsd:element><xsd:element
name="applet" type="appletElt"></xsd:element><xsd:element
name="MsAccessHTML" type="xsd:string"></xsd:element><xsd:element
name="scriptAnchor" type="ScriptAnchorType"></xsd:element><xsd:element
name="Ocx" type="OcxType"
minOccurs="0"></xsd:element></xsd:choice></xsd:sequence></xsd:complexType><x
sd:complexType name="appletElt"><xsd:sequence><xsd:element name="Args"
minOccurs="0" type="StringType"></xsd:element><xsd:element name="AppletText"
type="StringType"></xsd:element></xsd:sequence></xsd:complexType><xsd:complex
Type name="ScriptAnchorType"><xsd:sequence><xsd:element name="ScriptId"
minOccurs="0" type="StringType"></xsd:element><xsd:element name="Language"
minOccurs="0" type="StringType"></xsd:element><xsd:element name="Args"
minOccurs="0" type="StringType"></xsd:element><xsd:element name="ScriptText"
minOccurs="0"
type="StringType"></xsd:element></xsd:sequence></xsd:complexType><xsd:complex
Type name="SimpleFieldType"><xsd:sequence><xsd:element name="fldData"
type="StringType" minOccurs="0" maxOccurs="1"></xsd:element><xsd:element
name="r" type="rElt" minOccurs="1"
maxOccurs="unbounded"></xsd:element></xsd:sequence><xsd:attribute name="instr"
type="StringType" use="required"></xsd:attribute><xsd:attribute name="fldLock"
type="BooleanType"></xsd:attribute></xsd:complexType><xsd:simpleType
name="charTypeProperty"><xsd:restriction base="xsd:string"><xsd:enumeration
value="Begin"></xsd:enumeration><xsd:enumeration
value="Separate"></xsd:enumeration><xsd:enumeration
```

```
value="End"></xsd:enumeration></xsd:restriction></xsd:simpleType><xsd:complexType name="fldCharType"><xsd:sequence><xsd:element name="fldData" type="StringType" minOccurs="0" maxOccurs="1"></xsd:element></xsd:sequence><xsd:attribute name="charType" type="charTypeProperty"></xsd:attribute><xsd:attribute name="fldLock" type="BooleanType"></xsd:attribute></xsd:complexType><xsd:complexType name="InstrTextType" mixed="true"><xsd:sequence minOccurs="0"><xsd:element name="DelText" type="StringType"></xsd:element></xsd:sequence></xsd:complexType><xsd:complexType name="HLinkType"><xsd:sequence><xsd:element name="r" type="rElt" minOccurs="1" maxOccurs="unbounded"></xsd:element></xsd:sequence><xsd:attribute name="bookmark" type="StringType" use="optional"></xsd:attribute><xsd:attribute name="target" type="StringType" use="optional"></xsd:attribute><xsd:attribute name="screenTip" type="StringType" use="optional"></xsd:attribute><xsd:attribute name="arbLocation" type="StringType" use="optional"></xsd:attribute><xsd:attribute name="noHistory" type="BooleanType" use="optional"></xsd:attribute><xsd:attribute name="dest" type="StringType" use="optional"></xsd:attribute></xsd:complexType><xsd:simpleType name="SectionMarkValue"><xsd:restriction base="xsd:string"><xsd:enumeration value="next-page"></xsd:enumeration><xsd:enumeration value="next-column"></xsd:enumeration><xsd:enumeration value="continuous"></xsd:enumeration><xsd:enumeration value="even-page"></xsd:enumeration><xsd:enumeration value="odd-page"></xsd:enumeration></xsd:restriction></xsd:simpleType><xsd:complexType name="SectTypeElt"><xsd:attribute name="val" type="SectionMarkValue"></xsd:attribute></xsd:complexType><xsd:complexType name="PaperSourceType"><xsd:attribute name="first" type="DecimalNumberType"></xsd:attribute><xsd:attribute name="other" type="DecimalNumberType"></xsd:attribute></xsd:complexType><xsd:simpleType
``` name="NumberFormatValue"><xsd:restriction base="xsd:string"><xsd:enumeration value="decimal"></xsd:enumeration><xsd:enumeration value="upper-roman"></xsd:enumeration><xsd:enumeration value="lower-roman"></xsd:enumeration><xsd:enumeration value="upper-letter"></xsd:enumeration><xsd:enumeration value="lower-letter"></xsd:enumeration><xsd:enumeration value="ordinal"></xsd:enumeration><xsd:enumeration value="cardinal-text"></xsd:enumeration><xsd:enumeration value="ordinal-text"></xsd:enumeration><xsd:enumeration value="hex"></xsd:enumeration><xsd:enumeration value="chicago"></xsd:enumeration><xsd:enumeration value="ideograph-digital"></xsd:enumeration><xsd:enumeration value="japanese-counting"></xsd:enumeration><xsd:enumeration value="aiueo"></xsd:enumeration><xsd:enumeration value="iroha"></xsd:enumeration><xsd:enumeration value="decimal-full-width"></xsd:enumeration><xsd:enumeration value="decimal-half-width"></xsd:enumeration><xsd:enumeration value="japanese-legal"></xsd:enumeration><xsd:enumeration value="japanese-digital-ten-thousand"></xsd:enumeration><xsd:enumeration value="decimal-enclosed-circle"></xsd:enumeration><xsd:enumeration value="decimal-full-width2"></xsd:enumeration><xsd:enumeration value="aiueo-full-width"></xsd:enumeration><xsd:enumeration value="iroha-full-width"></xsd:enumeration><xsd:enumeration value="decimal-zero"></xsd:enumeration><xsd:enumeration value="bullet"></xsd:enumeration><xsd:enumeration value="ganada"></xsd:enumeration><xsd:enumeration value="chosung"></xsd:enumeration><xsd:enumeration value="decimal-enclosed-fullstop"></xsd:enumeration><xsd:enumeration value="decimal-enclosed-paren"></xsd:enumeration><xsd:enumeration value="decimal-enclosed-circle-chinese"></xsd:enumeration><xsd:enumeration value="ideograph-enclosedcircle"></xsd:enumeration><xsd:enumeration value="ideograph-traditional"></xsd:enumeration><xsd:enumeration value="ideograph-zodiac"></xsd:enumeration><xsd:enumeration value="ideograph-zodiac-traditional"></xsd:enumeration><xsd:enumeration value="taiwanese-counting"></xsd:enumeration><xsd:enumeration value="ideograph-legal-traditional"></xsd:enumeration><xsd:enumeration value="taiwanese-counting-thousand"></xsd:enumeration><xsd:enumeration value="taiwanese-digital"></xsd:enumeration><xsd:enumeration value="chinese-counting"></xsd:enumeration><xsd:enumeration value="chinese-legal-simplified"></xsd:enumeration><xsd:enumeration value="chinese-counting-thousand"></xsd:enumeration><xsd:enumeration value="chinese-not-impl"></xsd:enumeration><xsd:enumeration value="korean-digital"></xsd:enumeration><xsd:enumeration value="korean-counting"></xsd:enumeration><xsd:enumeration value="korean-legal"></xsd:enumeration><xsd:enumeration value="korean-digital2"></xsd:enumeration><xsd:enumeration value="vietnamese-counting"></xsd:enumeration><xsd:enumeration value="russian-lower"></xsd:enumeration><xsd:enumeration value="russian-upper"></xsd:enumeration><xsd:enumeration value="none"></xsd:enumeration><xsd:enumeration value="number-in-dash"></xsd:enumeration><xsd:enumeration value="hebrew-1"></xsd:enumeration><xsd:enumeration value="hebrew-2"></xsd:enumeration><xsd:enumeration value="arabic-alpha"></xsd:enumeration><xsd:enumeration value="arabic-abjad"></xsd:enumeration><xsd:enumeration value="hindi-vowels"></xsd:enumeration><xsd:enumeration value="hindi-consonants"></xsd:enumeration><xsd:enumeration value="hindi-numbers"></xsd:enumeration><xsd:enumeration value="hindi-counting"></xsd:enumeration><xsd:enumeration value="thai-letters"></xsd:enumeration><xsd:enumeration value="thainumbers"></xsd:enumeration><xsd:enumeration value="thai-counting"></xsd:enumeration></xsd:restriction></xsd:simpleType><xsd:simpleType name="PageOrientationValue"><xsd:restriction base="xsd:string"><xsd:enumeration value="portrait"></xsd:enumeration><xsd:enumeration value="landscape"></xsd:enumeration></xsd:restriction></xsd:simpleType><xsd:complexType name="PageSzType"><xsd:attribute name="w" type="DecimalNumberType" use="required"></xsd:attribute><xsd:attribute name="h" type="DecimalNumberType" use="required"></xsd:attribute><xsd:attribute name="orient" type="PageOrientationValue" use="optional"></xsd:attribute></xsd:complexType><xsd:complexType name="PageMarType"><xsd:attribute name="top" type="DecimalNumberType" use="required"></xsd:attribute><xsd:attribute name="right" type="DecimalNumberType" use="required"></xsd:attribute><xsd:attribute name="bottom" type="DecimalNumberType" use="required"></xsd:attribute><xsd:attribute name="left" type="DecimalNumberType" use="required"></xsd:attribute><xsd:attribute name="header" type="DecimalNumberType" use="required"></xsd:attribute><xsd:attribute name="footer" type="DecimalNumberType" use="required"></xsd:attribute><xsd:attribute name="gutter" type="DecimalNumberType" use="required"></xsd:attribute></xsd:complexType><xsd:simpleType name="PageBorderZOrderValue"><xsd:restriction base="xsd:string"><xsd:enumeration value="front"></xsd:enumeration><xsd:enumeration value="in-back"></xsd:enumeration></xsd:restriction></xsd:simpleType><xsd:simpleType name="PageBorderDisplayValue"><xsd:restriction base="xsd:string"><xsd:enumeration value="all-pages"></xsd:enumeration><xsd:enumeration value="first-page"></xsd:enumeration><xsd:enumeration value="not-first-page"></xsd:enumeration></xsd:restriction></xsd:simpleType><xsd:simpleType name="PageBorderOffsetValue"><xsd:restriction base="xsd:string"><xsd:enumeration value="page"></xsd:enumeration><xsd:enumeration value="text"></xsd:enumeration></xsd:restriction></xsd:simpleType><xsd:complexType name="PageBordersType"><xsd:sequence><xsd:element name="top" type="BorderProperty" minOccurs="0"></xsd:element><xsd:element name="left" type="BorderProperty" minOccurs="0"></xsd:element><xsd:element name="bottom" type="BorderProperty" minOccurs="0"></xsd:element><xsd:element name="right" type="BorderProperty" minOccurs="0"></xsd:element></xsd:sequence><xsd:attribute name="z-order" type="PageBorderZOrderValue" use="optional"></xsd:attribute><xsd:attribute name="display" type="PageBorderDisplayValue" use="optional"></xsd:attribute><xsd:attribute name="offset-from" type="PageBorderOffsetValue" use="optional"></xsd:attribute></xsd:complexType><xsd:simpleType name="ChapterSepValue"><xsd:restriction base="xsd:string"><xsd:enumeration value="hyphen"></xsd:enumeration><xsd:enumeration value="period"></xsd:enumeration><xsd:enumeration value="colon"></xsd:enumeration><xsd:enumeration value="em-dash"></xsd:enumeration><xsd:enumeration value="en-dash"></xsd:enumeration></xsd:restriction></xsd:simpleType><xsd:simpleType name="LineNumberRestartValue"><xsd:restriction base="xsd:string"><xsd:enumeration value="new-page"></xsd:enumeration><xsd:enumeration value="new-section"></xsd:enumeration><xsd:enumeration value="continuous"></xsd:enumeration></xsd:restriction></xsd:simpleType><xsd:complexType name="LineNumberType"><xsd:attribute name="count-by" type="DecimalNumberType" use="optional"></xsd:attribute><xsd:attribute name="start" type="DecimalNumberType" use="optional"></xsd:attribute><xsd:attribute name="distance" type="DecimalNumberType" use="optional"></xsd:attribute><xsd:attribute name="restart" type="LineNumberRestartValue"

use="optional"></xsd:attribute></xsd:complexType><xsd:complexType name="PageNumberType"><xsd:attribute name="fmt" type="NumberFormatValue" use="optional"></xsd:attribute><xsd:attribute name="start" type="DecimalNumberType" use="optional"></xsd:attribute><xsd:attribute name="chap-style" type="DecimalNumberType" use="optional"></xsd:attribute><xsd:attribute name="chap-sep" type="ChapterSepValue" use="optional"></xsd:attribute></xsd:complexType><xsd:complexType name="ColumnType"><xsd:attribute name="w" type="DecimalNumberType" use="required"></xsd:attribute><xsd:attribute name="space" type="DecimalNumberType" use="optional"></xsd:attribute></xsd:complexType><xsd:complexType name="ColumnsType"><xsd:sequence minOccurs="0"><xsd:element name="Col" type="ColumnType" minOccurs="2" maxOccurs="45"></xsd:element></xsd:sequence><xsd:attribute name="space" type="DecimalNumberType" use="optional"></xsd:attribute><xsd:attribute name="num" type="DecimalNumberType" use="required"></xsd:attribute><xsd:attribute name="sep" type="BooleanType" use="optional"></xsd:attribute></xsd:complexType><xsd:simpleType name="VerticalJustificationValue"><xsd:restriction base="xsd:string"><xsd:enumeration value="top"></xsd:enumeration><xsd:enumeration value="center"></xsd:enumeration><xsd:enumeration value="both"></xsd:enumeration><xsd:enumeration value="bottom"></xsd:enumeration></xsd:restriction></xsd:simpleType><xsd:complexType name="VerticalJustificationType"><xsd:attribute name="val" type="VerticalJustificationValue" use="required"></xsd:attribute></xsd:complexType><xsd:simpleType name="DocGridValue"><xsd:restriction base="xsd:string"><xsd:enumeration value="default"></xsd:enumeration><xsd:enumeration

```
value="lines"></xsd:enumeration><xsd:enumeration value="lines-and-
chars"></xsd:enumeration><xsd:enumeration value="snap-to-
chars"></xsd:enumeration></xsd:restriction></xsd:simpleType><xsd:complexType
name="DocGridType"><xsd:attribute name="type"
type="DocGridValue"></xsd:attribute><xsd:attribute name="line-pitch"
type="DecimalNumberType"></xsd:attribute><xsd:attribute name="char-space"
type="DecimalNumberType"></xsd:attribute></xsd:complexType><xsd:simpleType
name="HdrValue"><xsd:restriction base="xsd:string"><xsd:enumeration
value="even"></xsd:enumeration><xsd:enumeration
value="odd"></xsd:enumeration><xsd:enumeration
value="first"></xsd:enumeration></xsd:restriction></xsd:simpleType><xsd:simpleTyp
e name="FtrValue"><xsd:restriction base="xsd:string"><xsd:enumeration
value="even"></xsd:enumeration><xsd:enumeration
value="odd"></xsd:enumeration><xsd:enumeration
value="first"></xsd:enumeration></xsd:restriction></xsd:simpleType><xsd:simpleTyp
e name="FtnValue"><xsd:restriction base="xsd:string"><xsd:enumeration
value="normal"></xsd:enumeration><xsd:enumeration
value="separator"></xsd:enumeration><xsd:enumeration value="continuation-
separator"></xsd:enumeration><xsd:enumeration value="continuation-
notice"></xsd:enumeration></xsd:restriction></xsd:simpleType><xsd:simpleType
name="EdnValue"><xsd:restriction base="xsd:string"><xsd:enumeration
value="normal"></xsd:enumeration><xsd:enumeration
value="separator"></xsd:enumeration><xsd:enumeration value="continuation-
separator"></xsd:enumeration><xsd:enumeration value="continuation-
notice"></xsd:enumeration></xsd:restriction></xsd:simpleType><xsd:complexType
name="hdrElt"><xsd:sequence><xsd:choice maxOccurs="unbounded"><xsd:element
name="p" type="pElt" minOccurs="0"
maxOccurs="unbounded"></xsd:element><xsd:element name="tbl" type="tblElt"
minOccurs="0"
maxOccurs="unbounded"></xsd:element></xsd:choice></xsd:sequence><xsd:attribute
```

```
name="type" type="HdrValue"
use="required"></xsd:attribute></xsd:complexType><xsd:complexType
name="ftrElt"><xsd:sequence><xsd:choice maxOccurs="unbounded"><xsd:element
name="p" type="pElt" minOccurs="0"
maxOccurs="unbounded"></xsd:element><xsd:element name="tbl" type="tblElt"
minOccurs="0"
maxOccurs="unbounded"></xsd:element></xsd:choice></xsd:sequence><xsd:attribute
name="type" type="FtrValue"
use="required"></xsd:attribute></xsd:complexType><xsd:complexType
name="sectPrElt"><xsd:sequence><xsd:element name="hdr" type="hdrElt"
minOccurs="0"></xsd:element><xsd:element name="ftr" type="ftrElt"
minOccurs="0"></xsd:element><xsd:element name="footnotePr"
type="ftnEdnPropsElt" minOccurs="0"></xsd:element><xsd:element
name="endnotePr" type="ftnEdnPropsElt"
minOccurs="0"></xsd:element><xsd:element name="Type" type="SectTypeElt"
minOccurs="0"></xsd:element><xsd:element name="PgSz" type="PageSzType"
minOccurs="0"></xsd:element><xsd:element name="PgMar" type="PageMarType"
minOccurs="0"></xsd:element><xsd:element name="PaperSrc"
type="PaperSourceType" minOccurs="0"></xsd:element><xsd:element
name="pgBorders" type="PageBordersType"
minOccurs="0"></xsd:element><xsd:element name="lnNum"
type="LineNumberType" minOccurs="0"></xsd:element><xsd:element
name="pgNum" type="PageNumberType"
minOccurs="0"></xsd:element><xsd:element name="cols" type="ColumnsType"
minOccurs="0"></xsd:element><xsd:element name="FormProt"
type="BooleanProperty" minOccurs="0"></xsd:element><xsd:element name="VAlign"
type="VerticalJustificationType" minOccurs="0"></xsd:element><xsd:element
name="NoEndnote" type="BooleanProperty"
minOccurs="0"></xsd:element><xsd:element name="TitlePg" type="BooleanProperty"
minOccurs="0"></xsd:element><xsd:element name="TextFlow"
``` type="TextDirectionProperty" minOccurs="0"></xsd:element><xsd:element name="FacingCols" type="BooleanProperty" minOccurs="0"></xsd:element><xsd:element name="BiDi" type="BooleanProperty" minOccurs="0"></xsd:element><xsd:element name="RTLGutter" type="BooleanProperty" minOccurs="0"></xsd:element><xsd:element name="DocGrid" type="DocGridType" minOccurs="0"></xsd:element></xsd:sequence></xsd:complexType><xsd:simpleType name="brType"><xsd:restriction base="xsd:string"><xsd:enumeration value="page"></xsd:enumeration><xsd:enumeration value="column"></xsd:enumeration><xsd:enumeration value="text-wrapping"></xsd:enumeration></xsd:restriction></xsd:simpleType><xsd:simpleType name="brClearType"><xsd:restriction base="xsd:string"><xsd:enumeration value="none"></xsd:enumeration><xsd:enumeration value="left"></xsd:enumeration><xsd:enumeration value="right"></xsd:enumeration><xsd:enumeration value="all"></xsd:enumeration></xsd:restriction></xsd:simpleType><xsd:complexType name="brElt"><xsd:attribute name="type" type="brType" use="optional"></xsd:attribute><xsd:attribute name="clear" type="brClearType" use="optional"></xsd:attribute></xsd:complexType><xsd:complexType name="SymElt"><xsd:attribute name="font" type="StringType"></xsd:attribute><xsd:attribute name="char" type="HexNumberType"></xsd:attribute></xsd:complexType><xsd:simpleType name="ProofErrType"><xsd:restriction base="xsd:string"><xsd:enumeration value="spellStart"></xsd:enumeration><xsd:enumeration value="spellEnd"></xsd:enumeration><xsd:enumeration value="gramStart"></xsd:enumeration><xsd:enumeration value="gramEnd"></xsd:enumeration></xsd:restriction></xsd:simpleType><xsd:complexType name="ProofErrElt"><xsd:attribute name="type" type="ProofErrType" use="required"></xsd:attribute></xsd:complexType><xsd:simpleType name="edGrpType"><xsd:restriction base="xsd:string"><xsd:enumeration value="none"></xsd:enumeration><xsd:enumeration
value="everyone"></xsd:enumeration><xsd:enumeration
value="administrators"></xsd:enumeration><xsd:enumeration
value="contributors"></xsd:enumeration><xsd:enumeration
value="editors"></xsd:enumeration><xsd:enumeration
value="owners"></xsd:enumeration><xsd:enumeration
value="current"></xsd:enumeration></xsd:restriction></xsd:simpleType><xsd:comple
xType name="PermElt"><xsd:attribute name="id" type="StringType"
use="required"></xsd:attribute></xsd:complexType><xsd:complexType
name="PermStartElt"><xsd:complexContent><xsd:extension
base="PermElt"><xsd:attribute name="edGrp" type="edGrpType"
use="optional"></xsd:attribute><xsd:attribute name="ed" type="StringType"
use="optional"></xsd:attribute></xsd:extension></xsd:complexContent></xsd:comple
xType><xsd:complexType name="SubDocElt"><xsd:attribute name="link"
type="StringType" use="required"></xsd:attribute></xsd:complexType><xsd:attribute
name="placeholder" type="xsd:string"></xsd:attribute><xsd:complexType
name="rElt"><xsd:sequence><xsd:element name="rPr" type="rPrElt"
minOccurs="0"></xsd:element><xsd:choice><xsd:choice minOccurs="1"
maxOccurs="unbounded"><xsd:element name="Br"
type="brElt"></xsd:element><xsd:element name="T"
type="xsd:string"></xsd:element><xsd:element name="DelText"
type="xsd:string"></xsd:element><xsd:element name="InstrText"
type="InstrTextType"></xsd:element><xsd:element
name="NoBreakHyphen"></xsd:element><xsd:element name="SoftHyphen"
minOccurs="0"></xsd:element><xsd:element name="AnnotationRef"
minOccurs="0"></xsd:element><xsd:element name="FootnoteRef"
minOccurs="0"></xsd:element><xsd:element name="EndnoteRef"
minOccurs="0"></xsd:element><xsd:element name="Separator"
minOccurs="0"></xsd:element><xsd:element name="ContinuationSeparator"
minOccurs="0"></xsd:element><xsd:element name="footnote" type="ftnElt"

minOccurs="0"></xsd:element><xsd:element name="endnote" type="ednElt" minOccurs="0"></xsd:element><xsd:element name="Sym" type="SymElt" minOccurs="0"></xsd:element></xsd:choice><xsd:element name="pict" type="PictureType"></xsd:element><xsd:element name="WebBot" type="xsd:string"></xsd:element><xsd:element name="fldChar" type="fldCharType"></xsd:element></xsd:choice></xsd:sequence></xsd:complexType><xsd:simpleType name="hintType"><xsd:restriction base="xsd:string"><xsd:enumeration value="default"></xsd:enumeration><xsd:enumeration value="fareast"></xsd:enumeration><xsd:enumeration value="cs"></xsd:enumeration></xsd:restriction></xsd:simpleType><xsd:complexType name="FontsElt"><xsd:attribute name="hint" type="hintType"></xsd:attribute><xsd:attribute name="ascii" type="StringType"></xsd:attribute><xsd:attribute name="h-ansi" type="StringType"></xsd:attribute><xsd:attribute name="fareast" type="StringType"></xsd:attribute><xsd:attribute name="cs" type="StringType"></xsd:attribute></xsd:complexType><xsd:complexType name="rPrElt"><xsd:sequence><xsd:element name="RStyle" type="StringProperty" minOccurs="0"></xsd:element><xsd:element name="RFonts" type="FontsElt" minOccurs="0"></xsd:element><xsd:element ref="WX:Font"></xsd:element><xsd:element name="B" type="BooleanProperty" minOccurs="0"></xsd:element><xsd:element name="B-CS" type="BooleanProperty" minOccurs="0"></xsd:element><xsd:element name="I" type="BooleanProperty" minOccurs="0"></xsd:element><xsd:element name="I-CS" type="BooleanProperty" minOccurs="0"></xsd:element><xsd:element name="Caps" type="BooleanProperty" minOccurs="0"></xsd:element><xsd:element name="SmallCaps" type="BooleanProperty" minOccurs="0"></xsd:element><xsd:element name="Strike" type="BooleanProperty" minOccurs="0"></xsd:element><xsd:element name="DStrike" type="BooleanProperty" minOccurs="0"></xsd:element><xsd:element name="Outline" type="BooleanProperty"

```
minOccurs="0"></xsd:element><xsd:element name="Shadow"
type="BooleanProperty" minOccurs="0"></xsd:element><xsd:element
name="Emboss" type="BooleanProperty"
minOccurs="0"></xsd:element><xsd:element name="Imprint" type="BooleanProperty"
minOccurs="0"></xsd:element><xsd:element name="NoProof"
type="BooleanProperty" minOccurs="0"></xsd:element><xsd:element
name="SnapToGrid" type="BooleanProperty"
minOccurs="0"></xsd:element><xsd:element name="Vanish" type="BooleanProperty"
minOccurs="0"></xsd:element><xsd:element name="WebHidden"
type="BooleanProperty" minOccurs="0"></xsd:element><xsd:element name="Color"
type="HexColorProperty" minOccurs="0"></xsd:element><xsd:element
name="Spacing" type="SignedTwipsMeasureProperty"
minOccurs="0"></xsd:element><xsd:element name="W" type="TextScaleProperty"
minOccurs="0"></xsd:element><xsd:element name="Kern"
type="HpsMeasureProperty" minOccurs="0"></xsd:element><xsd:element
name="Position" type="SignedHpsMeasureProperty"
minOccurs="0"></xsd:element><xsd:element name="Sz" type="HpsMeasureProperty"
minOccurs="0"></xsd:element><xsd:element name="Sz-CS"
type="HpsMeasureProperty" minOccurs="0"></xsd:element><xsd:element
name="Highlight" type="HighlightProperty"
minOccurs="0"></xsd:element><xsd:element name="U" type="UnderlineProperty"
minOccurs="0"></xsd:element><xsd:element name="Effect"
type="TextEffectProperty" minOccurs="0"></xsd:element><xsd:element name="Bdr"
type="BorderProperty" minOccurs="0"></xsd:element><xsd:element name="Shd"
type="ShdProperty" minOccurs="0"></xsd:element><xsd:element name="FitText"
type="FitTextProperty" minOccurs="0"></xsd:element><xsd:element name="Sup"
type="BooleanProperty" minOccurs="0"></xsd:element><xsd:element name="Sub"
type="BooleanProperty" minOccurs="0"></xsd:element><xsd:element name="RTL"
type="BooleanProperty" minOccurs="0"></xsd:element><xsd:element name="CS"
type="BooleanProperty" minOccurs="0"></xsd:element><xsd:element name="EM"
``` type="EMProperty" minOccurs="0"></xsd:element><xsd:element name="Hyphen" type="HyphenProperty" minOccurs="0"></xsd:element><xsd:element name="Lang" type="langElt" minOccurs="0"></xsd:element><xsd:element name="AsianLayout" type="AsianLayoutElt" minOccurs="0"></xsd:element><xsd:element name="SpecVanish" type="BooleanProperty" minOccurs="0"></xsd:element></xsd:sequence></xsd:complexType><xsd:complexType name="pElt"><xsd:sequence><xsd:element name="pPr" type="pPrElt" minOccurs="0"></xsd:element><xsd:choice minOccurs="0" maxOccurs="unbounded"><xsd:element name="ProofErr" type="ProofErrElt"></xsd:element><xsd:element name="PermStart" type="PermStartElt"></xsd:element><xsd:element name="PermEnd" type="PermElt"></xsd:element><xsd:element name="r" type="rElt"></xsd:element><xsd:element name="fldSimple" type="SimpleFieldType" minOccurs="1" maxOccurs="unbounded"></xsd:element><xsd:element name="hlink" type="HLinkType"></xsd:element><xsd:element name="subDoc" type="SubDocElt"></xsd:element></xsd:choice></xsd:sequence></xsd:complexType>
<xsd:simpleType name="TableWidthPropertyType"><xsd:restriction base="xsd:string"><xsd:enumeration value="nil"></xsd:enumeration><xsd:enumeration value="pct"></xsd:enumeration><xsd:enumeration value="dxa"></xsd:enumeration><xsd:enumeration value="auto"></xsd:enumeration></xsd:restriction></xsd:simpleType><xsd:complexType name="HeightProperty"><xsd:attribute name="val" type="TwipsMeasureType" default="0"></xsd:attribute><xsd:attribute name="h-rule" type="HeightRuleType"></xsd:attribute></xsd:complexType><xsd:complexType name="TableWidthProperty"><xsd:attribute name="w" type="DecimalNumberType"></xsd:attribute><xsd:attribute name="type" type="TableWidthPropertyType"></xsd:attribute></xsd:complexType><xsd:complexType name="tblGridColElt"><xsd:attribute name="w" type="TwipsMeasureType"></xsd:attribute></xsd:complexType><xsd:complexType

```
name="tblGridElt"><xsd:sequence><xsd:element name="GridCol"
type="tblGridColElt" minOccurs="1"
maxOccurs="unbounded"></xsd:element></xsd:sequence></xsd:complexType><xsd:c
omplexType name="tcBordersElt"><xsd:sequence><xsd:element name="Top"
type="BorderProperty" minOccurs="0"></xsd:element><xsd:element name="Left"
type="BorderProperty" minOccurs="0"></xsd:element><xsd:element name="Bottom"
type="BorderProperty" minOccurs="0"></xsd:element><xsd:element name="Right"
type="BorderProperty" minOccurs="0"></xsd:element><xsd:element name="InsideH"
type="BorderProperty" minOccurs="0"></xsd:element><xsd:element name="InsideV"
type="BorderProperty" minOccurs="0"></xsd:element><xsd:element name="TL2BR"
type="BorderProperty" minOccurs="0"></xsd:element><xsd:element name="TR2BL"
type="BorderProperty"
minOccurs="0"></xsd:element></xsd:sequence></xsd:complexType><xsd:complexTy
pe name="tcMarElt"><xsd:sequence><xsd:element name="Top"
type="TableWidthProperty" minOccurs="0"
maxOccurs="1"></xsd:element><xsd:element name="Bottom"
type="TableWidthProperty" minOccurs="0"
maxOccurs="1"></xsd:element><xsd:element name="Left"
type="TableWidthProperty" minOccurs="0"
maxOccurs="1"></xsd:element><xsd:element name="Right"
type="TableWidthProperty" minOccurs="0"
maxOccurs="1"></xsd:element></xsd:sequence></xsd:complexType><xsd:simpleTyp
e name="VMergeType"><xsd:restriction base="xsd:string"><xsd:enumeration
value="continue"></xsd:enumeration><xsd:enumeration
value="restart"></xsd:enumeration></xsd:restriction></xsd:simpleType><xsd:complex
Type name="VMergeProperty"><xsd:attribute name="val" type="VMergeType"
default="continue"></xsd:attribute></xsd:complexType><xsd:simpleType
name="HMergeType"><xsd:restriction base="xsd:string"><xsd:enumeration
value="continue"></xsd:enumeration><xsd:enumeration
value="restart"></xsd:enumeration></xsd:restriction></xsd:simpleType><xsd:complex
```

Type name="HMergeProperty"><xsd:attribute name="val" type="HMergeType"></xsd:attribute></xsd:complexType><xsd:complexType name="tcPrElt"><xsd:sequence><xsd:element name="tcW" type="TableWidthProperty" minOccurs="1" maxOccurs="1"></xsd:element><xsd:element name="GridSpan" type="DecimalNumberProperty" minOccurs="0"></xsd:element><xsd:element name="VMerge" type="VMergeProperty" minOccurs="0"></xsd:element><xsd:element name="HMerge" type="HMergeProperty" minOccurs="0"></xsd:element><xsd:element name="tcBorders" type="tcBordersElt" minOccurs="0" maxOccurs="1"></xsd:element><xsd:element name="Shd" type="ShdProperty"></xsd:element><xsd:element name="NoWrap" type="BooleanProperty" minOccurs="0"></xsd:element><xsd:element name="tcMar" type="tcMarElt" minOccurs="0" maxOccurs="1"></xsd:element><xsd:element name="TextFlow" type="TextDirectionProperty" minOccurs="0" maxOccurs="1"></xsd:element><xsd:element name="TcFitText" type="BooleanProperty" minOccurs="0" maxOccurs="1"></xsd:element><xsd:element name="VAlign" type="VerticalJustificationType" minOccurs="0"></xsd:element></xsd:sequence></xsd:complexType><xsd:complexType name="tcElt"><xsd:sequence><xsd:element name="tcPr" type="tcPrElt" minOccurs="0" maxOccurs="1"></xsd:element><xsd:choice minOccurs="0" maxOccurs="unbounded"><xsd:element name="p" type="pElt" minOccurs="0" maxOccurs="unbounded"></xsd:element><xsd:element name="tbl" type="tblElt" minOccurs="0" maxOccurs="unbounded"></xsd:element></xsd:choice></xsd:sequence></xsd:complexType><xsd:complexType name="trPrElt"><xsd:sequence><xsd:element name="GridBefore" type="DecimalNumberProperty" minOccurs="0"></xsd:element><xsd:element name="GridAfter" type="DecimalNumberProperty" minOccurs="0"></xsd:element><xsd:element name="WBefore" type="TableWidthProperty" minOccurs="0"

maxOccurs="1"></xsd:element><xsd:element name="WAfter" type="TableWidthProperty" minOccurs="0" maxOccurs="1"></xsd:element><xsd:element name="CantSplit" type="BooleanProperty" minOccurs="0"></xsd:element><xsd:element name="TrHeight" type="HeightProperty" minOccurs="0"></xsd:element><xsd:element name="TblHeader" type="BooleanProperty" minOccurs="0"></xsd:element><xsd:element name="DivId" type="DecimalNumberProperty" minOccurs="0"></xsd:element></xsd:sequence></xsd:complexType><xsd:complexType name="rowElt"><xsd:sequence><xsd:element name="trPr" type="trPrElt" minOccurs="0" maxOccurs="1"></xsd:element><xsd:element name="tc" type="tcElt" minOccurs="1" maxOccurs="unbounded"></xsd:element></xsd:sequence></xsd:complexType><xsd:simpleType name="TableLayoutTypeType"><xsd:restriction base="xsd:string"><xsd:enumeration value="Fixed"></xsd:enumeration></xsd:restriction></xsd:simpleType><xsd:complexType name="TableLayoutType"><xsd:attribute name="type" type="TableLayoutTypeType"></xsd:attribute></xsd:complexType><xsd:simpleType name="TableOverlapType"><xsd:restriction base="xsd:string"><xsd:enumeration value="Never"></xsd:enumeration></xsd:restriction></xsd:simpleType><xsd:complexType name="tblpPrElt"><xsd:attribute name="LeftFromText" type="DecimalNumberType"></xsd:attribute><xsd:attribute name="RightFromText" type="DecimalNumberType"></xsd:attribute><xsd:attribute name="TopFromText" type="DecimalNumberType"></xsd:attribute><xsd:attribute name="BottomFromText" type="DecimalNumberType"></xsd:attribute><xsd:attribute name="VertAnchor" type="VAnchorValue"></xsd:attribute><xsd:attribute name="HorzAnchor" type="HAnchorValue"></xsd:attribute><xsd:attribute name="tblpXSpec" type="XAlignType"></xsd:attribute><xsd:attribute name="tblpX" type="DecimalNumberType"></xsd:attribute><xsd:attribute name="tblpYSpec" type="YAlignType"></xsd:attribute><xsd:attribute name="tblpY"

type="DecimalNumberType"></xsd:attribute></xsd:complexType><xsd:complexType name="tblCellMarElt"><xsd:sequence><xsd:element name="Top" type="TableWidthProperty" minOccurs="0" maxOccurs="1"></xsd:element><xsd:element name="Left" type="TableWidthProperty" minOccurs="0" maxOccurs="1"></xsd:element><xsd:element name="Bottom" type="TableWidthProperty" minOccurs="0" maxOccurs="1"></xsd:element><xsd:element name="Right" type="TableWidthProperty" minOccurs="0" maxOccurs="1"></xsd:element></xsd:sequence></xsd:complexType><xsd:simpleType name="tblDirType"><xsd:restriction base="xsd:string"><xsd:enumeration value="RTL"></xsd:enumeration></xsd:restriction></xsd:simpleType><xsd:complexType name="tblDir"><xsd:attribute name="val" type="tblDirType"></xsd:attribute></xsd:complexType><xsd:simpleType name="tblVisualDirType"><xsd:restriction base="xsd:string"><xsd:enumeration value="BiDi"></xsd:enumeration></xsd:restriction></xsd:simpleType><xsd:complexType name="tblVisualDir"><xsd:attribute name="val" type="tblVisualDirType"></xsd:attribute></xsd:complexType><xsd:complexType name="tblBordersElt"><xsd:sequence><xsd:element name="Top" type="BorderProperty" minOccurs="0"></xsd:element><xsd:element name="Left" type="BorderProperty" minOccurs="0"></xsd:element><xsd:element name="Bottom" type="BorderProperty" minOccurs="0"></xsd:element><xsd:element name="Right" type="BorderProperty" minOccurs="0"></xsd:element><xsd:element name="InsideH" type="BorderProperty" minOccurs="0"></xsd:element><xsd:element name="InsideV" type="BorderProperty" minOccurs="0"></xsd:element></xsd:sequence></xsd:complexType><xsd:complexType name="tblPrElt"><xsd:sequence><xsd:element name="TStyle" type="StringProperty" minOccurs="0"></xsd:element><xsd:element name="tblW" type="TableWidthProperty" minOccurs="0" maxOccurs="1"></xsd:element><xsd:element name="Jc" type="JcProperty"

minOccurs="0" maxOccurs="1"></xsd:element><xsd:element name="tblCellSpacing" type="TableWidthProperty" minOccurs="0" maxOccurs="1"></xsd:element><xsd:element name="tblInd" type="TableWidthProperty" minOccurs="0" maxOccurs="1"></xsd:element><xsd:element name="tblBorders" type="tblBordersElt" minOccurs="0" maxOccurs="1"></xsd:element><xsd:element name="Shd" type="ShdProperty"></xsd:element><xsd:element name="tblLayout" type="TableLayoutType" minOccurs="0" maxOccurs="1"></xsd:element><xsd:element name="tblOverlap" type="TableOverlapType" minOccurs="0" maxOccurs="1"></xsd:element><xsd:element name="tblLook" type="HexNumberProperty" minOccurs="0" maxOccurs="1"></xsd:element><xsd:element name="tblpPr" type="tblpPrElt" minOccurs="0" maxOccurs="1"></xsd:element><xsd:element name="tblCellMar" type="tblCellMarElt" minOccurs="0" maxOccurs="1"></xsd:element><xsd:element name="RTLTable" minOccurs="0" maxOccurs="1"></xsd:element><xsd:element name="BidiVisual" minOccurs="0" maxOccurs="1"></xsd:element><xsd:element name="TStyleRowBandSize" type="DecimalNumberProperty" minOccurs="0" maxOccurs="1"></xsd:element><xsd:element name="TStyleColBandSize" type="DecimalNumberProperty" minOccurs="0" maxOccurs="1"></xsd:element></xsd:sequence></xsd:complexType><xsd:complexType name="tblElt"><xsd:sequence><xsd:element name="tblPr" type="tblPrElt"></xsd:element><xsd:element name="tblGrid" type="tblGridElt"></xsd:element><xsd:element name="tr" type="rowElt" minOccurs="1" maxOccurs="unbounded"></xsd:element></xsd:sequence></xsd:complexType><xsd:simpleType name="ftnEdnPosType"><xsd:restriction base="xsd:string"><xsd:enumeration value="sect-end"></xsd:enumeration><xsd:enumeration value="page-bottom"></xsd:enumeration><xsd:enumeration value="beneathtext"></xsd:enumeration><xsd:enumeration value="doc-end"></xsd:enumeration></xsd:restriction></xsd:simpleType><xsd:complexType name="ftnEdnPosProperty"><xsd:attribute name="val" type="ftnEdnPosType" use="required"></xsd:attribute></xsd:complexType><xsd:complexType name="numFmtProperty"><xsd:attribute name="val" type="NumberFormatValue" use="required"></xsd:attribute></xsd:complexType><xsd:simpleType name="RestartNumberValue"><xsd:restriction base="xsd:string"><xsd:enumeration value="continuous"></xsd:enumeration><xsd:enumeration value="each-sect"></xsd:enumeration><xsd:enumeration value="each-page"></xsd:enumeration></xsd:restriction></xsd:simpleType><xsd:complexType name="numRestartProperty"><xsd:attribute name="val" type="RestartNumberValue" use="required"></xsd:attribute></xsd:complexType><xsd:complexType name="ftnElt"><xsd:sequence><xsd:choice maxOccurs="unbounded"><xsd:element name="p" type="pElt" minOccurs="0" maxOccurs="unbounded"></xsd:element><xsd:element name="tbl" type="tblElt" minOccurs="0" maxOccurs="unbounded"></xsd:element></xsd:choice></xsd:sequence><xsd:attribute name="type" type="FtnValue" use="required"></xsd:attribute><xsd:attribute name="suppressRef" type="BooleanType" use="required"></xsd:attribute></xsd:complexType><xsd:complexType name="ednElt"><xsd:sequence><xsd:choice maxOccurs="unbounded"><xsd:element name="p" type="pElt" minOccurs="0" maxOccurs="unbounded"></xsd:element><xsd:element name="tbl" type="tblElt" minOccurs="0" maxOccurs="unbounded"></xsd:element></xsd:choice></xsd:sequence><xsd:attribute name="type" type="EdnValue" use="required"></xsd:attribute><xsd:attribute name="suppressRef" type="BooleanType" use="required"></xsd:attribute></xsd:complexType><xsd:complexType name="ftnEdnPropsElt"><xsd:sequence><xsd:element name="Pos" type="ftnEdnPosProperty"></xsd:element><xsd:element name="NumFmt"

type="numFmtProperty"></xsd:element><xsd:element name="NumStart" type="DecimalNumberProperty"></xsd:element><xsd:element name="NumRestart" type="numRestartProperty"></xsd:element></xsd:sequence></xsd:complexType><xsd:complexType name="ftnDocPropsElt"><xsd:complexContent><xsd:extension base="ftnEdnPropsElt"><xsd:sequence><xsd:element name="footnote" type="ftnElt" minOccurs="2" maxOccurs="3"></xsd:element></xsd:sequence></xsd:extension></xsd:complexContent></xsd:complexType><xsd:complexType name="ednDocPropsElt"><xsd:complexContent><xsd:extension base="ftnEdnPropsElt"><xsd:sequence><xsd:element name="endnote" type="ednElt" minOccurs="2" maxOccurs="3"></xsd:element></xsd:sequence></xsd:extension></xsd:complexContent></xsd:complexType><xsd:complexType name="odsoRecipientDataElt"><xsd:sequence><xsd:element name="Active" type="DecimalNumberProperty" minOccurs="1"></xsd:element><xsd:choice><xsd:element name="Hash" type="DecimalNumberProperty" minOccurs="1"></xsd:element><xsd:sequence><xsd:element name="Column" type="DecimalNumberProperty" minOccurs="1"></xsd:element><xsd:element name="UniqueTag" type="StringProperty" minOccurs="1"></xsd:element></xsd:sequence></xsd:choice></xsd:sequence></xsd:complexType><xsd:complexType name="odsoFieldMapDataElt"><xsd:sequence><xsd:element name="Type" type="MMOdsoFMDFieldTypeProperty" minOccurs="0"></xsd:element><xsd:element name="Name" type="StringProperty" minOccurs="0"></xsd:element><xsd:element name="MappedName" type="StringProperty" minOccurs="0"></xsd:element><xsd:element name="Column" type="DecimalNumberProperty" minOccurs="0"></xsd:element><xsd:element name="Lid" type="StringProperty" minOccurs="0"></xsd:element><xsd:element name="DynamicAddress" type="DecimalNumberProperty"

minOccurs="0"></xsd:element></xsd:sequence></xsd:complexType><xsd:complexType name="odsoElt"><xsd:sequence><xsd:element name="UDL" type="StringProperty" minOccurs="0"></xsd:element><xsd:element name="Table" type="StringProperty" minOccurs="0"></xsd:element><xsd:element name="Src" type="HexNumberProperty" minOccurs="0"></xsd:element><xsd:element name="Filter" type="HexNumberProperty" minOccurs="0"></xsd:element><xsd:element name="Sort" type="HexNumberProperty" minOccurs="0"></xsd:element><xsd:element name="FieldMapData" type="odsoFieldMapDataElt" minOccurs="0" maxOccurs="unbounded"></xsd:element><xsd:element name="ColDelim" type="DecimalNumberProperty" minOccurs="0"></xsd:element><xsd:element name="JdsoType" type="DecimalNumberProperty" minOccurs="0"></xsd:element><xsd:element name="FHdr" type="DecimalNumberProperty" minOccurs="0"></xsd:element><xsd:element name="RecipientData" type="odsoRecipientDataElt" minOccurs="0" maxOccurs="unbounded"></xsd:element></xsd:sequence></xsd:complexType><xsd:complexType name="mailMergeElt"><xsd:sequence><xsd:element name="MainDocumentType" type="MMDocTypeProperty" minOccurs="1"></xsd:element><xsd:element name="LinkToQuery" type="BooleanProperty" minOccurs="0"></xsd:element><xsd:element name="DataType" type="MMDataTypeProperty" minOccurs="1"></xsd:element><xsd:element name="DefaultSQL" type="BooleanProperty" minOccurs="0"></xsd:element><xsd:element name="ConnectString" type="StringProperty" minOccurs="1"></xsd:element><xsd:element name="Query" type="StringProperty" minOccurs="1"></xsd:element><xsd:element name="DataSource" type="StringProperty" minOccurs="0"></xsd:element><xsd:element name="HeaderSource" type="StringProperty" minOccurs="0"></xsd:element><xsd:element name="DoNotSuppressBlankLines" type="BooleanProperty" minOccurs="0"></xsd:element><xsd:element

```
name="Destination" type="MMDestProperty"
minOccurs="0"></xsd:element><xsd:element name="AddressFieldName"
type="StringProperty" minOccurs="0"></xsd:element><xsd:element
name="MailSubject" type="StringProperty"
minOccurs="0"></xsd:element><xsd:element name="MailAsAttachment"
type="BooleanProperty" minOccurs="0"></xsd:element><xsd:element
name="ViewMergedData" type="BooleanProperty"
minOccurs="0"></xsd:element><xsd:element name="ActiveRecord"
type="DecimalNumberProperty" minOccurs="0"></xsd:element><xsd:element
name="CheckErrors" type="DecimalNumberProperty"
minOccurs="0"></xsd:element><xsd:element name="odso" type="odsoElt"
minOccurs="1"></xsd:element></xsd:sequence></xsd:complexType><xsd:simpleType
name="TargetScreenSzType"><xsd:restriction base="xsd:string"><xsd:enumeration
value="544x376"></xsd:enumeration><xsd:enumeration
value="640x480"></xsd:enumeration><xsd:enumeration
value="720x512"></xsd:enumeration><xsd:enumeration
value="800x600"></xsd:enumeration><xsd:enumeration
value="1024x768"></xsd:enumeration><xsd:enumeration
value="1152x882"></xsd:enumeration><xsd:enumeration
value="1152x900"></xsd:enumeration><xsd:enumeration
value="1280x1024"></xsd:enumeration><xsd:enumeration
value="1600x1200"></xsd:enumeration><xsd:enumeration
value="1800x1440"></xsd:enumeration><xsd:enumeration
value="1920x1200"></xsd:enumeration></xsd:restriction></xsd:simpleType><xsd:co
mplexType name="TargetScreenSzElt"><xsd:attribute name="val"
type="TargetScreenSzType"
use="required"></xsd:attribute></xsd:complexType><xsd:complexType
name="compatElt"><xsd:sequence><xsd:element name="OrigWordTableRules"
type="BooleanProperty" minOccurs="0"></xsd:element><xsd:element
name="WPJustification" type="BooleanProperty"
```

```xml
minOccurs="0"></xsd:element><xsd:element name="NoTabHangInd" type="BooleanProperty" minOccurs="0"></xsd:element><xsd:element name="NoLeading" type="BooleanProperty" minOccurs="0"></xsd:element><xsd:element name="SpaceForUL" type="BooleanProperty" minOccurs="0"></xsd:element><xsd:element name="NoColumnBalance" type="BooleanProperty" minOccurs="0"></xsd:element><xsd:element name="BalanceSingleByteDoubleByteWidth" type="BooleanProperty" minOccurs="0"></xsd:element><xsd:element name="TransparentMetafiles" type="BooleanProperty" minOccurs="0"></xsd:element><xsd:element name="NoExtraLineSpacing" type="BooleanProperty" minOccurs="0"></xsd:element><xsd:element name="DoNotLeaveBackslashAlone" type="BooleanProperty" minOccurs="0"></xsd:element><xsd:element name="ULTrailSpace" type="BooleanProperty" minOccurs="0"></xsd:element><xsd:element name="DoNotExpandShiftReturn" type="BooleanProperty" minOccurs="0"></xsd:element><xsd:element name="SpacingInWholePoints" type="BooleanProperty" minOccurs="0"></xsd:element><xsd:element name="LineWrapLikeWord6" type="BooleanProperty" minOccurs="0"></xsd:element><xsd:element name="PrintBodyTextBeforeHeader" type="BooleanProperty" minOccurs="0"></xsd:element><xsd:element name="PrintColBlack" type="BooleanProperty" minOccurs="0"></xsd:element><xsd:element name="WPSpaceWidth" type="BooleanProperty" minOccurs="0"></xsd:element><xsd:element name="ShowBreaksInFrames" type="BooleanProperty" minOccurs="0"></xsd:element><xsd:element name="SubFontBySize" type="BooleanProperty" minOccurs="0"></xsd:element><xsd:element name="SuppressBottomSpacing" type="BooleanProperty" minOccurs="0"></xsd:element><xsd:element name="SuppressTopSpacing" type="BooleanProperty" minOccurs="0"></xsd:element><xsd:element name="SuppressTopSpacingMac5"
``` type="BooleanProperty" minOccurs="0"></xsd:element><xsd:element name="SuppressTopSpacingWP" type="BooleanProperty" minOccurs="0"></xsd:element><xsd:element name="SuppressSpBfAfterPgBrk" type="BooleanProperty" minOccurs="0"></xsd:element><xsd:element name="SwapBordersFacingPages" type="BooleanProperty" minOccurs="0"></xsd:element><xsd:element name="ConvMailMergeEsc" type="BooleanProperty" minOccurs="0"></xsd:element><xsd:element name="TruncateFontHeight" type="BooleanProperty" minOccurs="0"></xsd:element><xsd:element name="MWSmallCaps" type="BooleanProperty" minOccurs="0"></xsd:element><xsd:element name="UsePrinterMetrics" type="BooleanProperty" minOccurs="0"></xsd:element><xsd:element name="WW6BorderRules" type="BooleanProperty" minOccurs="0"></xsd:element><xsd:element name="WrapTrailSpaces" type="BooleanProperty" minOccurs="0"></xsd:element><xsd:element name="FootnoteLayoutLikeWW8" type="BooleanProperty" minOccurs="0"></xsd:element><xsd:element name="ShapeLayoutLikeWW8" type="BooleanProperty" minOccurs="0"></xsd:element><xsd:element name="AlignTablesRowByRow" type="BooleanProperty" minOccurs="0"></xsd:element><xsd:element name="ForgetLastTabAlignment" type="BooleanProperty" minOccurs="0"></xsd:element><xsd:element name="AdjustLineHeightInTable" type="BooleanProperty" minOccurs="0"></xsd:element><xsd:element name="AutoSpaceLikeWord95" type="BooleanProperty" minOccurs="0"></xsd:element><xsd:element name="NoSpaceRaiseLower" type="BooleanProperty" minOccurs="0"></xsd:element><xsd:element name="DoNotUseHTMLParagraphAutoSpacing" type="BooleanProperty" minOccurs="0"></xsd:element><xsd:element name="LayoutRawTableWidth" type="BooleanProperty" minOccurs="0"></xsd:element><xsd:element name="LayoutTableRowsApart" type="BooleanProperty" minOccurs="0"></xsd:element><xsd:element name="UseWord97LineBreakingRules"

type="BooleanProperty" minOccurs="0"></xsd:element><xsd:element name="BreakWrappedTables" type="BooleanProperty" minOccurs="0"></xsd:element><xsd:element name="SnapToGridInCell" type="BooleanProperty" minOccurs="0"></xsd:element><xsd:element name="DontAllowFieldEndSelect" type="BooleanProperty" minOccurs="0"></xsd:element><xsd:element name="ApplyBreakingRules" type="BooleanProperty" minOccurs="0"></xsd:element><xsd:element name="WrapTextWithPunct" type="BooleanProperty" minOccurs="0"></xsd:element><xsd:element name="UseAsianBreakRules" type="BooleanProperty" minOccurs="0"></xsd:element><xsd:element name="UseFELayout" type="BooleanProperty" minOccurs="0"></xsd:element></xsd:sequence></xsd:complexType><xsd:complexType name="docVarsElt"><xsd:sequence><xsd:element name="DocVar" minOccurs="0" maxOccurs="unbounded"><xsd:complexType><xsd:attribute name="name" type="StringType" use="required"></xsd:attribute><xsd:attribute name="val" type="StringType" use="required"></xsd:attribute></xsd:complexType></xsd:element></xsd:sequence></xsd:complexType><xsd:complexType name="CustomPropElt"><xsd:attribute name="name" use="required"></xsd:attribute><xsd:attribute name="type" use="required" type="CustomPropType"></xsd:attribute><xsd:attribute name="link" use="optional"></xsd:attribute><xsd:attribute name="val" use="required"></xsd:attribute></xsd:complexType><xsd:simpleType name="CharacterSpacingType"><xsd:restriction base="xsd:string"><xsd:enumeration value="DontCompress"></xsd:enumeration><xsd:enumeration value="CompressPunctuation"></xsd:enumeration><xsd:enumeration value="CompressPunctuationAndJapaneseKana"></xsd:enumeration></xsd:restriction></xsd:simpleType><xsd:complexType name="CharacterSpacingProperty"><xsd:attribute name="val" type="CharacterSpacingType" use="required"></xsd:attribute></xsd:complexType><xsd:complexType

```
name="docInfoElt"><xsd:sequence><xsd:element name="Title" type="StringProperty"
minOccurs="0"></xsd:element><xsd:element name="Subject" type="StringProperty"
minOccurs="0"></xsd:element><xsd:element name="Author" type="StringProperty"
minOccurs="0"></xsd:element><xsd:element name="Keywords"
type="StringProperty" minOccurs="0"></xsd:element><xsd:element
name="Comments" type="StringProperty"
minOccurs="0"></xsd:element><xsd:element name="Template" type="StringProperty"
minOccurs="0"></xsd:element><xsd:element name="LastAuthor"
type="StringProperty" minOccurs="0"></xsd:element><xsd:element name="Revision"
type="StringProperty" minOccurs="0"></xsd:element><xsd:element
name="AppName" type="StringProperty"
minOccurs="0"></xsd:element><xsd:element name="TotalEdit"
type="DecimalNumberProperty" minOccurs="0"></xsd:element><xsd:element
name="LastPrint" type="DateTimeProperty"
minOccurs="0"></xsd:element><xsd:element name="Created"
type="DateTimeProperty" minOccurs="0"></xsd:element><xsd:element
name="LastSaved" type="DateTimeProperty"
minOccurs="0"></xsd:element><xsd:element name="Pages"
type="DecimalNumberProperty" minOccurs="0"></xsd:element><xsd:element
name="Words" type="DecimalNumberProperty"
minOccurs="0"></xsd:element><xsd:element name="Characters"
type="DecimalNumberProperty" minOccurs="0"></xsd:element><xsd:element
name="Category" type="StringProperty" minOccurs="0"></xsd:element><xsd:element
name="Format" type="StringProperty" minOccurs="0"></xsd:element><xsd:element
name="Manager" type="StringProperty" minOccurs="0"></xsd:element><xsd:element
name="Company" type="StringProperty" minOccurs="0"></xsd:element><xsd:element
name="Guid" type="StringProperty" minOccurs="0"></xsd:element><xsd:element
name="LinkBase" type="StringProperty" minOccurs="0"></xsd:element><xsd:element
name="Bytes" type="DecimalNumberProperty"
minOccurs="0"></xsd:element><xsd:element name="Lines"
```

```
type="DecimalNumberProperty" minOccurs="0"></xsd:element><xsd:element
name="Paras" type="DecimalNumberProperty"
minOccurs="0"></xsd:element><xsd:element name="CharactersWithSpaces"
type="DecimalNumberProperty" minOccurs="0"></xsd:element><xsd:element
name="Version" type="StringProperty" minOccurs="0"></xsd:element><xsd:element
name="CustomProp" type="CustomPropElt" minOccurs="0"
maxOccurs="unbounded"></xsd:element></xsd:sequence></xsd:complexType><xsd:c
omplexType name="docPrElt"><xsd:sequence><xsd:element name="View"
type="ViewProperty" minOccurs="1"></xsd:element><xsd:element name="Zoom"
type="ZoomProperty" minOccurs="0"></xsd:element><xsd:element
name="RemovePersonalInformation" type="BooleanProperty"
minOccurs="0"></xsd:element><xsd:element name="DontDisplayPageBoundaries"
type="BooleanProperty" minOccurs="0"></xsd:element><xsd:element
name="PrintPostScriptOverText" type="BooleanProperty"
minOccurs="0"></xsd:element><xsd:element name="PrintFractionalCharacterWidth"
type="BooleanProperty" minOccurs="0"></xsd:element><xsd:element
name="PrintFormsData" type="BooleanProperty"
minOccurs="0"></xsd:element><xsd:element name="EmbedTrueTypeFonts"
type="BooleanProperty" minOccurs="0"></xsd:element><xsd:element
name="DoNotEmbedSystemFonts" type="BooleanProperty"
minOccurs="0"></xsd:element><xsd:element name="SaveSubsetFonts"
type="BooleanProperty" minOccurs="0"></xsd:element><xsd:element
name="SaveFormsData" type="BooleanProperty"
minOccurs="0"></xsd:element><xsd:element name="MirrorMargins"
type="BooleanProperty" minOccurs="0"></xsd:element><xsd:element
name="AlignBordersAndEdges" type="BooleanProperty"
minOccurs="0"></xsd:element><xsd:element name="BordersDontSurroundHeader"
type="BooleanProperty" minOccurs="0"></xsd:element><xsd:element
name="BordersDontSurroundFooter" type="BooleanProperty"
minOccurs="0"></xsd:element><xsd:element name="GutterAtTop"
```

```
type="BooleanProperty" minOccurs="0"></xsd:element><xsd:element
name="HideSpellingErrors" type="BooleanProperty"
minOccurs="0"></xsd:element><xsd:element name="HideGrammaticalErrors"
type="BooleanProperty" minOccurs="0"></xsd:element><xsd:element
name="ActiveWritingStyle" type="WritingStyleProperty"
minOccurs="0"></xsd:element><xsd:element name="ProofState"
type="ProofProperty" minOccurs="0"></xsd:element><xsd:element
name="FormsDesign" type="BooleanProperty"
minOccurs="0"></xsd:element><xsd:element name="AttachedTemplate"
type="StringProperty" minOccurs="0"></xsd:element><xsd:element
name="LinkStyles" type="BooleanProperty"
minOccurs="0"></xsd:element><xsd:element name="StylePaneFormatFilter"
type="HexNumberProperty" minOccurs="0"></xsd:element><xsd:element
name="DocumentType" type="DocTypeProperty"
minOccurs="0"></xsd:element><xsd:element name="mailMerge"
type="mailMergeElt" minOccurs="0"></xsd:element><xsd:element
name="TrackRevisions" type="BooleanProperty"
minOccurs="0"></xsd:element><xsd:element name="DocumentProtection"
type="DocProtectProperty" minOccurs="0"></xsd:element><xsd:element
name="FormattingProtection" type="BooleanProperty"
minOccurs="0"></xsd:element><xsd:element name="StyleLockEnforced"
type="BooleanProperty" minOccurs="0"></xsd:element><xsd:element
name="AutoFormatOverride" type="BooleanProperty"
minOccurs="0"></xsd:element><xsd:element name="DefaultTabStop"
type="TwipsMeasureProperty" minOccurs="0"></xsd:element><xsd:element
name="DefaultFonts" type="FontsElt" minOccurs="0"></xsd:element><xsd:element
name="AutoHyphenation" type="BooleanProperty"
minOccurs="0"></xsd:element><xsd:element name="ConsecutiveHyphenLimit"
type="DecimalNumberProperty" minOccurs="0"></xsd:element><xsd:element
name="HyphenationZone" type="DecimalNumberProperty"
```

```
minOccurs="0"></xsd:element><xsd:element name="DoNotHyphenateCaps"
type="BooleanProperty" minOccurs="0"></xsd:element><xsd:element
name="ShowEnvelope" type="BooleanProperty"
minOccurs="0"></xsd:element><xsd:element name="SummaryLength"
type="DecimalNumberProperty" minOccurs="0"></xsd:element><xsd:element
name="ClickAndTypeStyle" type="DocPrStyleProperty"
minOccurs="0"></xsd:element><xsd:element name="DefaultTableStyle"
type="DocPrStyleProperty" minOccurs="0"></xsd:element><xsd:element
name="EvenAndOddHeaders" type="BooleanProperty"
minOccurs="0"></xsd:element><xsd:element name="BookFoldRevPrinting"
type="BooleanProperty" minOccurs="0"></xsd:element><xsd:element
name="BookFoldPrinting" type="BooleanProperty"
minOccurs="0"></xsd:element><xsd:element name="BookFoldPrintingSheets"
type="DecimalNumberProperty" minOccurs="0"></xsd:element><xsd:element
name="DrawingGridHorizontalSpacing" type="TwipsMeasureProperty"
minOccurs="0"></xsd:element><xsd:element name="DrawingGridVerticalSpacing"
type="TwipsMeasureProperty" minOccurs="0"></xsd:element><xsd:element
name="DisplayHorizontalDrawingGridEvery" type="DecimalNumberProperty"
minOccurs="0"></xsd:element><xsd:element
name="DisplayVerticalDrawingGridEvery" type="DecimalNumberProperty"
minOccurs="0"></xsd:element><xsd:element
name="UseMarginsForDrawingGridOrigin" type="BooleanProperty"
minOccurs="0"></xsd:element><xsd:element name="DrawingGridHorizontalOrigin"
type="TwipsMeasureProperty" minOccurs="0"></xsd:element><xsd:element
name="DrawingGridVerticalOrigin" type="TwipsMeasureProperty"
minOccurs="0"></xsd:element><xsd:element name="DoNotShadeFormData"
type="BooleanProperty" minOccurs="0"></xsd:element><xsd:element
name="PunctuationKerning" type="BooleanProperty"
minOccurs="0"></xsd:element><xsd:element name="CharacterSpacingControl"
type="CharacterSpacingProperty" minOccurs="0"></xsd:element><xsd:element
``` name="PrintTwoOnOne" type="BooleanProperty" minOccurs="0"></xsd:element><xsd:element name="StrictFirstAndLastChars" type="BooleanProperty" minOccurs="0"></xsd:element><xsd:element name="NoLineBreaksAfter" type="KinsokuProperty" minOccurs="0"></xsd:element><xsd:element name="NoLineBreaksBefore" type="KinsokuProperty" minOccurs="0"></xsd:element><xsd:element name="WebPageEncoding" type="StringProperty" minOccurs="0"></xsd:element><xsd:element name="DoNotOptimizeForBrowser" type="BooleanProperty" minOccurs="0"></xsd:element><xsd:element name="BrowserLevelIE4" type="BooleanProperty" minOccurs="0"></xsd:element><xsd:element name="RelyOnVML" type="BooleanProperty" minOccurs="0"></xsd:element><xsd:element name="AllowPNG" type="BooleanProperty" minOccurs="0"></xsd:element><xsd:element name="DoNotRelyOnCSS" type="BooleanProperty" minOccurs="0"></xsd:element><xsd:element name="DoNotOrganizeInFolder" type="BooleanProperty" minOccurs="0"></xsd:element><xsd:element name="DoNotUseLongFileNames" type="BooleanProperty" minOccurs="0"></xsd:element><xsd:element name="PixelsPerInch" type="DecimalNumberProperty" minOccurs="0"></xsd:element><xsd:element name="TargetScreenSz" type="TargetScreenSzElt" minOccurs="0"></xsd:element><xsd:element name="SavePreviewPicture" type="BooleanProperty" minOccurs="0"></xsd:element><xsd:element name="ValidateAgainstSchema" type="BooleanProperty" minOccurs="0"></xsd:element><xsd:element name="SaveInvalidXML" type="BooleanProperty" minOccurs="0"></xsd:element><xsd:element name="DoNotUnderlineInvalidXML" type="BooleanProperty" minOccurs="0"></xsd:element><xsd:element name="RemoveWordSchemaOnSave" type="BooleanProperty" minOccurs="0"></xsd:element><xsd:element name="UseXSLTWhenSaving" type="BooleanProperty" minOccurs="0"></xsd:element><xsd:element

```
name="SaveThroughXSLT" type="StringType"
minOccurs="0"></xsd:element><xsd:element name="ShowXMLTags"
type="BooleanProperty" minOccurs="0"></xsd:element><xsd:element
name="AlwaysMergeEmptyNamespace" type="BooleanProperty"
minOccurs="0"></xsd:element><xsd:element name="footnotePr"
type="ftnDocPropsElt" minOccurs="0"></xsd:element><xsd:element
name="endnotePr" type="ednDocPropsElt"
minOccurs="0"></xsd:element><xsd:element name="compat" type="compatElt"
minOccurs="0"></xsd:element><xsd:element name="docVars" type="docVarsElt"
minOccurs="0"></xsd:element></xsd:sequence></xsd:complexType><xsd:complexTy
pe name="BinDataProperty"><xsd:sequence><xsd:element name="binData"
type="binDataType"></xsd:element></xsd:sequence></xsd:complexType><xsd:simple
Type name="FrameScrollbarValues"><xsd:restriction
base="xsd:string"><xsd:enumeration
value="on"></xsd:enumeration><xsd:enumeration
value="off"></xsd:enumeration><xsd:enumeration
value="auto"></xsd:enumeration></xsd:restriction></xsd:simpleType><xsd:complexT
ype name="FrameScrollbarProperty"><xsd:attribute name="val"
type="FrameScrollbarValues"
use="required"></xsd:attribute></xsd:complexType><xsd:complexType
name="frameElt"><xsd:sequence><xsd:element name="Sz" type="StringProperty"
minOccurs="0"></xsd:element><xsd:element name="Name" type="StringProperty"
minOccurs="0"></xsd:element><xsd:element name="SourceFileName"
type="StringProperty" minOccurs="0"></xsd:element><xsd:element name="MarW"
type="PixelsMeasureType" minOccurs="0"></xsd:element><xsd:element
name="MarH" type="PixelsMeasureType"
minOccurs="0"></xsd:element><xsd:element name="Scrollbar"
type="FrameScrollbarProperty" minOccurs="0"></xsd:element><xsd:element
name="NoResizeAllowed" type="BooleanProperty"
minOccurs="0"></xsd:element><xsd:element name="LinkedToFile"
```

```
type="BooleanProperty"
minOccurs="0"></xsd:element></xsd:sequence></xsd:complexType><xsd:simpleType
name="FrameLayoutType"><xsd:restriction base="xsd:string"><xsd:enumeration
value="Rows"></xsd:enumeration><xsd:enumeration
value="Cols"></xsd:enumeration><xsd:enumeration
value="None"></xsd:enumeration></xsd:restriction></xsd:simpleType><xsd:complex
Type name="FrameLayoutElt"><xsd:attribute name="val" type="FrameLayoutType"
use="required"></xsd:attribute></xsd:complexType><xsd:complexType
name="framesetSplitbarElt"><xsd:sequence><xsd:element name="W"
type="TwipsMeasureType" minOccurs="0"></xsd:element><xsd:element
name="Color" type="HexColorType" minOccurs="0"></xsd:element><xsd:element
name="NoBorder" type="BooleanProperty"
minOccurs="0"></xsd:element><xsd:element name="FlatBorders"
type="BooleanProperty"
minOccurs="0"></xsd:element></xsd:sequence></xsd:complexType><xsd:complexTy
pe name="framesetElt"><xsd:sequence><xsd:element name="Sz"
type="StringProperty" minOccurs="0"></xsd:element><xsd:element
name="framesetSplitbar" type="framesetSplitbarElt"
minOccurs="0"></xsd:element><xsd:element name="FrameLayout"
type="FrameLayoutElt" minOccurs="0"></xsd:element><xsd:element
name="frameset" type="framesetElt" minOccurs="0"></xsd:element><xsd:element
name="frame" type="frameElt"
minOccurs="0"></xsd:element></xsd:sequence></xsd:complexType><xsd:complexTy
pe name="listPicBulletElt"><xsd:sequence><xsd:element name="pict"
type="PictureType"></xsd:element></xsd:sequence><xsd:attribute
name="listPicBulletId" type="DecimalNumberType"
use="required"></xsd:attribute></xsd:complexType><xsd:simpleType
name="ListLevelSuffixValues"><xsd:restriction base="xsd:string"><xsd:enumeration
value="Tab"></xsd:enumeration><xsd:enumeration
value="Space"></xsd:enumeration><xsd:enumeration
```

```
value="Nothing"></xsd:enumeration></xsd:restriction></xsd:simpleType><xsd:compl
exType name="ListLevelSuffixProperty"><xsd:attribute name="val"
type="ListLevelSuffixValues"
use="required"></xsd:attribute></xsd:complexType><xsd:complexType
name="lvlLegacyElt"><xsd:attribute name="legacy" type="BooleanType"
use="optional"></xsd:attribute><xsd:attribute name="legacySpace"
type="TwipsMeasureType" use="optional"></xsd:attribute><xsd:attribute
name="legacyIndent" type="TwipsMeasureType"
use="optional"></xsd:attribute></xsd:complexType><xsd:complexType
name="lvlElt"><xsd:sequence><xsd:element name="Start"
type="DecimalNumberProperty" minOccurs="0"></xsd:element><xsd:element
name="Nfc" type="DecimalNumberProperty"
minOccurs="0"></xsd:element><xsd:element name="LvlRestart"
type="DecimalNumberProperty" minOccurs="0"></xsd:element><xsd:element
name="PStyle" type="StringProperty" minOccurs="0"></xsd:element><xsd:element
name="IsLgl" type="BooleanProperty" minOccurs="0"></xsd:element><xsd:element
name="Suff" type="ListLevelSuffixProperty"
minOccurs="0"></xsd:element><xsd:element name="LvlText" type="StringProperty"
minOccurs="0"></xsd:element><xsd:element name="LvlPicBulletId"
type="DecimalNumberProperty" minOccurs="0"></xsd:element><xsd:element
name="Legacy" type="lvlLegacyElt" minOccurs="0"></xsd:element><xsd:element
name="LvlJc" type="JcProperty" minOccurs="0"></xsd:element><xsd:element
name="pPr" type="pPrElt" minOccurs="0"></xsd:element><xsd:element name="rPr"
type="rPrElt" minOccurs="0"></xsd:element></xsd:sequence><xsd:attribute
name="ilvl" type="DecimalNumberType"
use="required"></xsd:attribute><xsd:attribute name="tplc" type="HexNumberType"
use="optional"></xsd:attribute><xsd:attribute name="tentative" type="BooleanType"
use="optional"></xsd:attribute></xsd:complexType><xsd:simpleType
name="ListTypeValues"><xsd:restriction base="xsd:string"><xsd:enumeration
value="SingleLevel"></xsd:enumeration><xsd:enumeration
``` value="Multilevel"></xsd:enumeration><xsd:enumeration value="HybridMultilevel"></xsd:enumeration></xsd:restriction></xsd:simpleType><xsd:complexType name="ListTypeProperty"><xsd:attribute name="val" type="ListTypeValues" use="required"></xsd:attribute></xsd:complexType><xsd:complexType name="listDefElt"><xsd:sequence><xsd:element name="Lsid" type="HexNumberProperty" minOccurs="0"></xsd:element><xsd:element name="ListStyleLink" type="StringProperty" minOccurs="0"></xsd:element><xsd:element name="StyleLink" type="StringProperty" minOccurs="0"></xsd:element><xsd:element name="Plt" type="ListTypeProperty" minOccurs="0"></xsd:element><xsd:element name="Tmpl" type="HexNumberProperty" minOccurs="0"></xsd:element><xsd:element name="Name" type="StringProperty" minOccurs="0"></xsd:element><xsd:element name="lvl" type="lvlElt" minOccurs="0" maxOccurs="9"></xsd:element></xsd:sequence><xsd:attribute name="listDefId" type="DecimalNumberType" use="required"></xsd:attribute></xsd:complexType><xsd:complexType name="listLvlElt"><xsd:sequence><xsd:element name="StartOverride" type="DecimalNumberProperty" minOccurs="0"></xsd:element><xsd:element name="lvlOverride" type="lvlElt" minOccurs="0"></xsd:element></xsd:sequence><xsd:attribute name="ilvl" type="DecimalNumberType" use="required"></xsd:attribute></xsd:complexType><xsd:complexType name="listElt"><xsd:sequence><xsd:element name="Ilst" type="DecimalNumberProperty" minOccurs="1"></xsd:element><xsd:element name="listLvl" type="listLvlElt" minOccurs="0" maxOccurs="9"></xsd:element></xsd:sequence><xsd:attribute name="ilfo" type="DecimalNumberType" use="required"></xsd:attribute></xsd:complexType><xsd:complexType name="listsElt"><xsd:sequence><xsd:element name="listPicBullet"

```
type="listPicBulletElt" minOccurs="0"
maxOccurs="unbounded"></xsd:element><xsd:element name="listDef"
type="listDefElt" minOccurs="0"
maxOccurs="unbounded"></xsd:element><xsd:element name="list" type="listElt"
minOccurs="0"
maxOccurs="unbounded"></xsd:element></xsd:sequence></xsd:complexType><xsd:si
mpleType name="TStyleOverrideTypeValue"><xsd:restriction
base="xsd:string"><xsd:enumeration
value="wholeTable"></xsd:enumeration><xsd:enumeration
value="firstRow"></xsd:enumeration><xsd:enumeration
value="lastRow"></xsd:enumeration><xsd:enumeration
value="firstCol"></xsd:enumeration><xsd:enumeration
value="lastCol"></xsd:enumeration><xsd:enumeration
value="band1Vert"></xsd:enumeration><xsd:enumeration
value="band2Vert"></xsd:enumeration><xsd:enumeration
value="band1Horz"></xsd:enumeration><xsd:enumeration
value="band2Horz"></xsd:enumeration><xsd:enumeration
value="neCell"></xsd:enumeration><xsd:enumeration
value="nwCell"></xsd:enumeration><xsd:enumeration
value="seCell"></xsd:enumeration><xsd:enumeration
value="swCell"></xsd:enumeration></xsd:restriction></xsd:simpleType><xsd:comple
xType name="tStylePrElt"><xsd:sequence><xsd:element name="pPr" type="pPrElt"
minOccurs="0"></xsd:element><xsd:element name="rPr" type="rPrElt"
minOccurs="0"></xsd:element><xsd:element name="tblPr"
type="tblPrElt"></xsd:element><xsd:element name="trPr" type="trPrElt"
minOccurs="0" maxOccurs="1"></xsd:element><xsd:element name="tcPr"
type="tcPrElt" minOccurs="0"
maxOccurs="1"></xsd:element></xsd:sequence><xsd:attribute name="type"
type="TStyleOverrideTypeValue"
use="required"></xsd:attribute></xsd:complexType><xsd:simpleType
```

```
name="StyleKindValue"><xsd:restriction base="xsd:string"><xsd:enumeration
value="paragraph"></xsd:enumeration><xsd:enumeration
value="character"></xsd:enumeration><xsd:enumeration
value="table"></xsd:enumeration><xsd:enumeration
value="list"></xsd:enumeration></xsd:restriction></xsd:simpleType><xsd:complexTy
pe name="StyleKindProperty"><xsd:attribute name="val" type="StyleKindValue"
use="required"></xsd:attribute></xsd:complexType><xsd:complexType
name="styleElt"><xsd:sequence><xsd:element name="Name" type="StringProperty"
minOccurs="0" maxOccurs="1"></xsd:element><xsd:element ref="WX:UIName"
minOccurs="0" maxOccurs="1"></xsd:element><xsd:element name="Aliases"
type="StringProperty" minOccurs="0"></xsd:element><xsd:element name="Sti"
type="DecimalNumberProperty" minOccurs="0"></xsd:element><xsd:element
name="BasedOn" type="StringProperty" minOccurs="0"></xsd:element><xsd:element
name="Next" type="StringProperty" minOccurs="0"></xsd:element><xsd:element
name="Link" type="StringProperty" minOccurs="0"></xsd:element><xsd:element
name="AutoRedefine" type="BooleanProperty"
minOccurs="0"></xsd:element><xsd:element name="Hidden" type="BooleanProperty"
minOccurs="0"></xsd:element><xsd:element name="SemiHidden"
type="BooleanProperty" minOccurs="0"></xsd:element><xsd:element
name="Personal" type="BooleanProperty"
minOccurs="0"></xsd:element><xsd:element name="PersonalCompose"
type="BooleanProperty" minOccurs="0"></xsd:element><xsd:element
name="PersonalReply" type="BooleanProperty"
minOccurs="0"></xsd:element><xsd:element name="RSID"
type="HexNumberProperty" minOccurs="0"></xsd:element><xsd:element name="pPr"
type="pPrElt" minOccurs="0" maxOccurs="1"></xsd:element><xsd:element
name="rPr" type="rPrElt" minOccurs="0"
maxOccurs="1"></xsd:element><xsd:element name="tblPr" type="tblPrElt"
minOccurs="0" maxOccurs="1"></xsd:element><xsd:element name="trPr"
type="trPrElt" minOccurs="0" maxOccurs="1"></xsd:element><xsd:element
```

```
name="tcPr" type="tcPrElt" minOccurs="0"
maxOccurs="1"></xsd:element><xsd:element name="tStylePr" type="tStylePrElt"
minOccurs="0" maxOccurs="1"></xsd:element></xsd:sequence><xsd:attribute
name="type" type="StyleKindValue" use="optional"></xsd:attribute><xsd:attribute
name="styleId" type="StringType" use="optional"></xsd:attribute><xsd:attribute
name="default" type="BooleanType"
use="optional"></xsd:attribute></xsd:complexType><xsd:complexType
name="stylesElt"><xsd:sequence><xsd:element name="VersionOfBuiltInStylenames"
type="DecimalNumberProperty" minOccurs="0"></xsd:element><xsd:element
name="style" type="styleElt" minOccurs="0"
maxOccurs="unbounded"></xsd:element></xsd:sequence></xsd:complexType><xsd:si
mpleType name="PanoseType"><xsd:restriction base="xsd:hexBinary"><xsd:length
value="10"></xsd:length></xsd:restriction></xsd:simpleType><xsd:complexType
name="PanoseProperty"><xsd:attribute name="val" type="PanoseType"
use="required"></xsd:attribute></xsd:complexType><xsd:simpleType
name="FontFamilyType"><xsd:restriction base="xsd:string"><xsd:enumeration
value="Decorative"></xsd:enumeration><xsd:enumeration
value="Modern"></xsd:enumeration><xsd:enumeration
value="Roman"></xsd:enumeration><xsd:enumeration
value="Script"></xsd:enumeration><xsd:enumeration
value="Swiss"></xsd:enumeration><xsd:enumeration
value="Auto"></xsd:enumeration></xsd:restriction></xsd:simpleType><xsd:complexT
ype name="FontFamilyProperty"><xsd:attribute name="val" type="FontFamilyType"
use="required"></xsd:attribute></xsd:complexType><xsd:simpleType
name="PitchEltType"><xsd:restriction base="xsd:string"><xsd:enumeration
value="fixed"></xsd:enumeration><xsd:enumeration
value="variable"></xsd:enumeration><xsd:enumeration
value="default"></xsd:enumeration></xsd:restriction></xsd:simpleType><xsd:comple
xType name="PitchElt"><xsd:attribute name="val"
type="PitchEltType"></xsd:attribute></xsd:complexType><xsd:complexType
```

```
name="FontSigElt"><xsd:attribute name="usb-0" use="required"
type="HexNumberType"></xsd:attribute><xsd:attribute name="usb-1" use="required"
type="HexNumberType"></xsd:attribute><xsd:attribute name="usb-2" use="required"
type="HexNumberType"></xsd:attribute><xsd:attribute name="usb-3" use="required"
type="HexNumberType"></xsd:attribute><xsd:attribute name="csb-0" use="required"
type="HexNumberType"></xsd:attribute><xsd:attribute name="csb-1" use="required"
type="HexNumberType"></xsd:attribute></xsd:complexType><xsd:complexType
name="fontElt"><xsd:sequence><xsd:element name="AltName"
type="StringProperty" minOccurs="0" maxOccurs="1"></xsd:element><xsd:element
name="Panose-1" type="PanoseProperty" minOccurs="0"
maxOccurs="1"></xsd:element><xsd:element name="Charset"
type="DecimalNumberProperty" minOccurs="0"
maxOccurs="1"></xsd:element><xsd:element name="Family"
type="FontFamilyProperty" minOccurs="0"
maxOccurs="1"></xsd:element><xsd:element name="NotTrueType" minOccurs="0"
maxOccurs="1"></xsd:element><xsd:element name="Pitch" type="PitchElt"
minOccurs="0" maxOccurs="1"></xsd:element><xsd:element name="Sig"
type="FontSigElt" minOccurs="0"
maxOccurs="1"></xsd:element></xsd:sequence><xsd:attribute name="name"
type="StringType"></xsd:attribute></xsd:complexType><xsd:complexType
name="fontsElt"><xsd:sequence><xsd:element name="font" type="fontElt"
minOccurs="0"
maxOccurs="unbounded"></xsd:element></xsd:sequence></xsd:complexType><xsd:c
omplexType name="divElt"><xsd:sequence><xsd:element name="BlockQuote"
type="BooleanProperty"></xsd:element><xsd:element name="BodyDiv"
type="BooleanProperty"></xsd:element><xsd:element name="MarLeft"
type="DecimalNumberType"></xsd:element><xsd:element name="MarRight"
type="DecimalNumberType"></xsd:element><xsd:element name="MarTop"
type="DecimalNumberType"></xsd:element><xsd:element name="MarBottom"
type="DecimalNumberType"></xsd:element><xsd:element name="bdr"
``` minOccurs="0"><xsd:complexType><xsd:sequence><xsd:element name="Top" type="BorderProperty" minOccurs="0"></xsd:element><xsd:element name="Left" type="BorderProperty" minOccurs="0"></xsd:element><xsd:element name="Bottom" type="BorderProperty" minOccurs="0"></xsd:element><xsd:element name="Right" type="BorderProperty" minOccurs="0"></xsd:element></xsd:sequence></xsd:complexType></xsd:element><xsd:element name="divsChild" type="divsElt"></xsd:element></xsd:sequence><xsd:attribute name="id" type="DecimalNumberType" use="required"></xsd:attribute></xsd:complexType><xsd:complexType name="divsElt"><xsd:sequence minOccurs="1" maxOccurs="unbounded"><xsd:element name="div" type="divElt"></xsd:element></xsd:sequence></xsd:complexType><xsd:element name="txbxContent"><xsd:complexType><xsd:choice minOccurs="1" maxOccurs="unbounded"><xsd:element name="p" type="pElt" minOccurs="0" maxOccurs="unbounded"></xsd:element><xsd:element name="tbl" type="tblElt" minOccurs="0" maxOccurs="unbounded"></xsd:element></xsd:choice><xsd:attribute name="txbxStyle" type="xsd:string" use="optional"></xsd:attribute><xsd:attribute name="txbxClass" type="xsd:string" use="optional"></xsd:attribute></xsd:complexType></xsd:element><xsd:complexType name="bodyElt"><xsd:sequence><xsd:choice maxOccurs="unbounded"><xsd:element minOccurs="0" maxOccurs="unbounded" name="p" type="pElt"></xsd:element><xsd:element minOccurs="0" maxOccurs="unbounded" name="tbl" type="tblElt"></xsd:element></xsd:choice><xsd:element name="sectPr" minOccurs="0" maxOccurs="1" type="sectPrElt"></xsd:element></xsd:sequence></xsd:complexType><xsd:element name="WordDocument"><xsd:complexType><xsd:sequence><xsd:element name="ignoreSubtree" type="StringProperty" minOccurs="0"></xsd:element><xsd:element name="docInfo" type="docInfoElt"

minOccurs="0"></xsd:element><xsd:element name="docPr" type="docPrElt" minOccurs="1"></xsd:element><xsd:element name="docOleData" type="BinDataProperty" minOccurs="0"></xsd:element><xsd:element name="fonts" type="fontsElt" minOccurs="0"></xsd:element><xsd:element name="frameset" type="framesetElt" minOccurs="0"></xsd:element><xsd:element name="lists" type="listsElt" minOccurs="0"></xsd:element><xsd:element name="styles" type="stylesElt" minOccurs="0"></xsd:element><xsd:element name="divs" type="divsElt" minOccurs="0"></xsd:element><xsd:element name="docSuppData" type="BinDataProperty" minOccurs="0"></xsd:element><xsd:element name="shapeDefaults" minOccurs="0"></xsd:element><xsd:element name="body" type="bodyElt" minOccurs="1" maxOccurs="1"></xsd:element></xsd:sequence><xsd:attribute name="version" type="StringType" use="optional"></xsd:attribute><xsd:attribute ref="xml:space" use="optional"></xsd:attribute></xsd:complexType></xsd:element></xsd:schema>

As discussed above, hints may be provided within the XML associated files providing applications that understand XML a shortcut to understanding some of the features provided by the word-processor. By using the hints, the applications do not have to know all of the specific details of the internal processing of the word-processor in order to recreate a feature. Below is an exemplary hints schema, in accordance with aspects of the invention.

```
<?xml version="1.0"?>
-<xsd:schema xmlns:xsd="http://www.w3.org/2001/XMLSchema"targetNamespace="urn:schemas-microsoft-com:office:wordml-11.0:aux"xmlns:wbld="urn-microsoft-com-word-build" xmlns="urn:schemas-microsoft-com:office:wordml-11.0:aux" xmlns:W="urn:schemas-microsoft-com:office:wordml-11.0" attributeFormDefault="qualified"elementFormDefault="qualified">
-<xsd:element name="sect"wbld:cname="sect">
-<xsd:complexType>
-<xsd:sequence>
    <xsd:element name="sub-section" minOccurs="0" maxOccurs="unbounded" />
  </xsd:sequence>
  </xsd:complexType>
  </xsd:element>
-<xsd:complexType name="FontElt">
  <xsd:attribute name="val" type="xsd:string" />
  </xsd:complexType>
  <xsd:element name="AllowEmptyCollapse" />
  <xsd:element name="Font" type="FontElt" />
-<!--
BG COLOR PROPERTY
-->
-<xsd:complexType name="bgcolorType">
-<xsd:attribute name="bgcolor">
-<xsd:simpleType>
-<xsd:union>
-<xsd:simpleType>
-<xsd:restriction base="xsd:hexBinary">
    <xsd:length value="6" fixed ="true" />
    </xsd:restriction>
    </xsd:simpleType>
-<xsd:simpleType>
-<xsd:restriction base="xsd:string">
    <xsd:enumeration value="auto" />
    </xsd:restriction>
    </xsd:simpleType>
    </xsd:union>
    </xsd:simpleType>
    </xsd:attribute>
    </xsd:complexType>
-<xsd:complexType name="bdrwidthType">
    <xsd:attribute name="bdrwidth" type="xsd:integer" />
    </xsd:complexType>
-<!--
  ESTIMATE PROPERTY
-->
-<xsd:attribute name="estimate">
-<xsd:simpleType>
-<xsd:restriction base="xsd:string">
    <xsd:enumeration value="true" />
    <xsd:enumeration value="false" />
    </xsd:restriction>
    </xsd:simpleType>
    </xsd:attribute>
-<xsd:complexType name="StringElt">
    <xsd:attribute name="val" type="xsd:string" />
    <xsd:complexType>
    <xsd:element name="t" type="xsd:string" />
    <xsd:element name="UIName" type="StringElt" />
    <xsd:element name="CnfStyle" type="StringElt" />
    </xsd:schema>
```

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for creating a document in XML ("Extensible Markup Language") in a computing device that is understandable by many applications, comprising:

accessing a published XSD ("XML Schema Definition") in said computing device, wherein the XSD defines rules relating to the XML file format for documents associated with an application having a rich set of features;

determining an element to create in an XML file in said computing device, wherein the element is selected from a set of elements, including: a style element; a hints element that includes information to assist an external application in displaying text of the of the document; a bookmark element; wherein the bookmark element includes an identifier attribute that associates a start bookmark with an end bookmark element wherein two bookmark elements are used in book marking a portion of the document; wherein each of the two bookmark elements include an opening tag and an ending tag; a document properties element; a text element that contains text of the document; wherein all of the text of the document is stored within text elements such that only the text of the document is contained between start text tags and end text tags; wherein there are no intervening tags between each of the start text tags and each of the corresponding end text tags and wherein each of the start text tags do not include formatting information for the text between each of the start text tags and the end text tags; a text run element that includes the formatting information for the text within text elements; a font element; a formatting element; a section element; a table element; an outline element; and a proofing element;

creating the document including the element in said computing device; and storing the document in said computing device.

2. The method of claim 1, wherein the hints element utilizes a hint tag within the XML file in order to describe the feature to a second application without the second application having to know the details of the internal processing of the application having the rich set of features.

3. The method of claim 1, wherein the style element includes at least one of a list style, a character style, a paragraph style, a section style, a numbering style, a bulleting style, and a table style.

4. The method of claim 1, wherein the elements further comprise a comment element; wherein two comment elements are used in to mark a comment within the document; wherein each of the two comment elements include a opening tag and an ending tag.

5. The method of claim 1, wherein the document properties element includes a plurality of the following: a title, an author, a template, a last author, a revision, an application name, a total number of edits, a created date, a last saved date, a pages date, a word count, a character count, a company name, a lines count, a paragraphs count, a character with space count, a version, and any custom properties.

6. The method of claim 1, wherein the text element includes text that is contained between a start text tag and an end text tag without intervening tags.

7. The method of claim 1, wherein the font element includes at least one of a font name, an alternate name, a panose name, a character set name, a family, and a pitch.

8. The method of claim 1, wherein the formatting information contains substantially all of the following: font style, size, color, shading, text effects, scaling, spacing, kerning, tabs, justification, and indents.

9. The method of claim 1, wherein the section information includes at least one of the following: page layout for a section, footer information, and header information.

10. The method of claim 1, wherein the table element and outline element includes at least one of the following properties: borders, width, height, and grid units.

11. The method of claim 1, wherein the proofing element includes at least one of a spelling state and a grammar state.

12. A computer-readable storage medium having computer-executable instructions for interacting with a document, comprising:
    interpreting a published XSD (Extensible Markup Language (XML) Schema Definition), wherein the XSD defines rules relating to the XML file format for documents associated with an application having a rich set of features; and
    creating an element in an XML file, wherein the element is selected from a set of elements, including: a style element; a hints element that is interpreted according to a hints schema that includes information to assist an external application in displaying text of the of the document; a bookmark element; wherein the bookmark element includes an identifier attribute that associates a start bookmark element with an end bookmark element; wherein two bookmark elements are used in book marking the portion of the document; wherein each of the two bookmark elements include a opening tag and an ending tag; a document properties element; a text element that contains text of the document; wherein all of the text of the document is stored within text elements such that only the text of the document is contained between start text tags and end text tags; wherein there are no intervening tags between each of the start text tags and each of the corresponding end text tags and wherein each of the start text tags do not include formatting information for the text between each of the start text tags and the end text tags; a text run element that includes the formatting information for the text within text elements; a font element; a formatting element; a section element; a paragraphs element; a table element; an outline element; and a proofing element and
    storing the element in the XML file.

13. The computer-readable medium of claim 12, wherein the hints element utilizes a hint tag within the XML file in order to describe the feature to a second application without the second application having to know the details of the internal processing of the application having the rich set of features.

14. The computer-readable medium of claim 12, wherein the style element includes a list style, a character style, a paragraph style, a section style, a numbering style, a bulleting style, and a table style.

15. The computer-readable medium of claim 12, wherein the non-structured element includes non-structured feature tags that span other features and are recognized and parsed separately from other XML elements including at least one of: an opening tag and a closing tag.

16. The computer-readable medium of claim 12, wherein the document properties element includes a majority of the following: a title, an author, a template, a last author, a revision, an application name, a total number of edits, a created date, a last saved date, a pages date, a word count, a character count, a company name, a lines count, a paragraphs count, a character with space count, a version, and any custom properties.

17. The computer-readable medium of claim 12, wherein the text element includes text that is contained between a start text tag.

18. The computer-readable medium of claim 12, wherein the font element includes a font name, a panose name, a character set name, a family, and a pitch.

19. The computer-readable medium of claim 12, wherein the formatting information contains a majority of the following: font style, size, color, shading, text effects, scaling, spacing, kerning, tabs, justification, and indents.

20. The computer-readable medium of claim 12, wherein the section information includes: page layout for a section, footer information, and header information.

21. The computer-readable medium of claim 12, wherein the table element and outline element includes substantially all of the following properties: borders, width, height, and grid units.

22. The computer-readable medium of claim 12, wherein the proofing element includes at least one of a spelling state and a grammar state.

* * * * *